(12) United States Patent
Rosenberg et al.

(10) Patent No.: US 6,580,417 B2
(45) Date of Patent: **\*Jun. 17, 2003**

(54) TACTILE FEEDBACK DEVICE PROVIDING TACTILE SENSATIONS FROM HOST COMMANDS

(75) Inventors: Louis B. Rosenberg, Pleasanton, CA (US); Adam C. Braun, Sunnyvale, CA (US); Mike D. Levin, Sunnyvale, CA (US)

(73) Assignee: Immersion Corporation, San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/815,872

(22) Filed: Mar. 22, 2001

(65) Prior Publication Data

US 2001/0030658 A1 Oct. 18, 2001

Related U.S. Application Data

(63) Continuation of application No. 09/050,665, filed on Mar. 30, 1998, now Pat. No. 6,219,033, which is a continuation of application No. 08/566,282, filed on Dec. 1, 1995, now Pat. No. 5,734,373, which is a continuation-in-part of application No. 08/534,791, filed on Sep. 27, 1995, now Pat. No. 5,739,811, and a continuation-in-part of application No. 08/461,170, filed on Jun. 5, 1995, now Pat. No. 5,576,727, which is a continuation of application No. 08/092,974, filed on Jul. 16, 1993, now abandoned.

(51) Int. Cl.⁷ ............................. G06F 3/033; G09G 5/08
(52) U.S. Cl. ...................................................... 345/157
(58) Field of Search ................................. 345/156, 157, 345/161, 163, 184, 701; 463/30, 38; 434/45; 244/223; 318/568.1, 568.11

(56) References Cited

U.S. PATENT DOCUMENTS 3,157,853 A 11/1964 Hirsch (List continued on next page.)

FOREIGN PATENT DOCUMENTS

| EP | 0085518 A1 | 8/1983 |
|---|---|---|
| EP | 0265011 | 4/1988 |
| EP | 0349086 | 1/1990 |

(List continued on next page.)

OTHER PUBLICATIONS

Batter, et al., "Grope–1: A Computer Display to the Sense of Feel", University of North Carolina at Chapel Hill, Chapel Hill, North Carolina, USA.

(List continued on next page.)

*Primary Examiner*—Jeffery Brier
(74) *Attorney, Agent, or Firm*—Kilpatrick Stockton LLP

(57) ABSTRACT

A method and apparatus for controlling and providing force feedback using an interface device manipulated by a user. A microprocessor is provided local to the interface device and reads sensor data from sensors that describes the position and/or other information about a user object moved by the user, such as a joystick. The microprocessor controls actuators to provide forces on the user object and provides the sensor data to a host computer that is coupled to the interface device. The host computer sends high level host commands to the local microprocessor, and the microprocessor independently implements a local reflex process based on the high level command to provide force values to the actuators using sensor data and other parameters. A provided host command protocol includes a variety of different types of host commands and associated command parameters. By providing a relatively small set of high level host commands and parameters which are translated into a panoply of forces, the protocol further shifts the computational burden from the host computer to the local microprocessor and allows a software developer to easily create force feedback applications.

19 Claims, 21 Drawing Sheets

U.S. PATENT DOCUMENTS

| | | |
|---|---|---|
| 3,220,121 A | 11/1965 | Culter |
| 3,497,668 A | 2/1970 | Hirsch |
| 3,517,446 A | 6/1970 | Corlyon et al. |
| 3,902,687 A | 9/1975 | Hightower |
| 3,903,614 A | 9/1975 | Diamond et al. |
| 3,919,691 A | 11/1975 | Noll ................... 340/172.5 |
| 4,131,033 A | 12/1978 | Wright et al. ................... 74/553 |
| 4,160,508 A | 7/1979 | Salsbury |
| 4,236,325 A | 12/1980 | Hall et al. |
| 4,398,889 A | 8/1983 | Lam et al. ................... 434/45 |
| 4,477,043 A | 10/1984 | Repperger ................... 244/223 |
| 4,513,235 A | 4/1985 | Acklam et al. |
| 4,538,035 A | 8/1985 | Pool ................... 200/6 A |
| 4,560,983 A | 12/1985 | Williams ................... 340/825 |
| 4,581,491 A | 4/1986 | Boothroyd |
| 4,599,070 A | 7/1986 | Hladky et al. |
| 4,604,016 A | 8/1986 | Joyce ................... 414/7 |
| 4,706,294 A | 11/1987 | Ouchida ................... 381/109 |
| 4,708,656 A | 11/1987 | de Vries et al. |
| 4,713,007 A | 12/1987 | Alban |
| 4,795,296 A | 1/1989 | Jau ................... 414/5 |
| 4,800,721 A | 1/1989 | Cemenska et al. ................... 60/393 |
| 4,837,734 A | 6/1989 | Ichikawa et al. ................... 364/513 |
| 4,853,874 A | 8/1989 | Iwamoto et al. ................... 364/513 |
| 4,868,549 A | 9/1989 | Affinito et al. ................... 340/710 |
| 4,879,556 A | 11/1989 | Duimel ................... 341/20 |
| 4,891,764 A | 1/1990 | McIntosh |
| 4,896,554 A | 1/1990 | Culver ................... 74/471 XY |
| 4,907,970 A | 3/1990 | Meenen, Jr. ................... 434/45 |
| 4,930,770 A | 6/1990 | Baker |
| 4,934,694 A | 6/1990 | McIntosh |
| 4,949,119 A | 8/1990 | Moncrief et al. ................... 364/578 |
| 4,961,038 A | 10/1990 | MacMinn ................... 318/696 |
| 4,983,901 A | 1/1991 | Lehmer ................... 318/685 |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. ................... 434/45 |
| 5,072,361 A | 12/1991 | Davis et al. ................... 364/167 |
| 5,076,517 A | 12/1991 | Ferranti et al. ................... 244/228 |
| 5,078,152 A | 1/1992 | Bond |
| 5,103,404 A | 4/1992 | McIntosh ................... 318/568.22 |
| 5,107,080 A | 4/1992 | Rosen ................... 200/6 A |
| 5,107,262 A | 4/1992 | Cadoz et al. ................... 341/22 |
| 5,113,179 A | 5/1992 | Scott-Jackson ................... 340/709 |
| 5,116,051 A | 5/1992 | Moncrief et al. ................... 273/448 B |
| 5,142,931 A | 9/1992 | Menahem ................... 74/471 XY |
| 5,143,505 A | 9/1992 | Burdea et al. ................... 414/5 |
| 5,146,566 A | 9/1992 | Hollis, Jr. ................... 395/275 |
| 5,184,319 A | 2/1993 | Kramer ................... 364/806 |
| 5,185,561 A | 2/1993 | Good et al. ................... 318/432 |
| 5,186,629 A | 2/1993 | Rohen ................... 434/114 |
| 5,186,695 A | 2/1993 | Mangseth et al. |
| 5,189,355 A | 2/1993 | Larkins et al. ................... 318/685 |
| 5,197,003 A | 3/1993 | Moncrief et al. ................... 364/410 |
| 5,203,563 A | 4/1993 | Loper, III ................... 273/148 B |
| 5,204,600 A | 4/1993 | Kahkoska ................... 318/602 |
| 5,209,661 A | 5/1993 | Hildreth et al. ................... 434/45 |
| 5,212,473 A | 5/1993 | Louis |
| 5,220,260 A | 6/1993 | Schuler ................... 318/561 |
| 5,223,776 A | 6/1993 | Radke et al. ................... 318/568.1 |
| 5,235,868 A | 8/1993 | Culver ................... 74/471 |
| 5,240,417 A | 8/1993 | Smithson et al. |
| 5,264,768 A | 11/1993 | Gregory et al. ................... 318/561 |
| 5,271,290 A | 12/1993 | Fischer |
| 5,275,174 A | 1/1994 | Cook |
| 5,275,565 A | 1/1994 | Moncrief ................... 434/29 |
| 5,286,203 A | 2/1994 | Fuller et al. ................... 434/45 |
| 5,296,871 A | 3/1994 | Paley ................... 345/163 |
| 5,299,810 A | 4/1994 | Pierce |
| 5,309,140 A | 5/1994 | Everett |
| 5,334,027 A | 8/1994 | Wherlock |
| 5,354,162 A | 10/1994 | Burdea et al. ................... 414/5 |
| 5,366,376 A | 11/1994 | Copperman et al. ................... 434/69 |
| 5,368,484 A | 11/1994 | Copperman et al. ................... 434/69 |
| 5,381,080 A | 1/1995 | Schnell et al. ................... 318/566 |
| 5,388,992 A | 2/1995 | Franklin et al. ................... 434/114 |
| 5,389,865 A | 2/1995 | Jacobus et al. ................... 318/568.11 |
| 5,396,266 A | 3/1995 | Brimhall ................... 345/161 |
| 5,399,091 A | 3/1995 | Mitsumoto ................... 434/61 |
| 5,405,152 A | 4/1995 | Katanics et al. ................... 273/438 |
| 5,414,337 A | 5/1995 | Schuler ................... 318/561 |
| 5,435,729 A | 7/1995 | Hildreth et al. ................... 434/365 |
| 5,466,213 A | 11/1995 | Hogan |
| 5,513,100 A | 4/1996 | Parker et al. ................... 364/167.01 |
| 5,547,382 A | 8/1996 | Yamasaki |
| 5,559,432 A | 9/1996 | Logue ................... 324/207.17 |
| 5,576,727 A | 11/1996 | Rosenberg et al. ................... 345/179 |
| 5,577,981 A | 11/1996 | Jarvik ................... 482/4 |
| 5,589,828 A | 12/1996 | Armstrong ................... 341/20 |
| 5,589,854 A | 12/1996 | Tsai ................... 345/161 |
| 5,623,582 A | 4/1997 | Rosenberg ................... 395/99 |
| 5,625,576 A | 4/1997 | Massie et al. ................... 364/578 |
| 5,629,594 A | 5/1997 | Jacobus et al. ................... 318/568.11 |
| 5,634,794 A | 6/1997 | Hildreth et al. ................... 434/37 |
| 5,642,469 A | 6/1997 | Hannaford ................... 395/99 |
| 5,643,087 A | 7/1997 | Marcus et al. ................... 463/38 |
| 5,656,901 A | 8/1997 | Kurita ................... 318/436 |
| 5,666,138 A | 9/1997 | Culver ................... 345/161 |
| 5,666,473 A | 9/1997 | Wallace ................... 345/420 |
| 5,669,818 A | 9/1997 | Thorner et al. ................... 463/30 |
| 5,691,747 A | 11/1997 | Amano ................... 345/167 |
| 5,701,140 A | 12/1997 | Rosenberg et al. ................... 345/156 |
| 5,709,219 A | 1/1998 | Chen et al. ................... 128/782 |
| 5,714,978 A | 2/1998 | Yamanaka et al. ................... 345/157 |
| 5,721,566 A | 2/1998 | Rosenberg et al. ................... 345/161 |
| 5,724,068 A | 3/1998 | Sanchez et al. ................... 345/161 |
| 5,734,373 A | 3/1998 | Rosenberg et al. ................... 345/161 |
| 5,736,978 A | 4/1998 | Hasser et al. ................... 345/173 |
| 5,739,811 A | 4/1998 | Rosenberg et al. ................... 345/161 |
| 5,742,278 A | 4/1998 | Chen ................... 345/156 |
| 5,754,023 A | 5/1998 | Roston et al. ................... 318/561 |
| 5,755,577 A | 5/1998 | Gillio ................... 434/262 |
| 5,766,016 A | 6/1998 | Sinclair |
| 5,767,839 A | 6/1998 | Rosenberg ................... 345/161 |
| 5,769,640 A | 6/1998 | Jacobus et al. ................... 434/262 |
| 5,781,172 A | 7/1998 | Engel et al. ................... 345/164 |
| 5,785,630 A | 7/1998 | Bobick et al. |
| 5,790,108 A | 8/1998 | Salcudean et al. ................... 345/184 |
| 5,805,140 A | 9/1998 | Rosenberg et al. ................... 345/161 |
| 5,857,986 A | 1/1999 | Moriyasu ................... 601/49 |
| 5,880,714 A | 3/1999 | Rosenberg et al. ................... 345/156 |
| 5,889,670 A | 3/1999 | Schuler et al. ................... 364/186 |
| 5,889,672 A | 3/1999 | Schuler et al. ................... 364/188 |
| 5,897,437 A | 4/1999 | Nishiumi et al. ................... 463/47 |
| 5,944,151 A | 8/1999 | Jakobs et al. ................... 188/267.1 |
| 6,004,134 A | 12/1999 | Marcus et al. ................... 434/45 |
| 6,037,927 A | 3/2000 | Rosenberg ................... 345/156 |
| 6,046,726 A | 4/2000 | Keyson ................... 345/156 |
| 6,046,727 A | 4/2000 | Rosenberg et al. ................... 345/156 |
| 6,057,828 A | 5/2000 | Rosenberg et al. ................... 345/156 |
| 6,088,017 A | 7/2000 | Tremblay et al. ................... 345/156 |
| 6,104,158 A | 8/2000 | Jacobus et al. ................... 318/568.11 |
| 6,195,592 B1 | 2/2001 | Schuler et al. ................... 700/83 |
| 6,219,032 B1 | 4/2001 | Rosenberg et al. ................... 345/157 |
| 6,219,033 B1 | 4/2001 | Rosenberg et al. |
| 6,275,213 B1 | 8/2001 | Tremblay et al. ................... 345/156 |
| 6,300,937 B1 | 10/2001 | Rosenberg et al. |
| 6,422,941 B1 | 7/2002 | Thorner et al. |

FOREIGN PATENT DOCUMENTS

| | | |
|---|---|---|
| EP | 0607580 A1 | 7/1994 |
| EP | 0626634 A2 | 11/1994 |
| JP | S62-194389 | 12/1987 |
| JP | H4-92691 | 3/1992 |
| JP | H5-86387 | 11/1993 |
| JP | H6-210065 | 8/1994 |
| WO | WO92/00559 | 1/1992 |
| WO | WO9520787 | 8/1995 |
| WO | WO9532459 | 11/1995 |

OTHER PUBLICATIONS

Minsky, et al., "Felling and Seeing: Issues in Force Display", Department of Computer Science, University of North Carolina at Chapel Hill, Chapel Hill, NC 27599, 1990 ACM.

Russo, "The Design and Implementation of a Three Degree-of-Frredom Force Output Joystick", Submitted to the Department of Mechanical Engineering on May 11, 1990.

Rosenberg, Louis B., The Use of Virtual Fixtures to Enhance Operator Performance in Time Delayed Teleoperation, Armstrong Laboratory, Mar. 1993, pp. 1–45.

Rosenberg, Louis B., "Perceptual Design of a Virtual Rigid Surface Contact," Center for Design Reseach Stanford University, Air Force Material Command, Apr. 1993, pp. 1–41.

Atkinston, William D. et al, "Computing with Feeling," Comput. & Graphics, vol. 2, No. 2–E, pp. 97–103.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Burdea, Grigore et al., "Dextrous Telerobotics with Force Feedback–An Overview," Robotica 1991, vol. 9.

Gotow, J.K., et al., "Perception of Mechanical Properties at the Man–Machine Interface," IEEE 1987, pp. 688–189.

Ouh–Young, Ming, "Using a Manipulator for Force Display in Molecular Docking," IEEE 1988, pp 1824–1829.

Adelstein Bernard D. et al., "A High Performance Two Degree-of-Freedom Kinesthetic Interface," Massachusetts Institute of Technology 1992, pp. 108–112.

Kotoku, T. et al., "Environment Modeling for the Interactive Display (EMID) used in Telerobotic Systems", IROS, Nov. 1991, pp. 999–1004.

Herndon, J. N., "The State of the Art Model M–2 Maintenance System", Proceedings of the 1984 National Topical Meetinbg on Robotics and Remote Handling in Hostile Environments, American Nuclear Society, pp. 59–66.

Hannaford, B. et al., "Performance Evaluation of a Six–Axis Generalized Force–Reflecting Teleoperator," IEEE Transactions on Systems, Man, and Cybernetics, 1991.

Jacobsen, S.C. et al., "High Performance, High Dexterity, Force Reflective Teleoperator II," ANS Topical Meeting on Robotics and Remote Systems, Feb. 1991, pp. 1–10 and pp. 1–5 apndx.

Fischer, P. et al., "Specification and Design of Input Devices for Teleoperation", IEEE Conference on Robotics and Automation, IEEE, 1990, pp. 540–545.

Akamatsu, M., et al., "Multimodal Mouse: A Mouse–Type Device with Tactile and Force Display", Presence, vol. 3, No. 1, Winter 1994, pp. 73–80.

Burdea, G., et al, "Distributed Virtual Force Feedback", IEEE Workshop on Force Display in Virtual Environments and its Application t Robotic Teleoperation, May 1993, pp. 25–44.

Colgate, J. et al., "Implementation of Stiff Virtual Walls in Force–Reflecting Interfaces," Sep. 22, 1993.

Buttolo et al., "Pen Based Force Display for Precision Manipulation in Virtual Environments", IEEE Mar. 1995, pp. 217–224.

Rosenberg L. et al., "Perceptual Decomposition of Virtual Haptic Surfaces," Proceedings IEEE Symposium on Research Frontiers in Virtual Reality, Oct. 1993.

Rosenberg, L., "Virtual Fixtures as Tools to Enhance Operator Performance in Telepresence Environments", SPIE Telemanipulator Technology, 1993.

Rosenberg, L., "Virtual Haptic Overlays Enhance Performance in Telepresence Tasks", SPIE 1994.

Howe, R. et al., "Task Performance with a Dextrous Teleoperated Hand System," Proceedings of SPIE, vol. 1833, No. 1992.

Su, S. Augustine, "The Virtual Panel Architecture: A 3D Gesture Framework," IEEE Jan. 1993.

Adachi Yoshitaka et al., "Sensory Evaluation of Virtual Haptic Push–Buttons," Technical Research Center, Suzuki Motor Corporation, Nov. 1994.

Payette, J. et al., "Evaluation of a Force Feedback (Haptic) Computer Pointing Device in Zero Gravity", Proceedings of the ASME Dynamics Systems and Control Division, ASME Oct. 17, 1996, pp. 547–553.

Tan, H. et al, "Human Factors for the Design of Force–Reflecting Haptic Interfaces," ASME WAM 1994, pp. 1–11.

Iwata, H. et al., "Volume Haptization", IEEE 1993, pp. 16–18.

Kelley, A.J. et al., "MagicMouse: Tactile and Kinesthetic Feedback in the Human–Computer Interface using an Electromagnetically Actuated Input/Output Device," Dept. of Elec. Engineering, Univ. of British Columbia, 1993, pp. 1–27.

Iwata, H., "Artificial Reality with Force–feedback: Development of Desktop Virtual Space with Compact Master Manipulator," Computer Graphics, vol. 24, No. 4, 1990, pp. 165–170.

Hannaford, B. et al., "Force–Feedback Cursor Control," NASA Tech Brief, vol. 13, No. 11, Item #21, pp. 1–4.

Massie, T., "Design of a Three Degree of Freedom Force–Reflecting Haptic Interface," Dept. of Elec. Eng. and Comp. Sci., MIT, 1993, pp. 1–38.

Rutherford, M. "Third Generation Digital Flight Controls," CAE Electronics, Ltd., The Royal Aeronautical Society, 1984 Spring Convention Future Applications and Prospects for Flight Simulation, May 9–10, 1984, paper No. 15.

Baradat, Jean and Lacroix, Michel, "Advanced Features in Control Loading and Motion Systems for Simulators," National Security Industrial Association $1^{st}$ Interservice/Industry Training Equipment Conference Proceedings, Nov. 27–29, 1981.

Norlin, Ken A., "Flight Simulation Software at NASA Dryden Flight Research Center," American Institute of Aeronautics and Astronautic's Flight Simulation Technologies Conference, Baltimore, MD, Aug. 7–10, 1995.

Corrao, Joseph M., "Control Loading," American Institute of Aeronautics and Astronautic's Flight Simulation Update 1987, Jan. 12–16, 1987.

Corrao, J.M., "Control Loading," American Institute of Aeronautics and Astronautic's Flight Simulation Update 1988, Jan. 11–15, 1988.

Rinaldi, P., "Digital Control Loading—A Modular Approach," International Air Transport Association 6$^{th}$ Meeting of the Flight Simulator Technical Sub–Committee, Montreal, Jun. 1–4, 1982.

Hildreth, Bruce L., Eyermann, Roger E. and Trankle, Thomas Dr., "DC Servo–Motors for High Performance High Reliability Control Loading in Flight Simulators," American Defense Preparedness Association 12$^{th}$ Interservice/Industry Training System Conference, Nov. 6–8, 1990.

Baigrie, Stephen A., Reflectone Inc., "Electric Control Loading—A Low Cost, High Performance Alternative," American Defense Preparedness Association 12$^{th}$ Interservice/Industry Training System Conference, Nov. 6–8, 1990.

"Digital Control Loading", Giel et al., Summary, Paper 1, Paper 2, Paper 3, International Air Transport Association, Seventh Flight Simulator Technical Sub–Committee Meeting, Item No. 10, Montreal, Sep. 17–20, 1984.

Seidensticker, Steve, "Application of Microcomputers to the Simulator 'Linkage' Problem," National Security Indusrial Association 4$^{th}$ Interservice/Industry Training Equipment Conference Proceedings, Nov. 16–18, 1982.

Flight Simulation, Rolfe, J.M. and Staples, K. J., eds., 1986.

Albers, F. Gerry, "Microcomputer Base for Control Loading," Naval Training Equipment Center 11$^{th}$ NTEC–Industry Conference Proceedings, NAVTRAEQUIPCEN IH–306, Nov. 14–16, 1978.

Schmult, Brian et al., "Application Areas for a Force–Feedback Joystick," ASME 1993, DSC–vol. 49, pp. 47–54.

Millman, P. et al., "Design of a Four Degree–of–Freedom Force–Reflecting Manipulandum with a Specified Force/Torque Workspace," IEEE CH2969–4, 1991, pp. 1488–1492.

Kilpatrick, P., "The Use of A Kinesthetic Supplement in an Interactive Graphics System," Univ. of N. Carolina, 1976, pp. 1–175.

Hirota, Koichi et al., "Development of Surface Display," IEEE 0–7803–1363–1, 1993, pp. 256–262.

Brooks, F. et al., "Project GROPE—Haptic Displays for Scientific Visualization," Computer Graphics, vol. 24, No. 4, 1990, pp. 177–185.

Winey III, C., "Computer Simulated Visual and Tactile Feedback as an Aid to Manipulator and Vehicle Control," Mass. Institute of Tech., Mech. Engineering, 1981, pp. 1–79.

Baigrie, "Electric Control Loading –A Low Cost, High Performance Alternative," Proceedings, pp. 247–254, Nov. 6–8, 1990.

Iwata, "Pen–based Haptic Virtual Enviroment," 0–7803–1363–Jan. 1993 IEEE, pp. 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation –A State –of–the–Art Technology Survey and Evaluation," JP Publication 85–11; NASA–CR–175890; N85–28559, pp. 1–84, Mar. 01, 1985.

Jones et al., "A perceptual analysis of stiffness," ISSN 0014–4819 Springer International (Springer–Verlag), Experimental Brain Research, vol. 79, No. 1, pp. 150–156, 1990.

Burdea et al., "Distributed Virtual Force Feedback, Lecture Notes for Workshop on Force Display in Virtual Enviroments and its Application to Robotic Teleoperation," 1993 IEEE International Conference on Robotics and Automation, pp. 25–44, May 02, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking,"Order No. 9034744, pp. 1–369, 1990.

Tadros, Control System Design for a Three Degree of Freedom Virtual Environment Simulator Using Motor/Brake Pair Actuators, MIT Archive © Massachusetts Institute of Technology, pp. 1–88, Feb. 1990.

Caldwell et al., "Enhanced Tactile Feedback (Tele–Taction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, Advances in Robotics, pp. 55–61, ASME 1992.

Russok, "Controlling Dissipative Magnetic Particle Brakes in Force Refelctive Devices," DSC–vol. 42, Advances in Robotics, pp. 63–70, ASME 1992.

Kontarinis et al., "Display of High–Frequency Tactile Information to Teleoperators."Telemanipulator Technology and Space Telerobotics, Won. S. Kim, Editor, Proc. SPIE vol. 2057, pp. 40–50, Sep. 7–8, 1993.

Patrick et al., "Design and Testing of A Non–reactive, Fingertip, Tactile Display for Interaction with Remote Enviroments,"cooperative Intelligent Robotics in Space. Rui J. deFigueiredo et al., Editor, Proc. SPIE vol. 1387, pp. 215–222. 1990.

Adelstein, "A Virtual Environment System For The Study of Human Am Tremor," Ph. D Dissertation, Dept. of Mechanical Engineering, MIT, June 1989.

Bejczy, "Sensors, Control, and Man–Machine Interface for Advanced Teleoperation," Science, vol. 208, No. 4450, pp. 1327–1335, 1980.

Bejczy, "Generalization of Bilateral Force–Reflecting Control of Manipulators,"Proceedings of Fourth CISM–IFToMM, Sep. 8–12, 1981.

McAffee, "Teleoperator Subsystem/Telerobot Demonsdtrator: Force Reflecting Hand Controller Equipment Manual," JPLD–5172, pp. 1–50, A–A1A36, B–1B–5, C1–C36, Jan. 1988.

Minsky, "computational Haptics: The Sandpaper System for Synthesizing Texture for a Force–Feedback Display,"Ph. D Dissertation, MIT, Jun. 1995.

Jacobsen et al., "High Performance, Desxtrous Telerobitic Manipulator With force Reflection," Intervention/ROV '91 Conference & Exposition, Hollywood, Florida, May 21–23, 1991.

Shimoga, "Finger Force and Touch Feedback Issues in Desterous Telemanipulation," Proceedings of Fourth Annual Conference on Intelligent Robotic Systems for Space Exploration, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback in A Computer Mouse," Proceedings of Fouteenth Annual Northeast Bioengineering Conference., University of New Hampshire, Mar. 10–11, 1988.

Howe, "A Force–Reflecting Teleoperated Hand System for the Study of Tactile Sensing in Presision Manipulation," Proceedings of the 1992 IEEE International Conference on Robotics and Automation, Nice, France, May 1992.

Eberhardt et al., "OMAR–A Haptic display for speech perception by deaf and deaf–blind individuals," IEEE Virtual Reality Annual International Symposiom, Seattle, WA, Sep. 18–22, 1993.

Rabinowitz et al., "Multidimensional tavtile displays: Identification of vibratory intensity, frequency and contractor area," Journal of The Acoustical Society of America, vol. 82, No. 4, Oct. 1987.

Bejczy et al., "Kinesthetic Coupling Between Operator and Remote Manipulator,"International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joustick and Its Use in PC Video Games," IEEE Transaction on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

RATE CONTROL COMMANDS

| FORCE | EXAMPLE OF COMMAND AND PARAMETERS | SUBCLASS |
|---|---|---|
| RESTORING | R_FORCE (MAGNITUDE, DURATION, STYLE, DEADBAND) | CONDITION |
| RESTORING SPRING | R_SPRING (COEFFICIENT, DURATION, STYLE, DEADBAND) | CONDITION |
| SLUGGISH STICK | SLUG (COEFFICIENT, DURATION, STYLE) | CONDITION |
| UNSTABLE | UNSTABLE (MAGNITUDE, DURATION, STYLE) | CONDITION |
| VECTOR | V_FORCE (MAGNITUDE, DURATION, DIRECTION) | OVERLAY |
| VIBRATION | V_VIBRATE (MAGNITUDE, DURATION, DIRECTION, FREQUENCY, STYLE) | OVERLAY |
| WOBBLE | WOBBLE (MAGNITUDE, DURATION, STYLE) | OVERLAY |
| BUTTON | B_FORCE (MAGNITUDE, DURATION, DIRECTION, BUTTON, AUTOFIRE) | OVERLAY/ CONDITION |
| JOLT | JOLT (MAGNITUDE, DURATION, DIRECTION) | OVERLAY |

*Figure 9*

POSITION CONTROL COMMANDS

| FORCE | EXAMPLE OF COMMAND AND PARAMETERS |
|---|---|
| VECTOR | P_FORCE (MAGNITUDE, DIRECTION) |
| GROOVE | GROOVE (MAGNITUDE, STYLE, SNAP-DISTANCE) |
| DIVOT | DIVOT (MAGNITUDE, STYLE, SNAP-DISTANCE) |
| TEXTURE | TEXTURE (MAGNITUDE, DENSITY, STYLE) |
| BARRIER | X_BARRIER (MAGNITUDE, LOCATION, SNAP-DISTANCE) |
| FIELD | FIELD (MAGNITUDE, ORIGIN, SENSE) |
| PADDLE | PADDLE (MASS, GRAVITY, COMPLIANCE, SENSE) |
| BUTTON | BUTTON (MAGNITUDE, DIRECTION, BUTTON, AUTOFIRE) |

*Figure 14*

| | $B_X(+)$ | $B_X(-)$ | $B_Y(+)$ | $B_Y(-)$ |
|---|---|---|---|---|
| | 50 | 50 | 0 | 0 |
| | 90 | 50 | 0 | 0 |
| | 90 | 50 | 0 | 0 |

SLUGGISH FORCE PARAMETERS

| $K_X(+)$ | $K_X(-)$ | $K_Y(+)$ | $K_Y(-)$ | $DB_X$ | $DB_Y$ |
|---|---|---|---|---|---|
| 0 | 0 | 0 | 0 | 0 | 0 |
| 0 | 0 | 0 | 0 | 0 | 0 |
| 65 | 65 | 0 | 0 | 85 | 0 |

RESTORING SPRING FORCE PARAMETERS

SLUGGISH (50, X, BI)
SLUGGISH (90, X(+), UNI)
SPRING (65, X, BI, 85)

*Figure 23*

TACTILE FEEDBACK DEVICE PROVIDING TACTILE SENSATIONS FROM HOST COMMANDS

CROSS REFERENCE TO RELATED APPLICATIONS

This application is a continuation of parent U.S. patent application Ser. No. 09/050,665, filed Mar. 30, 1998, which is a continuation of U.S. patent application Ser. No. 08/566,282, filed Dec. 1, 1995, now U.S. Pat. No. 5,734,373, which is a continuation-in-part of U.S patent applications Ser. No. 08/534,791, filed Sep. 27, 1995, now U.S. Pat. No. 5,739,811, and A CIP of Ser. No. 08/461,170, filed Jun. 5, 1995, now U.S. Pat. No. 5,576,727, which is a continuation of application Ser. No. 08/092,974, filed Jul. 16, 1993, now abandoned, all of which are incorporated herein by reference in their entirety.

BACKGROUND OF THE INVENTION

The present invention relates generally to interface devices between humans and computers, and more particularly to computer interface devices that provide force feedback to the user.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or "virtual reality" environment, or otherwise influence events or images depicted on the screen. Such user interaction can be implemented through the use of a human-computer interface device, such as a joystick, "joypad" button controller, mouse, trackball, stylus and tablet, or the like, that is connected to the computer system controlling the displayed environment. The computer updates the simulation or game in response to the user's manipulation of an object such as a joystick handle or mouse, and provides feedback to the user utilizing the display screen and, typically, audio speakers.

In some interface devices, tactile ("haptic") feedback is also provided to the user, more generally known as "force feedback." These types of interface devices can provide physical sensations to the user manipulating the object of the interface device. Typically, motors or other actuators are coupled to the object and are connected to the controlling computer system. The computer system can provide forces on the object in conjunction with simulation/game events by sending control signals to the actuators. The computer system can thus convey physical sensations to the user in conjunction with other supplied feedback as the user is grasping or contacting the object of the interface device. Force feedback interface devices can thus provide a whole new modality for human-computer interaction.

Force feedback input/output (I/O) devices of the prior art have concentrated on providing maximum haptic fidelity, i.e., the realism of the tactile feedback was desired to be optimized. This is because most of the force feedback devices have been targeted at the specific needs of highly industrial applications, and not a mass consumer market. To attain such realism, mass market design concerns such as low size and weight, low complexity, programming compatibility, low cost, and safety have been sacrificed in the prior art. As a result, typical force feedback interface devices include complex robotic mechanisms which require precision components and expensive actuators.

An important concern for a force feedback interface device is communication bandwidth between the controlling computer and the interface device. To provide realistic force feedback, the complex devices of the prior art typically use high speed communication electronics that allow the controlling computer to quickly update force feedback signals to the interface device. The more quickly the controlling computer can send and receive signals to and from the interface device, the more accurately and realistically the desired forces can be applied on the interface object. In addition, using a high bandwidth communication interface, force feedback can be accurately coordinated with other supplied feedback, such as images on the video screen, and with user inputs such as movement of the object, activated buttons, etc. For example, a user can grasp and move a force feedback joystick in a simulation to control an image of a car to drive over a virtual bumpy surface displayed on a screen. The controlling computer should provide control signals to the actuators of the joystick quickly enough so that the surface feels as realistically bumpy as the designer of the simulation intended. If the control signals are too slow, a realistic feeling of bumpiness is more difficult to provide. Also, the controlling computer needs a high bandwidth communication interface to accurately coordinate the supplied forces with the visual feedback on the screen, such as the moment on the screen when the car first contacts the bumpy surface. This high speed is likewise needed to accurately coordinate supplied forces with any input from the user, for example, to steer the car in particular directions.

A problem is evident when prior art force feedback interface devices are provided to the mass consumer market. Most home computers have a built-in standard serial communication interfaces, such as an RS-232 or RS422 interface, that may conveniently be used to connect peripherals like a force feedback interface device to the host computer. In addition, manufacturers prefer to provide peripheral devices that use these serial interfaces, since no additional hardware, such as interface cards, needs to be provided with such peripherals. The manufacturing cost of the peripheral device can thus be significantly reduced. However, these standard serial communication interfaces are typically quite slow (i.e. have low bandwidth) compared to other communicaton interfaces. Realistic and accurate force feedback thus becomes difficult to provide by a controlling computer system to a prior art interface device connected through such a serial interface. For example, U.S. Pat. No. 5,184,319, by J. Kramer, describes a force feedback device that applies forces to a user's body parts. However, the Kramer device is typical of the prior art in that the host computer directly controls the actuators and directly receives the sensor data from the interface apparatus. Such a device is not suitable for a low bandwidth communication interface to achieve realistic force feedback.

Another problem with using prior art force feedback interface devices in the mass consumer market is the wide variety of computer platforms and processing speeds that are used on different computers and on the same computer at different times. The force sensations provided to a user by a force feedback interface device may feel different to a user on different computer platforms or microprocessors, since these different computers run at different speeds. For example, the force feedback controlled by a 100 MHz computer may be much different from the force feedback controlled by a 60 MHz computer due to the different rates of processing control signals, even though these forces are intended to feel the same. In addition, the effective processing speed of one microprocessor can vary over time to provide inconsistent forces over multiple user sessions. For example, multitasking can vary or delay a microprocessor's management of force feedback control signals depending on other programs that are running on the microprocessor.

In addition, there is no standardized language or communication protocol for communicating with force feedback devices. A software developer that wishes to provide force feedback to an interface in a software application must currently set up his or her own specialized commands and/or communications protocols and must implement the force feedback controlling instructions at a low level. This requires unnecessary time and expense in the development of software applications that include features directed toward force feedback interfaces.

Therefore, a more realistic, cost effective, and standardized alternative to force feedback interfaces and force feedback control paradigms is desired for certain applications.

SUMMARY OF THE INVENTION

The present invention is directed to controlling and providing force feedback to a user operating a human/computer interface device. The interface device is connected to a controlling host computer and includes a separate microprocessor local to the interface device. The local microprocessor receives high-level host commands and implements independent reflex processes.

More particularly, a system and method of the present invention for controlling an interface apparatus manipulated by a user includes a host computer system for receiving an input control signal and for providing a host command. The host computer updates a host application process, such as a simulation or video game, in response to the input control signal. A microprocessor local to the interface apparatus and separate from the host computer receives the host command and provides a processor output control signal. An actuator receives the processor output control signal and provides a force along a degree of freedom to a user-manipulated object, such as a joystick, in accordance with the processor output control signal. A sensor detects motion of the user object along the degree of freedom and outputs the input control signal including information representative of the position and motion of the object. Preferably, the sensor outputs the input control signal to the local microprocessor, which outputs the input control signal to the host computer. The user object is preferably grasped and moved by the user, and can include such articles as a joystick, mouse, simulated medical instrument, stylus, or other object. The user object can preferably be moved in one or more degrees of freedom using, for example, a gimbal or slotted yoke mechanism, where an actuator and sensor can be provided for each degree of freedom.

The application process updated by the host computer system preferably includes application software that can be simulation software, game software, scientific software, etc. The host computer system displays images on a visual output device such as a display screen and synchronizes the images and visual events with the position and motion of the user object as well as forces applied to the object. The present invention can use a standard serial interface included on many computers to interface the host computer system with the local microprocessor. A clock is preferably coupled to the host computer system and/or the local processor which can be accessed for timing data to help determine the force output by the actuator.

In the preferred "reflex" embodiment, the host computer receives the sensor information in a supervisory mode and outputs a high level host command to the microprocessor whenever a force is required to be applied to the user object or changed. In accordance with the high level host command, the microprocessor reads sensor and timing data and outputs force values to the actuator according to a reflex process that is selected. The reflex process can include using force equations, reading force profiles of predetermined force values from a storage device, or other steps, and may be dependent on sensor data, timing data, host command data, or other data. The processor thus implements a reflex to control forces independently of the host computer until the host computer changes the type of force applied to the user object.

The invention also provides a paradigm for force commands between the host computer and the local microprocessor. The high level host commands provided by the host computer can be rate control and/or position control commands, and may include information in the form of command parameters. By providing a relatively small set of commands and command parameters which are translated into a panoply of forces, the paradigm further shifts the computational burden from the host computer to the local microprocessor. Host commands may include commands to provide forces on the user object such as restoring forces, vibration forces, texture forces, a barrier forces, attractive/repulsive force fields, damping forces, groove forces, and a paddle-ball force. Typical command parameters include a magnitude parameter, a duration parameter, a direction parameter, a style parameter, and a button parameter to control the force output by the actuator. This provides a high level, standard force feedback command protocol for the efficient use by developers of force feedback software to be implemented on the host computer system.

A preferred implementation of the functionality of the local microprocessor is also provided. A command process receives a host command from the host computer and processes the host command and any command parameters included in the host command. Force parameters are derived from the host command and the command parameter and are stored in memory. Preferably, every host command has a set of force parameters associated with it to be updated when the appropriate host command is received. A status update process reads sensor data from the sensors describing a motion of the user object. The status update process can also compute velocity, acceleration, or other time-related values if appropriate. A force output process computes a force value using a reflex process selected in accordance with the force parameters and the sensor data. In some instances, the force value may depend on the values of the force parameters and sensor data. The force output process outputs a force on the user object by sending the computed force value to the actuators. In addition, a reporting process reports the sensor data to the host computer system when appropriate. Preferably, a plurality of host commands can be in effect simultaneously, where a force value is summed from a reflex process corresponding to each such host command in effect. Also, parameter page(s) of sets of parameters can conveniently be stored in memory to allow different force environments to be selected.

The control system and method of the present invention advantageously includes a separate processor local to the interface device that is separate from the host computer system. The local processor can read and process sensor signals as well as output force command signals independently of the host computer, thus saving significant processing time on the host computer. In addition, the use of the local processor to handle low-level force feedback commands allows more realistic and accurate force feedback to be provided to an object manipulated by a user when using a serial or other relatively low-bandwidth communication interface between the host and the interface device, since such low level force signals do not have to be transmitted over the communication interface. The use of specific, high level host commands to command a variety of types of forces allows force feedback host applications to be easily created. These improvements allow a computer system to provide accurate and realistic force feedback over a low-cost, low bandwidth communication interface and is thus ideal for the mass market of home computer systems.

These and other advantages of the present invention will become apparent to those skilled in the art upon a reading of the following specification of the invention and a study of the several figures of the drawing.

BRIEF DESCRIPTION OF THE DRAWINGS

FIG. 9 is a table summarizing rate control commands of the present invention;

FIG. 14 is a table summarizing position control commands of the present invention;

FIG. 23 is a diagrammatic representation of force parameters and a sequence of force commands as used in the present invention.

DETAILED DESCRIPTION OF PREFERRED EMBODIMENTS

Figure 1:
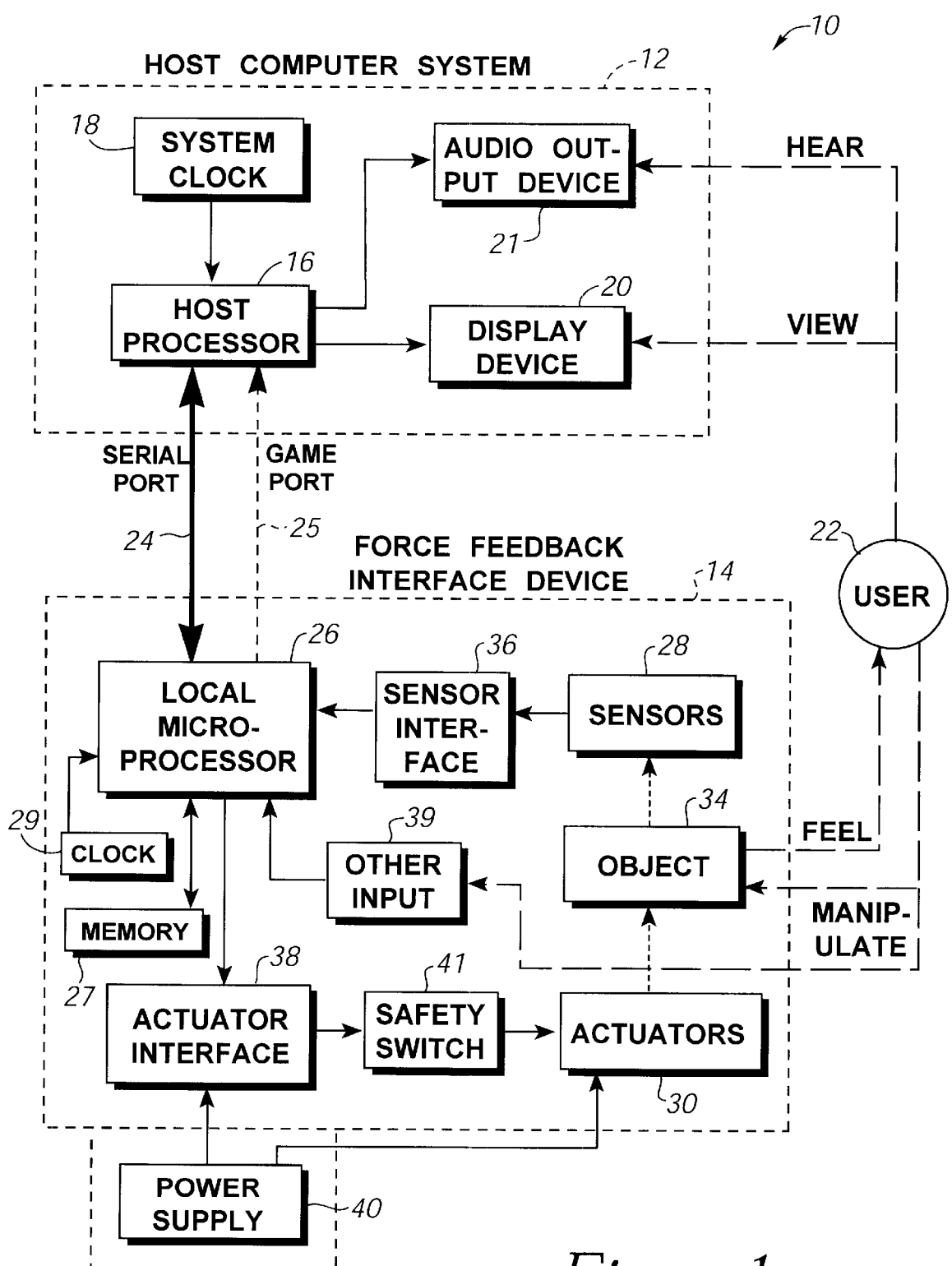
FIG. 1 is a block diagram of a control system in accordance with the present invention for controlling a force feedback interface device from a host computer.

FIG. 1 is a block diagram illustrating a generic control system 10 of the present invention for an interface device controlled by a host computer system. Control system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a "set top box" which can be used, for example, to provide interactive television functions to users.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, Motorola, or other manufacturers. Microprocessor 16 can be single microprocessor chip, or can include multiple primary and/or co-processors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device 14 and other information. Microprocessor 16 can receive data from bus 24 using I/O electronics 21, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer controlled "entity".

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires or other connections and that can be implemented in a variety of ways, as described below. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art.

For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data. The USB has several useful features for the present invention, as described throughout this specification.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in card and slot or other access of computer system 12. For example, on an IBM AT compatible computer, the interface card can be implemented as an ISA, EISA, VESA local bus, PCI, or other well-known standard interface card which plugs into the motherboard of the computer and provides input and output ports connected to the main data bus of the computer.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide a increased data bandwidth. For example, microprocessor 26 can send sensor signals to host computer 12 via a uni-directional bus 25 and a game port, while host computer 12 can output force feedback signals from a serial port to microprocessor 26 via a uni-directional bus 24. Other combinations of data flow configurations can be implemented in other embodiments.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered "local" to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and a reflex process (also referred to as a "subroutine" or "force sensation process" herein) selected in accordance with a host command. Suitable microprocessors for use as local microprocessor 26 include the MC68HC711E9 by Motorola and the PIC16C74 by Microchip, for example. Microprocessor 26 can include one microprocessor chip, or multiple processors and/or co-processor chips. In other embodiments, microprocessor 26 can includes a digital signal processor (DSP) chip. Local memory 27, such as RAM and/or ROM, is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from USB signal. The USB has a clock signal encoded with the data stream which can be used. Alternatively, the Isochronous (stream) mode of USB can be used to derive timing information from the standard data transfer rate. The USB also has a Sample Clock, Bus Clock, and Service Clock that also may be used.

For example, in one embodiment, host computer 12 can provide low-level force commands over bus 24, which microprocessor 26 directly provides to actuators 30. This embodiment is described in greater detail with respect to FIG. 4. In a different embodiment, host computer system 12 can provide high level supervisory commands to microprocessor 26 over bus 24, and microprocessor 26 manages low level force control ("reflex") loops to sensors 28 and actuators 30 in accordance with the high level commands. This embodiment is described in greater detail with respect to FIG. 5.

Microprocessor 26 preferably also has access to an electrically erasable programmable ROM (EEPROM) or other memory storage device 27 for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The calibration parameters are used by processor 26 to modify the input sensor signals and/or output force values to actuators 30 to provide approximately the same range of forces on object 34 in a large number of manufactured interface devices 14. The implementation of calibration parameters is well-known to those skilled in the art.

Microprocessor 26 can also receive commands from any other input devices included on interface apparatus 14 and provides appropriate signals to host computer 12 to indicate that the input information has been received and any information included in the input information. For example, buttons, switches, dials, or other input controls on interface device 14 or user object 34 can provide signals to microprocessor 26.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Some embodiments of such mechanisms are described with reference to FIGS. 7–12.

Sensors 28 sense the position, motion, and/or other characteristics of a user object 34 of the interface device 14 along one or more degrees of freedom and provide signals to microprocessor 26 including information representative of those characteristics. Examples of embodiments of user objects and movement within provided degrees of freedom are described subsequently with respect to FIGS. 7 and 8. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the change in position of object 34 along a linear degree of freedom, and can produces the two phase-related signals in response to movement of a linear shaft in the linear degree of freedom. Either relative or absolute sensors can be used. For example, relative sensors only provide relative angle information, and thus usually require some form of calibration step which provide a reference position for the relative angle information. The sensors described herein are primarily relative sensors. In consequence, there is an implied calibration step after system power-up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art and, therefore, will not be discussed in any great detail herein. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives the two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in parent U.S. Pat. No. 5,576,727 describes a sensor interface including a separate processing chip dedicated to each sensor that provides input data. Alternately, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC. However, noise can sometimes mask small movements of object 34 from an analog sensor, which can potentially mask the play that is important to some embodiments of the present invention (described subsequently).

Other types of interface circuitry 36 can also be used. For example, an electronic interface is described in U.S. Pat. No. 5,576,727, entitled, "Electromechanical Human-Computer Interface with Force Feedback", previously incorporated herein. The interface allows the position of the mouse or stylus to be tracked and provides force feedback to the stylus using sensors and actuators. Sensor interface 36 can include angle determining chips to pre-process angle signals reads from sensors 28 before sending them to the microprocessor 26. For example, a data bus plus chip-enable lines allow any of the angle determining chips to communicate with the microprocessor. A configuration without angle-determining chips is most applicable in an embodiment having absolute sensors, which have output signals directly indicating the angles without any further processing, thereby requiring less computation for the microprocessor 26 and thus little if any pre-processing. If the sensors 28 are relative sensors, which indicate only the change in an angle and which require further processing for complete determination of the angle, then angle-determining chips are more appropriate.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil actuator, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight generated forces. Passive actuators typically can only provide bi-directional resistance to a degree of motion. A suitable magnetic particle brake for interface device 14 is available from Force Limited, Inc. of Santa Monica, Calif.

In alternate embodiments, all or some of sensors 28 and actuators 30 can be included together as a sensor/actuator pair transducer. A suitable transducer for the present invention including both an optical encoder and current controlled motor is a 20 W basket wound servo motor manufactured by Maxon.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. An example of an actuator interface for active actuators is described with reference to FIG. 2. An example of an actuator interface for passive actuators is described with reference to FIG. 3. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Alternatively, if the USB or a similar communication protocol is used, interface device 14 can draw power from the USB and thus have no need for power supply 40. This embodiment is most applicable to a device 14 having passive actuators 30, since passive actuators require little power to operate. Active actuators tend to require more power than can be drawn from USB, but this restriction can be overcome in a number of ways. One way is to configure interface 14 to appear as more than one peripheral to host computer 12; for example, each provided degree of freedom of user object 34 can be configured as a different peripheral and receive its own allocation of power. This would allow host 12 to allocate more power to interface device 14. Alternatively, power from the USB can be stored and regulated by interface device 14 and thus used when needed to drive actuators 30. For example, power can be stored over time and then immediately dissipated to provide a jolt force to the user object 34. A capacitor circuit, for example, can store the energy and dissipate the energy when enough power has been stored. Microprocessor may have to regulate the output of forces to assure that time is allowed for power to be stored. This power storage embodiment can. also be used in non-USB embodiments of interface device 14 to allow a smaller power supply 40 to be used.

Safety switch 41 is preferably included in interface device to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is deactivated. For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing ambient light, and the switch is closed. The actuators 30 thus will function as long as the user covers the switch. Other types of safety switches 41 can be provided in other embodiments. For example, an electrostatic contact switch can be used to sense contact, a button or trigger can be pressed, or a different type of sensor switch can be used.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, medical instrument (laparoscope, catheter, etc.), pool cue, hand grip, knob, button, or other article.

Figure 2:
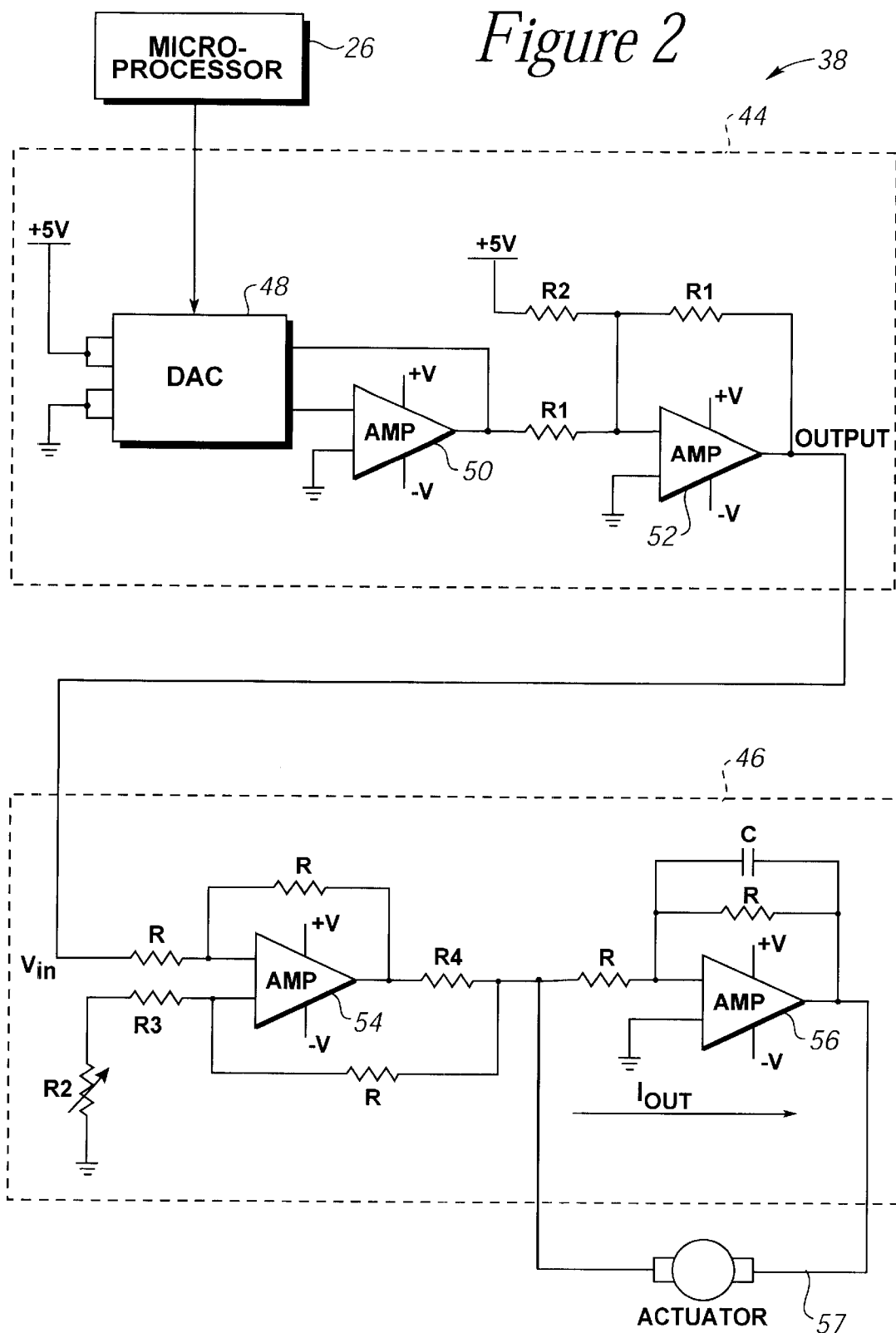
FIG. 2 is a schematic diagram of an actuator interface for providing control signals to an active actuator for the present invention.

FIG. 2 is a schematic diagram illustrating an example of an actuator interface 38 for an active actuator 30 of interface device 14. In this example, actuator 30 is a linear current controlled servo motor. Actuator interface 38 includes a DAC circuit 44 and a power amplifier circuit 46.

DAC circuit 44 is coupled to microprocessor 26 and preferably receives a digital signal representing a force value from the microprocessor 26. DAC 48 is suitable for converting an input digital signal to an analog voltage that is output to power amplifier circuit 46. A suitable DAC 48 is a parallel DAC, such as the DAC1220 manufactured by National Semiconductor, which is designed to operate with external generic op amp 50. Op amp 50, for example, outputs a signal from zero to −5 volts proportional to the binary number at its input. Op amp 52 is an inverting summing amplifier that converts the output voltage to a symmetrical bipolar range. Op amp 52 produces an output signal between −2.5 V and +2.5 V by inverting the output of op amp 50 and subtracting 2.5 volts from that output; this output signal is suitable for power amplification in amplification circuit 46. As an example, R1=200 kW and R2=400 kW. Of course, DAC circuit 44 is intended as one example of many possible circuits that can be used to convert a digital signal to a desired analog signal.

Power amplifier circuit 46 receives an analog low-power control voltage from DAC circuit 44 and amplifies the voltage to control actuators 30. Actuator 30 can be a high-power, current-controlled servo motor 30. The input voltage controls a transconductance stage composed of amplifier 54 and several resistors. The transconductance stage produces an output current proportional to the input voltage to drive motor 30 while drawing very little current from the input voltage source. The second amplifier stage, including amplifier 56, resistors, and a capacitor C, provides additional current capacity by enhancing the voltage swing of the second terminal 57 of motor 30. As example values for power amplifier circuit 46, R=10 kW, R2=500 W, R3=9.75 kW, and R4=1 W. Of course, circuit 46 is intended as one example of many possible circuits that can be used to amplify voltages to drive active actuators 30.

Figure 3:
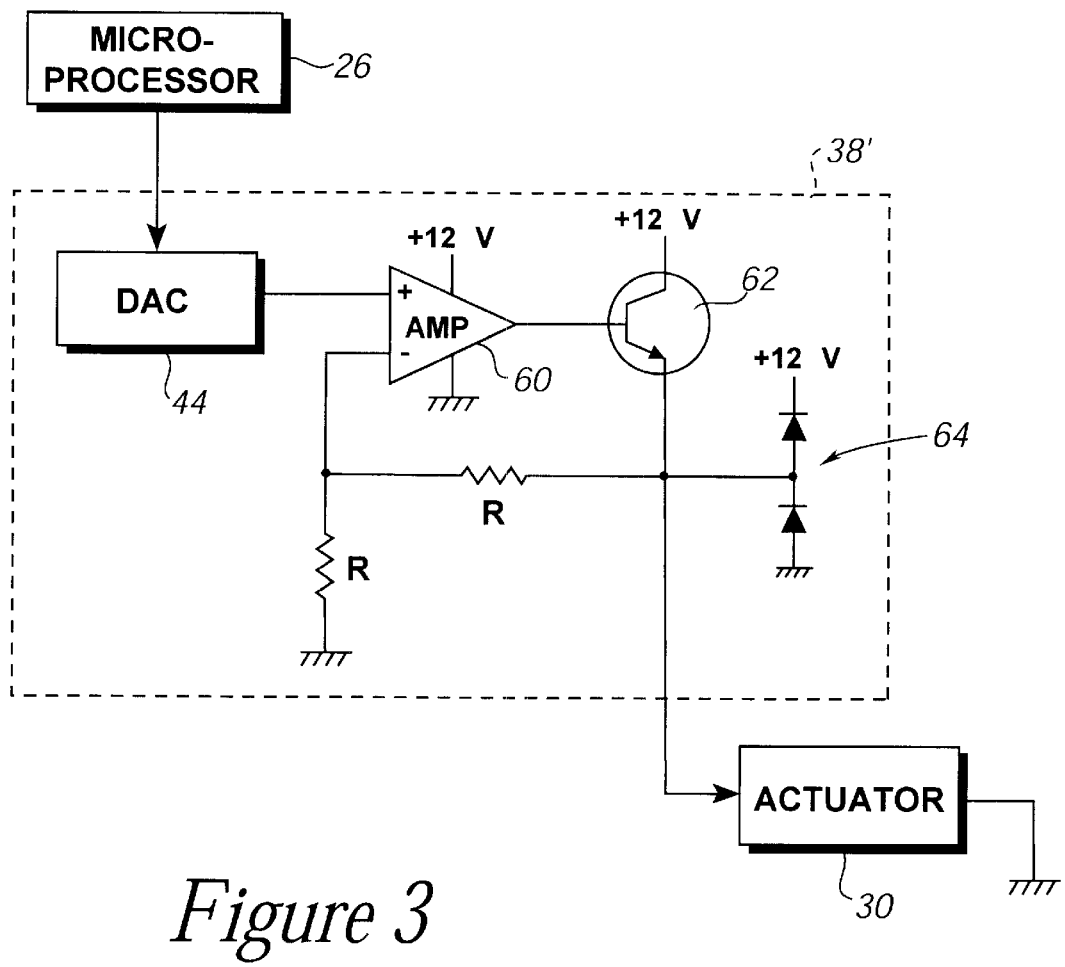
FIG. 3 is a schematic diagram of an actuator interface for providing control signals to a passive actuator for the present invention.

FIG. 3 is a schematic diagram illustrating an example of an actuator interface 38' that can be used in conjunction with passive actuators. Interface 38' is suitable for use with passive actuators (dampers) that are controlled with an analog voltage, such as magnetic particle brakes or a variable solenoid used with the fluid controlled passive dampers of U.S. Pat. No. 5,721,566. Interface 38' includes a DAC circuit 44, amplifier 60, transistor 62, and voltage protector 64. DAC circuit 44 is coupled to microprocessor 26 and receives a digital signal from the computer system representing a resistive force value to be applied to user object 34. DAC circuit 44 converts the digital signal voltages to analog voltages which are then output to amplifier 60. A suitable DAC is the MAX530ACNG manufactured by Maxim, or DAC circuit 44 as described above with reference to FIG. 2. Amplifier 60 receives the analog voltage from DAC 44 on a positive terminal and scales the voltage signal to a range usable by actuator 30. Amplifier 60 can be implemented as an operational amplifier or the like. Transistor 62 is coupled to the output of amplifier 60 and preferably operates as an amplifier to provide increased output current to actuator 30. Resistor R1 is coupled between amplifier 60 and the emitter of transistor 62, and resistor R2 is coupled between amplifier 60 and ground. For example, resistors R1 and R2 can have values of 180 kΩ and 120 kΩ, respectively, and provide the proper biasing in the circuit. Voltage protector 64 is coupled to the emitter of transistor 62 and provides protection from voltage spikes when using inductive loads. Suitable passive actuators 30 for use with this circuitry includes variable solenoids or magnetic particle brakes. A separate DAC and amplifier can be used for each actuator 30 implemented in the interface apparatus so the microprocessor 26 and/or host computer system 12 can control each actuator separately for each provided degree of freedom. Interface 38' is intended as one example of many possible circuits that can be used to interface a computer system to actuators.

In an alternate embodiment, an on/off signal might only be needed, for example, for a solenoid driving an on/off valve of a fluid-controlled actuator as described in co-pending U.S. Pat. No. 5,721,566 and below in FIG. 10. In such an embodiment, for example, a transistor can be electrically coupled to microprocessor 26 at its base terminal to operate as an electrical switch for controlling the activation of a solenoid in the on/off actuator 30. A force signal such as a TTL logic signal can be sent to control the transistor to either allow current to flow through the solenoid to activate it and allow free movement of object 43, or to allow no current to flow to deactivate the solenoid and provide resistance to movement.

Figure 4:
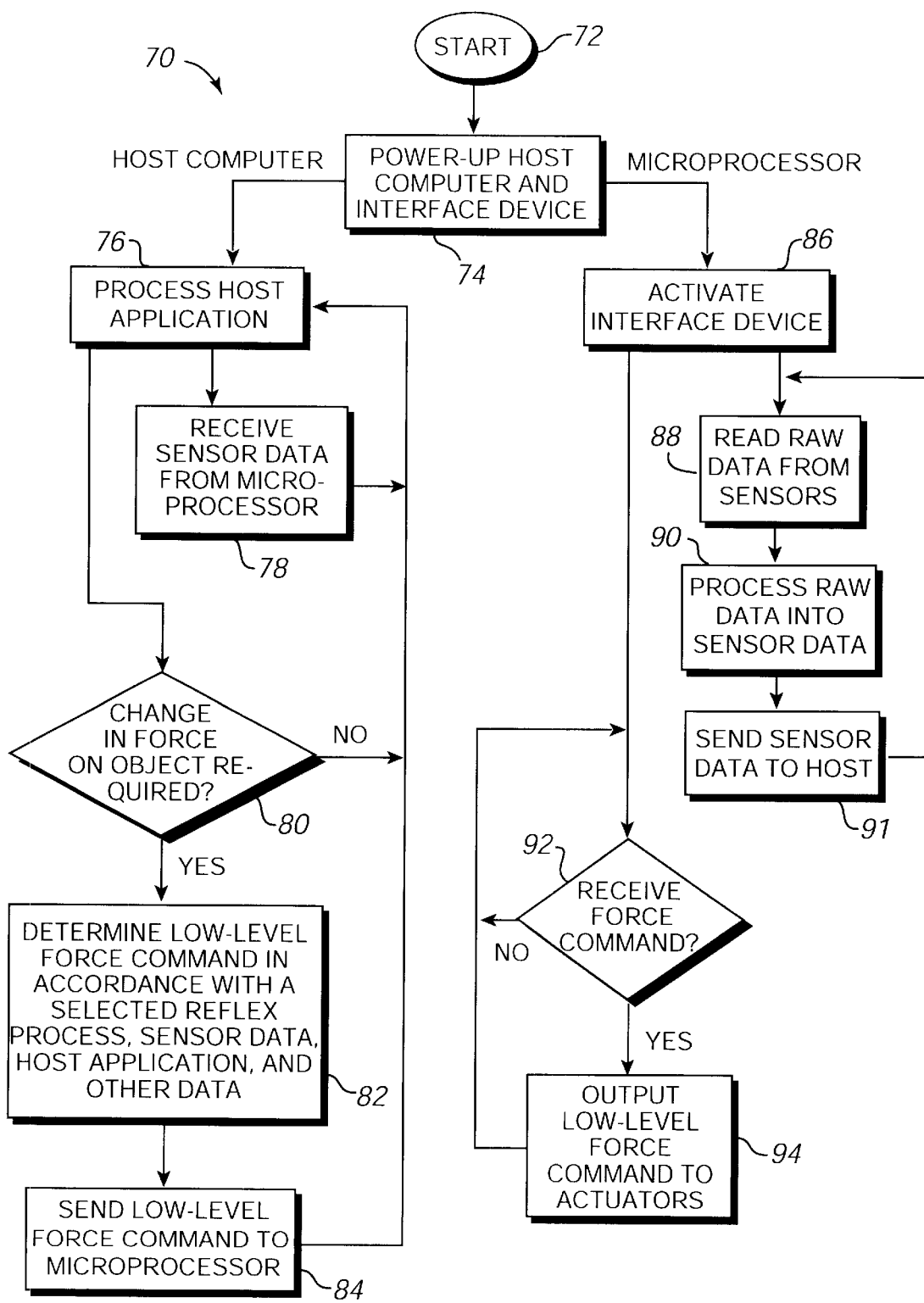
FIG. 4 is a flow diagram illustrating a first embodiment of a method of the present invention for controlling a force feedback interface device.

FIG. 4 is a flow diagram illustrating a first embodiment of a method 70 for controlling a force feedback interface device of the present invention. Method 70 is directed to a "host-controlled" embodiment, in which host computer system 12 provides direct, low-level force commands to microprocessor 26, and the microprocessor directly provides these force commands to actuators 30 to control forces output by the actuators.

For example, the host controlled mode is suitable for embodiments using a USB communication interface. Data rates are sufficiently high to allow the host to communicate at 500 Hz or greater and provide realistic force feedback to the user object 34. The USB Isochronous Data Transfer mode of USB is suitable to provide the necessary high data rate.

The process begins at 72. In step 74, host computer system 12 and interface device 14 are powered up, for example, by a user activating power switches. After step 74, the process 70 branches into two parallel (simultaneous) processes. One process is implemented on host computer system 12, and the other process is implemented on local microprocessor 26. These two processes branch out of step 74 in different directions to indicate this simultaneity.

In the host computer system process, step 76 is first implemented, in which an application program is processed or updated. This application can be a simulation, video game, scientific program, or other program. Images can be displayed for a user on output display screen 20 and other feedback can be presented, such as audio feedback.

Two branches exit step 76 to indicate that there are two processes running simultaneously (multitasking) on host computer system 12. In one process, step 78 is implemented, where sensor data is received by the host computer from local microprocessor 26. As detailed below in the microprocessor process, the local processor 26 continually receives signals from sensors 28, processes the raw data, and sends processed sensor data to host computer 12, Alternatively, local processor 26 sends raw data directly to host computer system 12. "Sensor data", as referred to herein, can include position values, velocity values, and/or acceleration values derived from the sensors 28 which detect motion of object 34 in one or more degrees of freedom. In addition, any other data received from other input devices 39 can also be received by host computer system 12 as sensor data in step 78, such as signals indicating a button on interface device 14 has been activated by the user. Finally, the term "sensor data" also can include a history of values, such as position values recorded previously and stored in order to calculate a velocity.

After sensor data is read in step 78, the process returns to step 76, where the host computer system 12 can update the application program in response to the user's manipulations of object 34 and any other user input received in step 78 as well as determine if forces need to be applied to object 34 in the parallel process. Step 78 is implemented in a continual loop of reading data from local processor 26.

The second branch from step 76 is concerned with the process of the host computer determining force commands to provide force feedback to the user manipulating object 34. These commands are described herein as "low-level" force commands, as distinguished from the "high-level" or supervisory force commands described in the embodiment of FIG. 5. A low level force command instructs an actuator to output a force of a particular magnitude. For example, the low level command typically includes a magnitude force value, e.g., equivalent signal(s) to instruct the actuator to apply a force of a desired magnitude value. Low level force commands may also designate a direction of force if an actuator can apply force in a selected direction, and/or other low-level information as required by an actuator.

The second branch starts with step 80, in which the host computer system checks if a change in the force applied to user object 34 is required. This can be determined by several types of criteria, the most important of which are the sensor data read by the host computer in step 78, timing data, and the implementation or "events" of the application program updated in step 76. The sensor data read in step 78 informs the host computer 12 how the user is interacting with the application program. From the position of object 34 sensed over time, the host computer system 12 can determine when forces should be applied to the object. For example, if the host computer is implementing a video game application, the position of a computer generated object within the game may determine if a change in force feedback is called for. If the user is controlling a simulated race car, the position of the user object joystick determines if the race car is moving into a wall and thus if a collision force should be generated on the joystick. In addition, the velocity and/or acceleration of the user object can influence whether a change in force on the object is required. If the user is controlling a tennis racket in a game, the velocity of a user object joystick in a particular degree of freedom may determine if a tennis ball is hit and this if an appropriate force should be applied to the joystick. Also, other input, such as a user activating buttons or other controls on interface device 14, can change the forces required on object 34 depending on how those controls have been programmed to affect the application program.

Other criteria for determining if a change in force is required includes events in the application program. For example, a game application program may (perhaps randomly) determine that another object in the game is going to collide with an object controlled by the user, regardless of the position data of the user object 34. Forces should thus be applied to the user object dependent on this collision event to simulate an impact. Forces can be required on the user object depending on a combination of such an event and the sensor data read in step 78. Other parameters in the application program can determine if a change in force to the user object is necessary, such as other input devices or user interface devices connected to host computer system 12 and inputting data to the application program (other interface devices can be directly connected, connected remotely through a network, etc.).

If no change in force is currently required in step 80, then the process returns to step 76 to update the host application and return to step 80 to again check until such a change in force is required. When such a change is required, step 82 is implemented, in which host computer 12 determines appropriate low-level force commands to be sent to the actuators 30 of interface device 14, these force commands being dependent on a selected force sensation process, sensor data, the host application, and the clock 18.

The low-level force commands can be determined, in part, from a selected force sensation process. A "reflex process" or "force sensation process", as referred to herein, is a set of instructions for providing force commands dependent on other parameters, such as sensor data read in step 78 and timing data from clock 18. In the described embodiment, force sensation processes can include several different types of steps and/or instructions. One type of instruction is a force algorithm, which includes an equation that host computer 12 can use to calculate or model a force value based on sensor and timing data. Several types of algorithms can be used. For example, algorithms in which force varies linearly (or nonlinearly) with the position of object 34 can be used to provide a simulated force like a spring. Algorithms in which force varies linearly (or nonlinearly) with the velocity of object 34 can be also used to provide a simulated damping force or other forces. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, April 1993, which is incorporated by reference herein.

For force values depending on the velocity and acceleration of user object 34, the velocity and acceleration can be provided in a number of different ways. The sensor data read by host computer 12 in step 78 can include position data, velocity data, and acceleration data. In a preferred embodiment, the velocity and acceleration data was calculated previously by microprocessor 26 and then provided to the host computer 12. The host computer can thus use the velocity and acceleration data directly in an algorithm to calculate a force value. In an alternate embodiment, the sensor data read in step 78 includes position data and no velocity or acceleration data, so that host computer 12 is required to calculate the velocity and acceleration from the position data. This can be accomplished by recording a number of past position values, recording the time when each such position value was received using the system clock 18, and calculating a velocity and/or acceleration from such data.

For example, a kinematic equation which calculates a force based on the velocity of the user object multiplied by a damping constant can be used to determine a damping force on the user object. This type of equation can simulate motion of object 34 along one degree of freedom through a fluid or similar material. A procedure for calculating a damping force on object 34 is described in co-pending patent application Ser. No. 08/400,233, filed Mar. 3, 1995, entitled "Method and Apparatus for Providing Passive Force Feedback", which is hereby incorporated by reference herein. For example, a damping constant can first be selected which indicates the degree of resistance that object 34 experiences when moving through a simulated material, such as a liquid, where a greater number indicates greater resistance. For example, water would have a lower damping constant than oil or syrup. The host computer recalls the previous position of user object 34 (along a particular degree of freedom), examine the current position of the user object, and calculate the difference in position. From the sign (negative or positive) of the difference, the direction of the movement of object 34 can also be determined. The force is then set equal to the damping constant multiplied by the change in position. Commands that controlled an actuator based on this algorithm would produce a force proportional to the user object's motion to simulate movement through a fluid. Movement in other mediums, such as on a bumpy surface, on an inclined plane, etc., can be simulated in a similar fashion using different methods of calculating the force.

The determination of force commands is preferably influenced by timing data accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multi-tasking. Therefore, in the present invention, the host computer preferably accesses clock 12 to determine how much time has actually elapsed since the last position data was received. In the damping force example, the host computer could take the difference in position and divide it by a time measure to account for differences in timing. The host computer can thus use the clock's timing data in the modulation of forces and force sensations to the user. Timing data can be used in other algorithms and force sensation processes of the present invention to provide repeatable and consistent force feedback regardless of type of platform or available processing time on host computer 12.

Other instructions can also be included in a force sensation process. For example, conditions can be included to provide forces only in desired directions or under other particular circumstances. For example, to simulate a virtual obstruction such as a wall, forces should be applied in only one direction (uni-directional). For many passive actuators, only bi-directional resistance forces can be applied. To simulate uni-direction resistance, conditions can be included in the virtual obstruction force sensation process. An example of such conditions in a virtual obstruction force sensation process is described with respect to FIG. 12. Also, a "null" reflex process can be available that instructs host computer 12 (or microprocessor 26 in the embodiment of FIG. 5) to issue a low level command or force values to provide zero forces (i.e. remove all forces) on user object 34.

Another type of force sensation process does not use algorithms to model a force, but instead uses force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by a force sensation process to retrieve successive force values from a certain storage device, such as RAM, ROM, hard disk, etc. These force values can be sent directly to an actuator in a low-level command to provide particular forces without requiring host computer 12 to calculate the force values. In addition, previously-stored force values can be output with respect to other parameters to provide different types of forces and force sensations from one set of stored force values. For example, using system clock 18, the stored force values can be output in sequence according to a particular time interval that can vary depending on the desired force. Or, different retrieved force values can be output depending on the current position of user object 34.

Host computer 12 can determine a force command in step 82 according to a newly-selected reflex process, or to a previously selected reflex process. For example, if this is a second or later iteration of step 82, the same reflex process as in the previous iteration can be again implemented if parameters (such as the position of object 34) allow it, as determined by the host application program.

The force command determined in step 82 can also depend on instructions that check for other parameters. These instructions can be included within or external to the above-described reflex processes. One such parameter are values provided by the implemented host application program (if any). The application program may determine that a particular force command should be output or reflex process implemented based on events occurring within the application program or other instructions. Force commands or values can be provided by the host application program independently of sensor data. Also, the host application program can provide its own particular position, velocity, and/or acceleration data to a selected reflex process to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34. For example, the sensor data from multiple interface devices 14 connected to a single host computer can influence the forces felt on other connected interface devices by influencing events and computer-controlled images/objects of the host application program.

Also, the force commands determined in step 82 can be based on other inputs to host computer 12, such as activations of buttons or other input devices in (or external to) interface device 14. For example, a particular application program might require that a force be applied to a joystick whenever a user presses a fire button on the joystick.

The above-described reflex processes and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other uni-directional forces in a simulation, game, etc. When a user moves a computer image into a virtual obstruction with a joystick, the user then feels a physical resistance as he or she continues to move the joystick in that direction. If the user moves the object away from the obstruction, the uni-directional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, as according to a reflex process. This frequency is based upon the travel of the joystick handle and is thus correlated with spatial position. Thus, the user feels a physical sensation of texture, which can be described as the feeling of dragging a stick over a grating.

In next step 84, a low-level force command determined in step 82 is output to microprocessor 26 over bus 24. This force command typically includes a force value that was determined in accordance with the parameters described above. The force command can be output as an actual force signal that is merely relayed to an actuator 30 by microprocessor 26; or, the force command can be converted to an appropriate form by microprocessor 26 before being sent to actuator 30. In addition, the low-level force command preferably includes information indicating to microprocessor 26 which actuators are to receive this force value (if multiple actuators are included on interface device 14). The process then returns to step 76 to process/update the host application program. The process continues to step 80, where the host computer checks if a different force command should be output as determined by the parameters described above. If so, a new force command is determined and output in step 84. If no change of force is required, host computer 12 does not issue another command, since microprocessor 26 can continues to output the previous force command to actuators 30 (alternatively, host computer 12 can continue to output commands, even if no change of force is required). Subsequent force commands output in step 84 can be determined in accordance with the same reflex process, or a different reflex process, depending on the parameters of step 82.

In addition, the host computer 12 preferably synchronizes any appropriate visual feedback, auditory feedback, or other feedback related to the host application with the application of forces on user object 34. For example, in a video game application, the onset or start of visual events, such as an object colliding with the user on display screen 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. Preferably, the magnitude of the sound is in direct (as opposed to inverse) proportion to the magnitude of the forces applied to user object 34. For example, during a simulation, a low sound of an explosion in the far (virtual) distance can cause a small force on user object 34, while a large, "nearby" explosion might cause a loud sound to be output by the speakers and a correspondingly large force to be output on object 34.

The local microprocessor 26 implements the process branching from step 74 and starting with step 86 in parallel with the host computer process described above. In step 86, the interface device 14 is activated. For example, signals can be sent between host computer 12 and interface device 14 to acknowledge that the interface device is now active. From step 86, two processes branch to indicate that there are two processes running simultaneously (multi-tasking) on local processor 26. In one process, step 88 is implemented, in which the processor 26 reads raw data (sensor readings) from sensors 28. Such raw data preferably includes position values describing the position of the user object along provided degrees of freedom. In the preferred embodiment, sensors 28 are relative sensors that provide position values describing the change in position since the last position read.

Processor 26 can determine the absolute position by measuring the relative position from a designated reference position. In alternate embodiments, sensors 28 can include velocity sensors and accelerometers for providing raw velocity and acceleration values of object 34. The raw data read in step 88 can also include other input, such as from an activated button or other control 39 of interface device 14.

In next step 90, processor 26 processes the received raw data into sensor data, if applicable. In the preferred embodiment, this processing includes two steps: computing velocity and/or acceleration values from raw position data (if velocity and/or acceleration are needed to compute forces), and filtering the computed velocity and acceleration data. The velocity and acceleration values are computed from raw position data received in step 88 and stored position and time values. Preferably, processor 26 stores a number of position values and time values corresponding to when the position values were received. Processor 26 can use its own or a local system clock (not shown in FIG. 1) to determine the timing data. The velocity and acceleration can be computed using the stored position data and timing data, as is well known to those skilled in the art. The calculated velocity and/or acceleration values can then be filtered to remove noise from the data, such as large spikes that may result in velocity calculations from quick changes in position of object 34. Thus, the sensor data in the described embodiment includes position, velocity, acceleration, and other input data. In an alternate embodiment, circuitry that is electrically coupled to but separate from processor 26 can receive the raw data and determine velocity and acceleration. For example, an application-specific integrated circuit (ASIC) or discrete logic circuitry can use counters or the like to determine velocity and acceleration to save processing time on microprocessor 26.

Alternatively, step 90 can be omitted, and the processor 26 can provide raw position data to host computer 12 (and other input data from other input devices 39). This would require host computer 12 to filter and compute velocity and acceleration from the position data. Thus, it is preferred that processor 26 do this processing to reduce the amount of processing performed on host computer 12. In other embodiments, the filtering can be performed on host computer 12 while the velocity and acceleration calculation can be performed on the processor 26. Also, in embodiments where velocity and/or acceleration sensors are used to provide raw velocity and acceleration data, the calculation of velocity and/or acceleration can be omitted. After step 90, step 91 is implemented, in which the processor 26 sends the processed sensor data to the host computer 12 via bus 24. The process then returns to step 88 to read raw data. Steps 88, 90 and 91 are thus continuously implemented to provide current sensor data to host computer system 12.

The second branch from step 86 is concerned with processor 26 controlling the actuators 30 to provide forces calculated by host computer 12 to object 34. The second branch starts with step 92, in which processor 26 checks if a low-level force command has been received from host computer 12 over bus 24. If not, the process continually checks for such a force command. When a force command has been received, step 94 is implemented, in which processor 26 outputs a low-level processor force command to the designated actuators to set the output force to the desired magnitude, direction, etc. This force command may be equivalent to the received low-level command from the host computer, or, the processor 26 can optionally convert the force command to an appropriate form usable by actuator 30 (or actuator interface 38 can perform such conversion). The process then returns to step 92 to check for another force command from the host computer 12.

Figure 5:
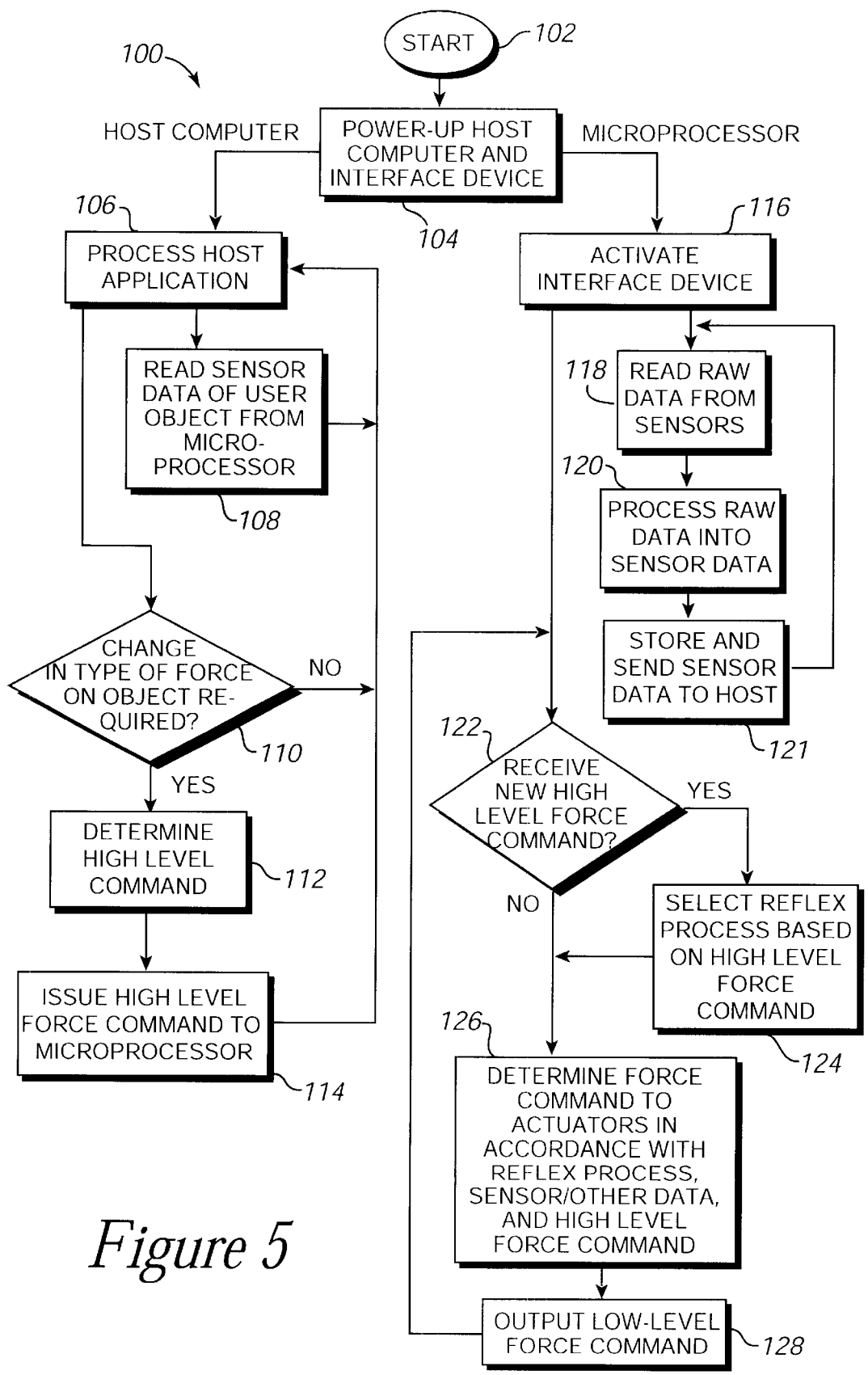
FIG. 5 is a flow diagram illustrating a second embodiment of a method of the present invention for controlling a force feedback interface device.

FIG. 5 is a flow diagram illustrating a second embodiment of a method 100 for controlling force feedback interface device 14 of the present invention. Method 100 is directed to a "reflex" embodiment, in which host computer system 12 provides only high-level supervisory force commands ("host commands") to microprocessor 26, while the microprocessor independently determines and provides low-level force commands (force values) to actuators 30 as an independent "reflex" to control forces output by the actuators.

The process of FIG. 5 is suitable for low speed communication interfaces, such as a standard RS-232 serial interface. However, the embodiment of FIG. 5 is also suitable for high speed communication interfaces such as USB, since the local microprocessor relieves computational burden from host processor 16. In addition, this embodiment can provide a straightforward command protocol, an example of which is described with respect to FIGS. 9 and 14, and which allow software developers to easily provide force feedback in a host application. In this embodiment, for example, the slower "interrupt data transfers" mode of USB can be used.

The process begins at 102. In step 104, host computer system 12 and interface device 14 are powered up, for example, by a user activating power switches. After step 104, the process 100 branches into two parallel processes. One process is implemented on host computer system 12, and the other process is implemented on local microprocessor 26.

In the host computer system process, step 106 is first implemented, in which an application program is processed. This application can be a simulation, video game, scientific program, or other program. Images can be displayed for a user on output display screen 20 and other feedback can be presented, such as audio feedback.

Two branches exit step 106 to indicate that there are two processes running simultaneously (multi-tasking, etc.) on host computer system 12. In one of the processes, step 108 is implemented, where sensor data from the user object is received by the host computer from local microprocessor 26. Similarly to step 78 of the process of FIG. 4, host computer system 12 receives either raw data (e.g., position data and no velocity or acceleration data) or processed sensor data (position, velocity and/or acceleration data) from microprocessor 26. In addition, any other data received from other input devices 39 can also be received by host computer system 12 from microprocessor 26 in step 108, such as signals indicating a button on interface device 14 has been pressed by the user.

Unlike the previous embodiment of FIG. 4, the host computer does not calculate force values from the received sensor data in step 108. Rather, host computer 12 monitors the sensor data to determine when a change in the type of force is required. This is described in greater detail below. Of course, host computer 12 also uses the sensor data as input for the host application to update the host application accordingly.

After sensor data is received in step 108, the process returns to step 106, where the host computer system 12 can update the application program in response to the user's manipulations of object 34 and any other user input received in step 108. Step 108 is then implemented again in a continual loop of receiving sets of sensor data from local processor 26. Since the host computer does not need to directly control actuators based on sensor data, the sensor data can be provided at a much lower speed. For example, since the host computer updates the host application and images on display screen 20 in response to sensor data, the sensor data need only be read at 60–70 Hz (the refresh cycle of a typical display screen) compared to the much higher rate of about 500–1000 Hz (or greater) needed to realistically provide low-level force feedback signals from sensor signals. Host computer 12 also preferably synchronizes visual, audio, and force events similarly as described above with reference to FIG. 4.

The second branch from step 106 is concerned with the process of the host computer determining high-level force commands ("host commands") to provide force feedback to the user manipulating object 34. The second branch starts with step 110, in which the host computer system checks if a change in the type of force applied to user object 34 is required. The "type" of force is a force sensation or profile produced by a particular reflex process or force value which the local microprocessor 26 can implement independently of the host computer. The host computer 12 determines whether a change in the type of force is required depending on the sensor data read by the host computer in step 108 and depending on the events of the application program updated in step 106. As explained with reference to FIG. 4, the sensor data informs the host computer when forces should be applied to the object based on the object's current position, velocity, and/or acceleration. The user's manipulations of object 34 may have caused a new type of force to required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e. a removal of damping force in this case) is required. The events of the application program may also require a change in the type of force applied. For example, if the user's car is travelling through mud and another car collides into the user's car, then a new type of force (collision force) should be applied to the user object. Forces may be required on the user object depending on a combination of an application event and the sensor data read in step 108. Also, other input, such as a user activating buttons or other input devices 39 on interface device 14, can change the type of forces required on object 34.

If no change in the type of force is currently required in step 110, then the process returns to step 106 to update the host application and return to step 110 to again check until such a change the type of force is required. When such a change is required, step 112 is implemented, in which host computer 12 determines an appropriate host command to send to microprocessor 26. The available host commands for host computer 12 may each correspond to an associated reflex process implemented by microprocessor 26. For example, host commands to provide a damping force, a spring force, a gravitational pull, a bumpy surface force, a virtual obstruction force, and other forces can be available to host computer 12. These host commands can also include a designation of the particular actuators 30 or degrees of freedom which are to apply this desired force on object 34. The host commands can also include other command parameter information which might vary the force produced by a particular reflex process. For example, a damping constant can be included in a host command to designate a desired amount of damping force. The host command may also preferably override the reflex operation of the processor 26 and include low-level force values. A preferred command protocol and detailed description of a set of host commands is described in greater detail below with respect to FIGS. 9 and 14. In next step 114, the host computer sends the host command to the microprocessor 26 over bus 24. The process then returns to step 106 to update the host application and to return to step 110 to check if another change in force is required.

The local microprocessor 26 implements the process branching from step 104 and starting with step 116 in parallel with the host computer process described above. In step 116, the interface device 14 is activated. For example, signals can be sent between host computer 12 and interface device 14 to acknowledge that the interface device is now active and can be commanded by host computer 12. From step 116, two processes branch to indicate that there are two processes running simultaneously (multi-tasking) on local processor 26. In one process, step 118 is implemented, in which the processor 26 reads raw data from sensors 28. As described in step 88 of FIG. 4, processor 26 preferably reads position data and no velocity or acceleration data from sensors 28. In alternate embodiments, sensors 28 can include velocity sensors and accelerometers for providing velocity and acceleration values of object 34. The sensor data read in step 118 can also include other input, such as from an activated button or other control of interface device 14.

In next step 120, processor 26 processes the received raw data into sensor data. As described in step 90 of FIG. 4, this processing preferably includes the two steps of computing velocity and acceleration data from the filtered position data and filtering the velocity and acceleration data. Processor 26 can use its own local clock 21 to determine the timing data needed for computing velocity and acceleration. In addition, a history of previous recorded values, such as position or velocity values, can be used to calculate sensor data. In embodiments where velocity and/or acceleration sensors are used, the calculation of velocity and/or acceleration is omitted. In next step 121, the processor 26 sends the processed sensor data to host computer 12 and also stores the data for computing forces, as described in the second branch process of processor 26. The process then returns to step 118 to read raw data. Steps 118, 120 and 121 are thus continuously implemented to provide current sensor data to processor 26 and host computer 12.

The second branch from step 116 is concerned with an "actuator process" in which processor 26 controls the actuators 30 to provide forces to object 34. The second branch starts with step 122, in which processor 26 checks if a host command has been received from host computer 12 over bus 24. If so, the process continues to step 124, where a reflex process associated with the host command is selected. Such reflex processes can be stored local to microprocessor 26 in, for example, memory 27 such as RAM or ROM (or EPROM, EEPROM, etc.). Thus, the microprocessor might select a damping reflex process if the high level command indicated that the damping force from this reflex process should be applied to object 34. The available reflex processes are preferably similar to those described above with reference to FIG. 4, and may include algorithms, stored force profiles or values, conditions, etc. In some embodiments, steps 118, 120, and 121 for reading sensor data can be incorporated in the reflex processes for the microprocessor, so that sensor data is only read once a reflex process has been selected. Also, the host command may in some instances simply be a low-level force command that provides a force value to be sent to an actuator 30 (as in the embodiment of FIG. 4), in which case a reflex process need not be selected.

After a reflex process has been selected in step 124, or if a new host command has not been received in step 122, then step 126 is implemented, in which processor 26 determines a processor low-level force command (i.e. force value). The force value is derived from the reflex process and any other data required by the reflex process as well as command parameters included in relevant host commands. As explained above, the needed data can include sensor data and/or timing data from local clock 29. Thus, if no new high level command was received in step 122, then the microprocessor 26 determines a force command according to the same reflex process that it was previously using in step 126. In addition, the host command can include other command parameter information needed to determine a force command. For example, the host command can indicate the direction of a force along a degree of freedom.

In step 128, processor 26 outputs the determined processor force command to actuators 30 to set the output force to the desired level. Before sending out the force command, processor 26 can optionally convert the force command to an appropriate form usable by actuator 30, or actuator interface 38 can perform such conversion. The process then returns to step 122 to check if another host command has been received from the host computer 12.

The actuator process of microprocessor 26 (steps 118, 120, 122, 124, 126, and 128) thus operates to provide forces on object 34 independently of host computer 12 according to a selected reflex process and other parameters. The reflex process determines how the processor force command is to be determined based on the most recent sensor data read by microprocessor 26. Since a reflex process indicates how forces should be applied depending on the position and other parameters of user object 34, the processor can issue low-level force commands, freeing the host computer to process the host application and determine only when a new type of force needs to be output. This greatly improves communication rates between host computer 12 and interface device 14.

In addition, the host computer 12 preferably has the ability to override the reflex operation of microprocessor 26 and directly provide calculated or other force values as described above with reference to FIG. 4. For example, the host command can simply indicate a force value to be sent to an actuator 30. This override mode can also be implemented as a reflex process. For example, the microprocessor 26 can select a reflex process that instructs it to relay low-level force commands received from host computer 12 to an actuator 30.

Figure 6:
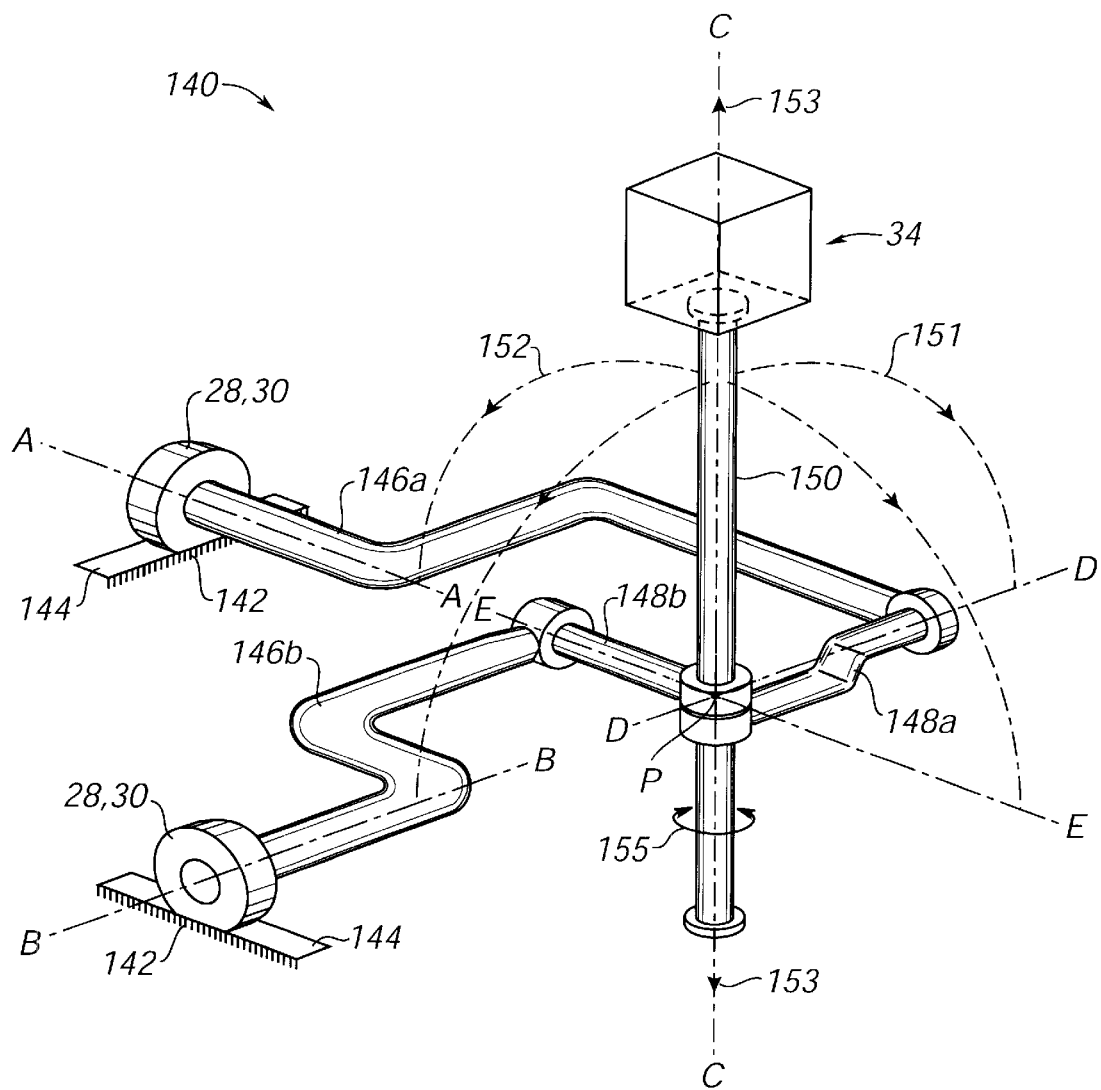
FIG. 6 is a schematic diagram of a closed loop five bar linkage mechanism for providing two degrees of freedom to the user object of the interface device.

FIG. 6 is a schematic diagram of an example of a user object 34 that is coupled to a gimbal mechanism 140 for providing two or more rotary degrees of freedom to object 34. Gimbal mechanism 140 can be coupled to interface device 14 or be provided with sensors 28 and actuators 30 separately from the other components of interface device 14. A gimbal device as shown in FIG. 6 is described in greater detail in co-pending U.S. patent applications Ser. Nos. 08/374,288 and 08/400,233, filed on Jan. 18, 1995 and Mar. 3, 1995, respectively, and hereby incorporated by reference herein.

Gimbal mechanism 140 can be supported by a grounded surface 142, which can be a surface of the housing of interface device 14, for example (schematically shown as part of member 144). Gimbal mechanism 140 is preferably a five-member linkage that includes a ground member 144, extension members 146a and 146b, and central members 148a and 148b. Ground member 144 is coupled to a base or surface which provides stability for mechanism 140. The members of gimbal mechanism 140 are rotatably coupled to one another through the use of bearings or pivots, wherein extension member 146a is rotatably coupled to ground member 144 and can rotate about an axis A, central member 148a is rotatably coupled to extension member 146a and can rotate about a floating axis D, extension member 146b is rotatably coupled to ground member 144 and can rotate about axis B, central member 148b is rotatably coupled to extension member 146b and can rotate about floating axis E, and central member 148a is rotatably coupled to central member 148b at a center point P at the intersection of axes D and E. The axes D and E are "floating" in the sense that they are not fixed in one position as are axes A and B. Axes A and B are substantially mutually perpendicular.

Gimbal mechanism 140 is formed as a five member closed chain. Each end of one member is coupled to the end of a another member. The five-member linkage is arranged such that extension member 146a, central member 148a, and central member 148b can be rotated about axis A in a first degree of freedom. The linkage is also arranged such that extension member 146b, central member 148b, and central member 148a can be rotated about axis B in a second degree of freedom.

User object 34 is a physical object that can be coupled to a linear axis member 150, or linear axis member 150 can be considered part of object 34. Linear member 150 is coupled to central member 148a and central member 148b at the point of intersection P of axes D and E. Linear axis member 150 is coupled to gimbal mechanism 140 such that it extends out of the plane defined by axis D and axis E. Linear axis member 150 can be rotated about axis A (and E) by rotating extension member 146a, central member 148a, and central member 148b in a first revolute degree of freedom, shown as arrow line 151. Member 150 can also be rotated about axis B (and D) by rotating extension member 50b and the two central members about axis B in a second revolute degree of freedom, shown by arrow line 152. In alternate embodiments, linear axis member is also translatably coupled to the ends of central members 148a and 148b, and thus can be linearly moved along floating axis C, providing a third degree of freedom as shown by arrows 153. Axis C can, of course, be rotated about one or both axes A and B as member 150 is rotated about these axes. In addition, linear axis member 150 in some embodiments can rotated about axis C, as indicated by arrow 155, to provide an additional degree of freedom. These additional degrees of freedom can also be provided with sensors and actuators to allow processor 26/host computer 12 to read the position/motion of object 34 and apply forces in those degrees of freedom.

Sensors 28 and actuators 30 can be coupled to gimbal mechanism 140 at the link points between members of the apparatus and provide input to and output as described above. Sensors and actuators can be coupled to extension members 146a and 146b, for example.

User object 34 is coupled to mechanism 140. User object 44 may be moved in both (or all three or four) degrees of freedom provided by gimbal mechanism 140 and linear axis member 150. As object 34 is moved about axis A, floating axis D varies its position, and as object 34 is moved about axis B, floating axis E varies its position.

Figure 7:
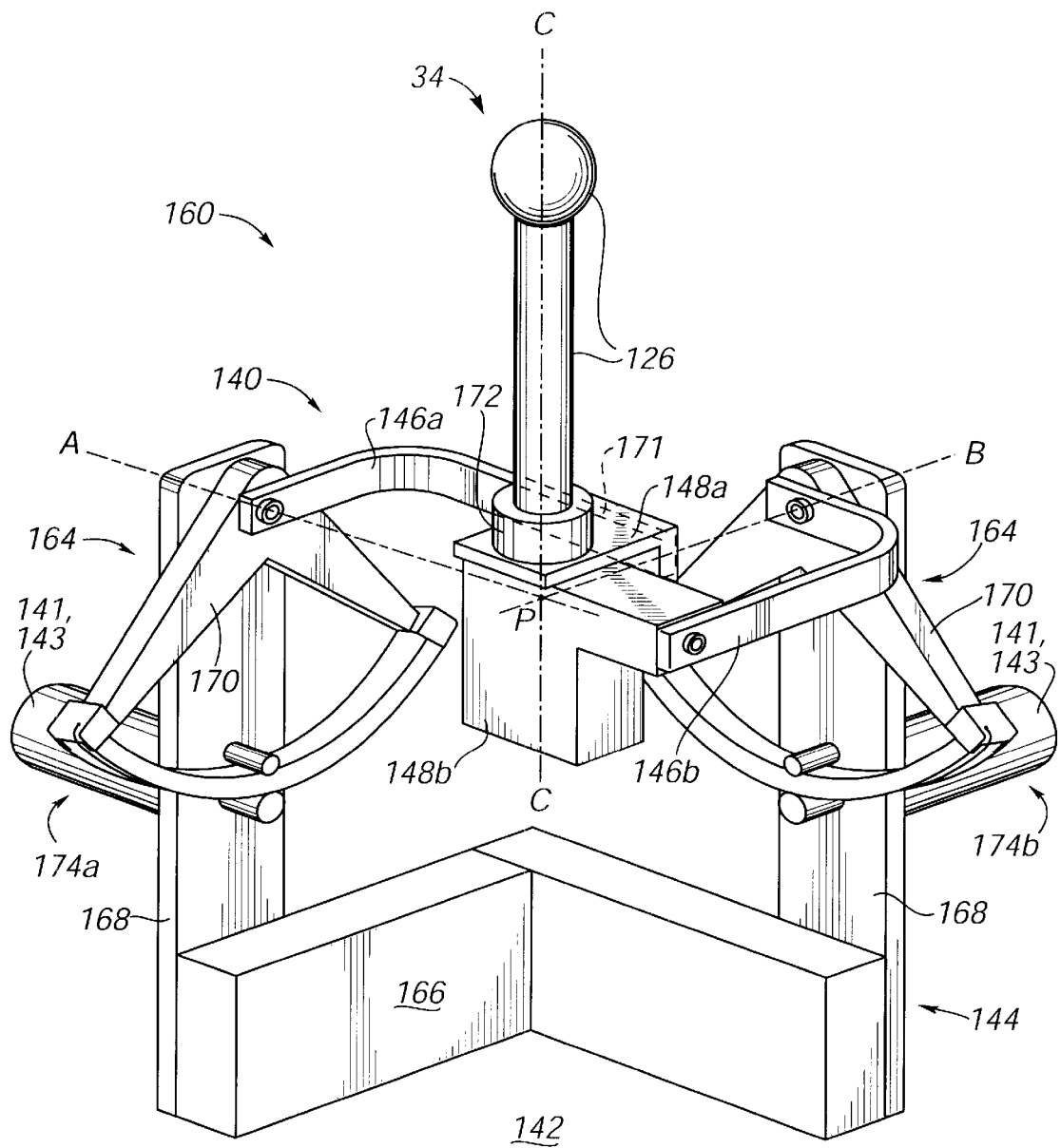
FIG. 7 is a perspective view of a preferred embodiment of the linkage mechanism shown in FIG. 6.

FIG. 7 is a perspective view of a specific embodiment of an apparatus 160 including gimbal mechanism 140 and other components of interface device 14 for providing mechanical input and output to host computer system 12. Apparatus 160 includes gimbal mechanism 140, sensors 141 and actuators 143. User object 34 is shown in this embodiment as a joystick having a grip portion 162 and is coupled to central member 148a. Apparatus 160 operates in substantially the same fashion as gimbal mechanism 140 described with reference to FIG. 6.

Gimbal mechanism 140 provides support for apparatus 160 on grounded surface 142, such as a table top or similar surface. The members and joints ("bearings") of gimbal mechanism 140 are preferably made of a lightweight, rigid, stiff metal, such as aluminum, but can also be made of other rigid materials such as other metals, plastic, etc. Gimbal mechanism 140 includes ground member 144, capstan drive mechanisms 164, extension members 146a and 146b, central drive member 148a, and central link member 148b. Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other.

A capstan drive mechanism 164 is preferably coupled to each vertical member 168. Capstan drive mechanisms 164 are included in gimbal mechanism 140 to provide mechanical advantage without introducing friction and backlash to the system. The capstan drive mechanisms 164 are described in greater detail in co-pending U.S. patent application Ser. No. 08/400,233.

Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a, and central link member 148b is rotatably coupled to an end of extension member 146b. Central drive member 148a and central link member 148b are rotatably coupled to each other at the center of rotation of the gimbal mechanism, which is the point of intersection P of axes A and B. Bearing 172 connects the two central members 148a and 148b together at the intersection point P.

Gimbal mechanism 140 provides two degrees of freedom to an object 34 positioned at or near to the center point P of rotation. An object at or coupled to point P can be rotated about axis A and B or have a combination of rotational movement about these axes. In alternate embodiments, object 34 can also be rotated or translated in other degrees of freedom, such as a linear degree of freedom along axis C or a rotary degree of freedom about axis C.

Sensors 141 and actuators 143 are preferably coupled to gimbal mechanism 140 to provide input and output signals between apparatus 160 and microprocessor 26. In the described embodiment, sensors 141 and actuators 143 are combined in the same housing as grounded transducers 174. Preferably, transducers 174a and 174b are bi-directional transducers having optical encoder sensors 141 and active DC servo motors 143. Passive actuators can also be used. The housing of each grounded transducer 174a is preferably coupled to a vertical support member 168 and preferably includes both an actuator 143 for providing force in or otherwise influencing the first revolute degree of freedom about axis A and a sensor 141 for measuring the position of object 34 in or otherwise influenced by the first degree of freedom about axis A. A rotational shaft of actuator 174a is coupled to a pulley of capstan drive mechanism 164 to transmit input and output along the first degree of freedom. Grounded transducer 174b preferably corresponds to grounded transducer 174a in function and operation. Transducer 174b is coupled to the other vertical support member 168 and is an actuator/sensor which influences or is influenced by the second revolute degree of freedom about axis B.

The transducers 174a and 174b of the described embodiment are advantageously positioned to provide a very low amount of inertia to the user handling object 34. Transducer 174a and transducer 174b are decoupled, meaning that the transducers are both directly coupled to ground member 144 which is coupled to ground surface 142, i.e. the ground surface carries the weight of the transducers, not the user handling object 34. The weights and inertia of the transducers 174a and 174b are thus substantially negligible to a user handling and moving object 34. This provides a more realistic interface to a virtual reality system, since the computer can control the transducers to provide substantially all of the forces felt by the user in these degrees of motion. Apparatus 160 is a high bandwidth force feedback system, meaning that high frequency signals can be used to control transducers 174 and these high frequency signals will be applied to the user object with high precision, accuracy, and dependability. The user feels very little compliance or "mushiness" when handling object 34 due to the high bandwidth. In contrast, in typical prior art arrangements of multi-degree of freedom interfaces, one actuator "rides" upon another actuator in a serial chain of links and actuators. This low bandwidth arrangement causes the user to feel the inertia of coupled actuators when manipulating an object.

Object 34 is shown in FIG. 3 as a joystick having a grip portion 126 for the user to grasp. A user can move the joystick about axes A and B. The movements in these two degrees of freedom are sensed by processor 26 and host computer system 12. Forces can be applied preferably in the two degrees of freedom to simulate various haptic sensations. Optionally, other objects 34 can be coupled to gimbal mechanism 140, as described above. For example, medical instruments, such as laparoscopic tools or catheters, can be used to simulate medical procedures. A laparoscopic tool sensor and force feedback device is described in U.S. patent application Ser. No. 08/275,120, filed Jul. 14, 1994 and entitled "Method and Apparatus for Providing Mechanical I/O for Computer Systems" assigned to the assignee of the present invention and incorporated herein by reference in its entirety.

Figure 8:
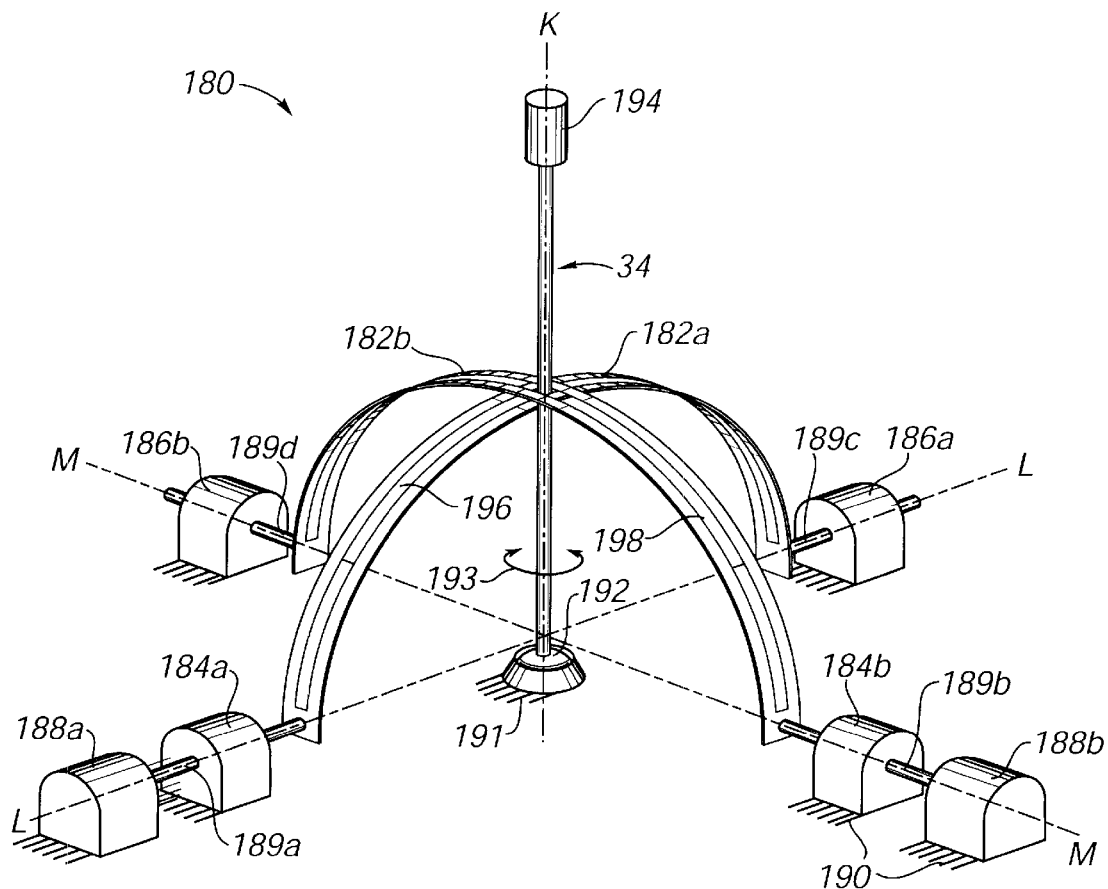
FIG. 8 is a perspective view of a slotted yoke joystick embodiment of a mechanical interface for the user object.

FIG. 8 is a perspective view of a different embodiment of object 34 and supporting mechanism 180 that can be used in conjunction with interface device 14. Mechanism 180 includes a slotted yoke configuration for use with joystick controllers that is well-known to those skilled in the art. Mechanism 180 includes slotted yoke 182a, slotted yoke 182b, sensors 184a and 184b, bearings 186a and 186b, actuators 188a and 188b, and joystick 34. Slotted yoke 182a is rigidly coupled to shaft 189a that extends through and is rigidly coupled to sensor 184a at one end of the yoke. Slotted yoke 182a is similarly coupled to shaft 189c and bearing 186a at the other end of the yoke. Slotted yoke 182a is rotatable about axis L and this movement is detected by sensor 184a. Actuator 188a can be an active or passive actuator. In alternate embodiments, bearing 186a and be implemented as another sensor like sensor 184a.

Similarly, slotted yoke 182b is rigidly coupled to shaft 189b and sensor 184b at one end and shaft 189d and bearing 186b at the other end. Yoke 182b can rotated about axis M and this movement can be detected by sensor 184b.

Object 34 is a joystick that is pivotally attached to ground surface 190 at one end 192 so that the other end 194 typically can move in four 90-degree directions above surface 190 in two degrees of freedom (and additional directions in other embodiments). Joystick 34 extends through slots 196 and 198 in yokes 182a and 182b, respectively. Thus, as joystick 34 is moved in any direction, yokes 182a and 182b follow the joystick and rotate about axes L and M. Sensors 184a–d detect this rotation and can thus track the motion of joystick 34. Actuators 188a and 188b allow the user to experience force feedback when handling joystick 34. Alternatively, other types of objects 34 can be used in place of the joystick, or additional objects can be coupled to the joystick. In yet other embodiments, additional degrees of freedom can be provided to joystick 34. For example, the joystick can be provided with a rotary degree of freedom about axis K, as indicated by arrow 193. Sensors and/or actuators can also be included for such additional degrees of freedom.

In alternate embodiments, actuators can be coupled to shafts 189c and 189d to provide additional force to joystick 34. Actuator 188a and an actuator coupled to shaft 189c can be controlled simultaneously by microprocessor 26 or host computer 12 to apply or release force from bail 182a. Similarly, actuator 188b and an actuator coupled to shaft 189d can be controlled simultaneously.

Other embodiments of interface apparatuses and transducers can also be used in interface device 14 to provide mechanical input/output for user object 34. For example, interface apparatuses which provide one to three (or more) linear degrees of freedom to user object 34 can be used. In addition, passive actuators having an amount of "play" can be provided to implement different reflex processes. Other embodiments of actuators and interfaces are described in U.S. Pat. No. 5,767,839, filed Mar. 3, 1995, entitled "Method and Apparatus for Providing Passive Force Feedback to Human-Computer Interface Systems", and U.S. Pat. No. 5,721,566, filed Jun. 9, 1995, entitled "Method and Apparatus for Providing Passive Fluid Force Feedback", both hereby incorporated by reference herein.

FIG. 9 is a table 300 showing a number of preferred host commands that can be used in the embodiment of FIG. 5, where host computer 12 sends high level host commands to local microprocessor 26, which implements local reflex processes or reflex processes in accordance with the host commands. As discussed previously, low communication rates on bus 24 (FIG. 1) can impede performance, specifically the accuracy and realism, of force feedback. The local microprocessor can implement reflex processes based on host commands independently of the host computer, thus requiring less signals to be communicated over bus 24. Preferably, a communication language or force feedback protocol should be standardized for the transfer of host commands from the host processor 16 to the local processor 26. Ideally, as discussed with reference to FIG. 5, the format will permit the efficient transmission of high level supervisory commands (host commands) to local processor 26 as in step 114 of FIG. 5. By providing a relatively small set of commands and command parameters which are translated into a panoply of forces, the format further shifts the computational burden from the host computer to the local microprocessor 26. In addition, a programmer or developer of force feedback application software for host computer 12 is provided with a high level, standard, efficient force feedback command protocol.

In one embodiment, the host command is permitted to include command parameters generic to a wide variety of force models implemented by the microprocessor 26 to control the actuators 30. For instance, force magnitude and force direction are two generic command parameters. Force duration, or force model application time, is another generic command parameter. It may also be advantageous to further define a command parameter for other input device 39, such as a button. The button, when activated, can trigger different forces or force models.

A preferred embodiment contains two primary modes or "control paradigms" of operation for force feedback interface device 14: rate control and position control. These modes imply a classification scheme for host commands parametrized by the command parameters. While the difference between rate control and position control is generally subtle to the user while he or she interacts with an application, the difference may be profound when representing force feedback information. While certain force feedback entities may be implemented under both control modes, classifying the force feedback commands into two sets can help to avoid confusion among programmers. Some of the commands can be used as either rate control or position control commands.

Exemplary force feedback commands in accordance with the present invention will be described below. The rate control force feedback commands will be discussed first, followed by the position control commands. Of course, other force feedback commands may be constructed in addition to, or as alternatives to, the following sample force feedback commands.

Rate control refers to a user object mapping in which the displacement of the user object 34 along one or more provided degrees of freedom is abstractly mapped to motion of a computer-simulated entity under control, such as an airplane, race car, or other simulated "player" or player-controlled graphical object. Rate control is an abstraction which makes force feedback less intuitive because there is not a direct physical mapping between object motion and commanded motion of the simulated computer entity. Nevertheless, many interesting force feedback sensations can be implemented within rate control paradigms. In contrast, position control refers to a user object mapping in which displacement of the joystick handle or other user manipulable object directly dictates displacement of a simulated computer entity, so that the fundamental relation between joystick displacements and computer displacements is present. Thus, most rate control paradigms are fundamentally different from position control in that the user object (joystick) can be held steady at a given position but the simulated entity under control is in motion at a given commanded velocity, while the position control paradigm only allows the entity under control to be in motion if the user object is in motion. Position control host commands are described in greater detail below with respect to FIG. 14, while rate control commands are described presently with reference to FIG. 9.

For example, a common form of rate control is a velocity derived abstraction in which displacement of the user object, such as a joystick handle, dictates a velocity of the simulated computer entity, such as a vehicle or other graphical object displayed on display screen 20, in a simulated environment. The greater the joystick handle is moved from the original position, the greater the velocity of the controlled vehicle or player-controlled graphical object. Such control paradigms are very popular in computer games where velocity of a spacecraft or race car is dictated by the displacement of the joystick. Like most rate control paradigms, velocity control allows the joystick to be held steady at a given position while the entity under control is in motion at a given commanded velocity. Other common rate control paradigms used in computer games are acceleration controlled. An acceleration controlled paradigm is termed "thrust" control by those skilled in the art. While velocity control dictates the speed of the entity under control, thrust control dictates the rate of change of speed. Under thrust control, the joystick can be still and centered at zero displacement, yet the commanded computer entity can be in motion.

In force feedback schemes, rate control force feedback commands roughly correspond to forces which would be exerted on a vehicle or other simulated entity controlled by the simulated environment through the force feedback interface device 14. Such forces are termed vehicle-centric forces. For example, in a thrust control paradigm, a user's simulated speed boat may move into thick mud, but the user would not directly feel the mud. However, the user would feel the speed boat's engine straining against a force opposing the boat's motion. These opposing forces are relayed to the user through interface device 14. Other simulated characteristics or objects in the simulated environment can have an effect on the player-controlled simulated entity and thus affect the forces output to the user.

Herein, rate control commands are divided into "conditions" and "overlays," although other classifications may be used in alternate embodiments. Conditions set up a basic physical model or background sensations about the user object including simulated stiffness, simulated damping, simulated inertias, deadbands where simulated forces diminish, and directional constraints dictating the physical model's functionality. Multiple conditions may be specified in a single command to effectively superpose condition forces. Overlays, in contrast, are forces that may be applied in addition to the conditions in the background. Any number of overlays can preferably be provided in addition to condition forces. A condition can be specified by one condition command or by multiple condition commands.

Descriptions will now be provided for several types of forces 302, as referenced in table 300, that can be implemented by microprocessor 26 from host commands. These forces include: restoring force, restoring spring, vector force, vibration, sluggish stick, wobble, unstable, button reflex jolt, and ratchet force. The restoring force, restoring spring, sluggish stick, and unstable forces are considered condition forces. The vector force, vibration, wobble, button reflex jolt, and ratchet forces are considered overlay forces.

The forces 302 shown in table 300 can be implemented with host commands provided by host computer 12 to microprocessor 26. Examples 304 of host commands and their syntax are shown in table 300 for each type of force 302. In the described embodiment, host commands 304 preferably include a command portion 306 and a number of command parameters 308. Commands 304 indicate the type of force which the host computer 12 is instructing the processor 26 to implement. This command portion may have a corresponding reflex process which the processor 26 can retrieve from memory 27 and implement; this process is described in greater detail below. Command portions 306 can be specified in virtually any form in other embodiments; in table 300, a command is typically provided in a high-level form, close to English, so that the type of force which the command implements can be easily recognized by a programmer or software developer.

Command parameters 304 are values or indicators provided by the host computer 12 which customize and/or modify the type of force indicated by command portion 304. Many of the commands use magnitude, duration, or direction command parameters. Some commands include a style parameter which often modifies a force's direction. Other particular command parameters are provided for specific forces, as described in detail below.

For the following preferred rate control embodiments, most of the command parameters control different forces in the same way. The magnitude parameter is a percentage of a maximum magnitude corresponding to a maximum force able to be output by actuators 30. The duration parameter usually corresponds to a time interval for applying the particular force model. However, it is sometimes set to a predetermined value, such as zero or −1, to extend indefinitely the force model's application time. The force model would thus remains in effect until the host computer 12 provides a new host command with a new force or sends a clear command. The style parameter may select a direction in which to apply the force model, and/or a degree of freedom along which to apply the force model. For example, valid directions usually include one of a common joystick's two axes or a diagonal specified as a combination of the two. Of course, the style parameter could specify the force application along any degree of freedom or combination of degrees of freedom. Alternatively, separate force commands could be used for each degree of freedom or force commands. The style parameter can vary depending on the particular force model commanded, as described below.

Although not listed in FIG. 9, all of the described types of forces 302 can have additional parameters or incorporate other properties into the listed parameters. A "deadband" parameter could specify a size of a region where a force would be small or zero. A parameter can be included indicating whether a force is bi-directional or uni-directional along a degree of freedom. Note that uni-directional forces can have either a positive or negative sense. For some host commands, the deadband and bi-directional/uni-directional parameter can be included in the style parameter.

Subclass 310 indicates a classification of the types of forces 302. Forces 302 are shown as either conditions or overlays, as explained above. The condition commands are described below before the overlay commands.

Figure 10A:
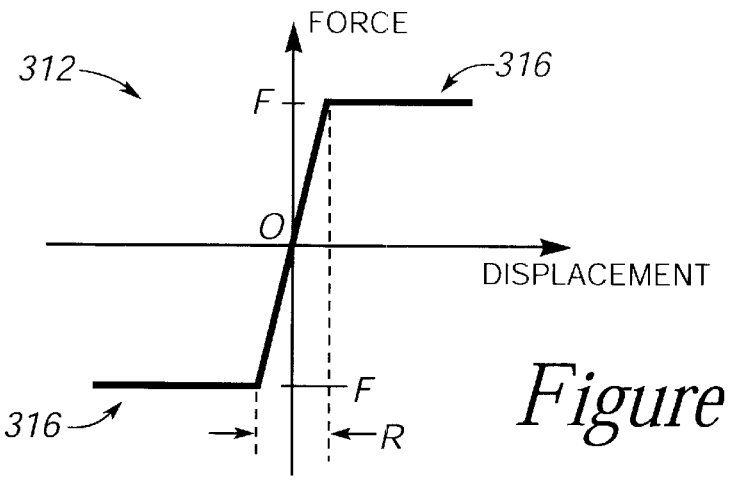
FIGS. 10a–c are diagrammatic representations of restoring force profiles.
Figure 10B:
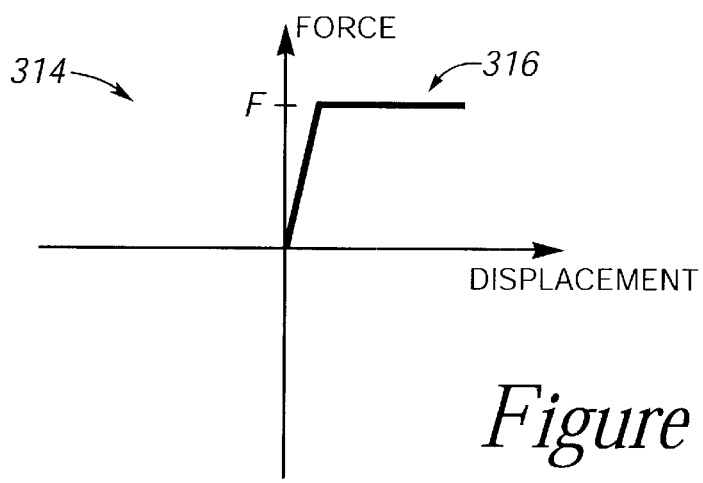
Figure 10C:
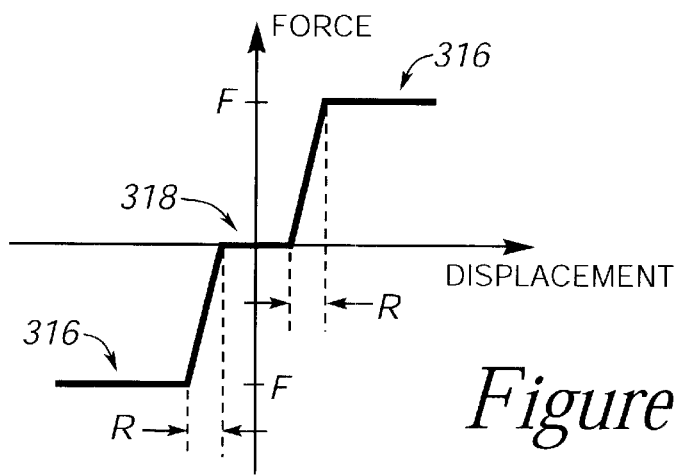

FIGS. 10a–c are graphs illustrating force versus displacement profiles for a restoring force. The force in graph 312 of FIG. 10a is bi-directional, where the force on the right side of the vertical axis is applied in one direction along a degree of freedom, and the force on the left side of the vertical axis is applied in the opposite direction along that degree of freedom. The force shown in graph 314 of FIG. 10b is uni-directional. Preferably, whether the force is uni-directional or bi-directional is specified with, for example, the style parameter 308 of the command 306 shown in table 300 of FIG. 8 (and, if uni-direction, a positive or negative sense to indicate the particular direction). In addition, the desired degrees of freedom along which the restoring force is to be applied are also preferably specified in the style parameter. For example, an "X" parameter could indicate the "X" degree of freedom, while an "XY" parameter can indicate a restoring force along both X and Y degrees of freedom (e.g., a diagonal restoring force).

A restoring force applied to user object 34 always points back towards an origin position O (or "neutral position") of the user object along a degree of freedom. For example, the origin position for a joystick can be the joystick's center position, as shown in FIGS. 7 and 8. The magnitude of restoring force, specified by the magnitude command parameter, generally remains constant in either direction for the range 316 along the degree of freedom of the user object. The maximum force magnitude F is preferably limited to about 75% of the maximum possible output force in a the selected degree of freedom, so that jolts and vibrations can be overlaid on top of the restoring sensation (described below). As the object is moved toward the origin position O, the applied force is constant until the user object is moved within a localized region R about the origin position. When the user object is in the localized region R, the applied force rapidly drops to zero or a small value. Thus, the restoring force profile provides a constant "restoring sensation" that forces the user object back to the origin position when the object is in range 316. This restoring forces then diminishes or vanishes as the object nears and reaches the origin position. The restoring force's direction can be automatically controlled by the local microprocessor 26.

In FIG. 10c, the restoring force is shown similarly to the force in FIG. 10a, except that the applied force is about zero in an extended region 318, about the origin position. Region 318 is known as a "deadband", and allows the user to have some freedom to move object 34 for a short distance around the origin before forces are applied. The specification of deadband 318 for an applied restoring force can be a value included, for example, as a separate deadband command parameter, or, alternatively, as part of the style parameters 308 of the restoring force host command.

A restoring force sensation can be very ably applied in a rate control paradigm to the situation of hitting a wall or some other obstruction while controlling a simulated vehicle. The restoring force indicates a resistance against commanding a velocity in a direction of motion. This force drops off when the user object is returned to the origin position because the user is no longer commanding a velocity in the direction of motion. If there is no obstruction in the reverse direction, the restoring force would be unidirectional.

Figure 11A:
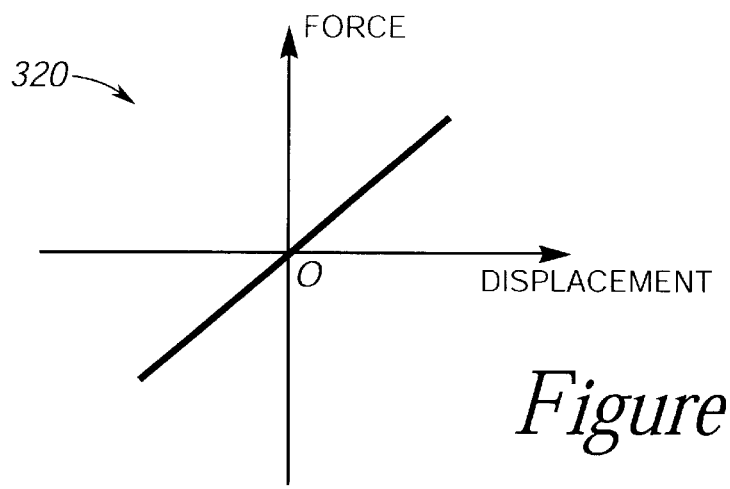
FIGS. 11a–c are diagrammatic representations of restoring spring force profiles.
Figure 11B:
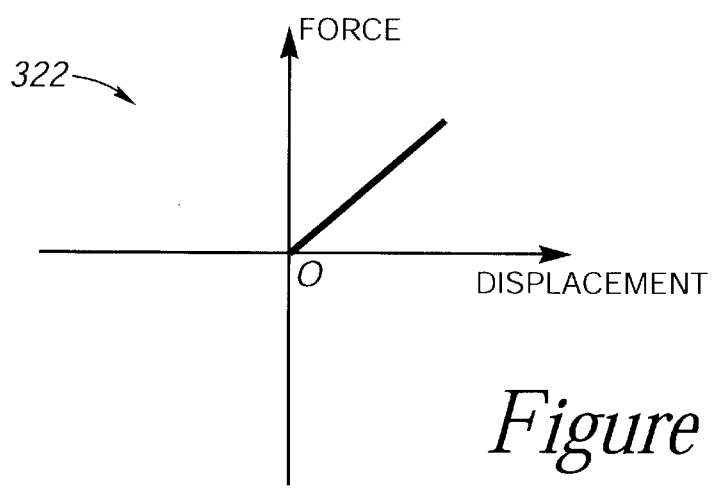
Figure 11C:
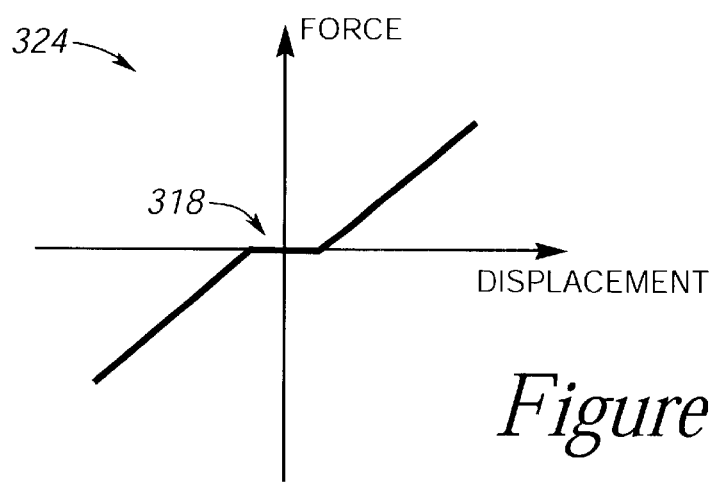

FIGS. 11a–11c are graphs illustrating force versus displacement profiles for a restoring spring force. Rather than maintaining a constant magnitude over its positive or negative displacement, as provided by the restoring force of FIGS. 10a–10c, a restoring spring force varies linearly over an appreciable portion of the user object's displacement, and is proportional to the object 34's distance from the origin position O. A restoring spring force applied to the user object always points back towards the neutral position along a degree of freedom. In FIGS. 11a–11c the restoring spring force reaches its maximum at maximum displacement of object 34 from the origin position O. Graph 320 of FIG. 11a shows the bi-directional case, and graph 322 of FIG. 11b shows the uni-directional case. A deadband specified by a deadband parameter is provided about the origin position, as shown in graph 324 of FIG. 11c.

The parameters for the restoring spring force can, for example, be substantially similar to the parameters for the restoring force as described above. Alternatively, instead of a magnitude parameter, the restoring spring force can have a spring coefficient parameter to describe a desired "stiffness" of the object 34. The spring coefficient parameter can be used in well known equations to calculate the force on the user object. Either the coefficient or magnitude parameter may be used.

The sluggish force creates a damping force on user object 34 having a magnitude proportional to the velocity of the user object when moved by the user. An example of this type of damping force is described above with respect to step 82 of FIG. 4. The degree of "viscosity" of the sluggish force can be specified by a viscous damping coefficient included as a command parameter in the host command. Since the sluggish stick force depends directly upon velocity, the coefficient command parameter can be expressed as a percentage of a maximum damping coefficient, and replaces the magnitude parameter of previously discussed host commands.

The style command parameter for the sluggish host command can include the specified degrees of freedom to apply the sluggish force, as well as a uni-directional or bi-directional indication. The sluggish stick force is particularly suited for rate control applications to simulate controlling, for example, a very heavy vehicle that is poorly responsive to the movement of the user object.

The unstable force creates an inverted pendulum style instability. Alternatively, the unstable force is modelled on a spring having a negative spring constant (an unstable or diverging spring). A force is applied to the user object in a direction away from the object's origin position and is increased as the user object is moved further away from the origin position. This creates a force that makes it difficult for the user to bring the object to the origin position. The command parameters for an unstable host command can include similar parameters to the restoring forces described above; for example, a command parameter indicating the percentage of maximum degree of "instability" can be provided, where the instability can be defined in terms of a maximum output force. This force can be used as another vehicle-related sensation, and could replace a restoring spring force when, for example, a simulated vehicle guidance control is damaged. The instability would typically make a computer game very hard to play.

In alternative embodiments, the condition forces described above can be commanded using only one host command with a number of parameters to control the characteristics of the condition forces. For example, a host command such as COND_$X(K+, K-, DB, B+, B-, N\_\text{Offset}, \text{Sat}+, \text{Sat}-, m)$ can be sent to microprocessor 26 from host computer 12. This command specifies certain physical parameters of a model of the user object in one degree of freedom. The K parameters indicate a proportional stiffness for displacements of the user object in two directions along a degree of freedom. The DB parameter indicates the deadband range as a percentage of a maximum allowed deadband distance. The B parameters indicate a velocity proportional damping for the velocity of the user object in two directions along a degree of freedom. The N_offset parameter can be specified as the offset from the modeled neutral position of the springs (defined by the K parameters). The Sat parameters indicate the maximum (saturation) allowed force value for displacements of the user object, expressed, for example, as a percentage of the maximum possible force. The m parameter indicates a simulated mass of the user object which can be applied in the physical model for computing gravitational or inertial forces on the user object, for example. A condition command as provided above can be used for each provided degree of freedom of user object 34; for example, COND_X can provide the condition forces in the degree of freedom about the x-axis. The command can implement the restoring force, restoring spring force, sluggish force, and unstable force by adjusting the various command parameters.

The condition commands can be provided in the background while overlay commands are applied in addition to or "over" the condition forces. For example, a sluggish damping force can be provided as a background force to the user object, and a "jolt" overlay force can be commanded over the sluggish force to provide a quick, jerky motion on the user object for a few seconds. Of course, overlay forces may also be applied exclusively when no other forces are being applied, or may cancel other previously-commanded forces if desired. The example overlay forces shown in FIG. 9 are described below.

Figure 12:
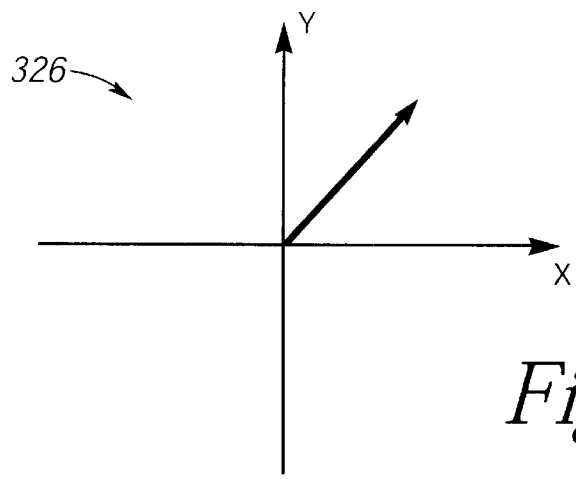
FIG. 12 is a diagrammatic representation of a vector force.

FIG. 12 is a graph 326 illustrating a vector force model. A vector force is an overlay command, and thus can be applied in addition to the condition forces described above. It is a general force applied to the joystick in a given direction specified by a direction command parameter. The direction command parameter can be provided, for example, as an angle in the X-Y plane for a two-degree-of-freedom interface apparatus. As for many of the condition force commands, the magnitude of the vector force can be specified as a percentage of a maximum magnitude. FIG. 12 shows a two-dimensional representation of the vector force in an example direction in the X-Y plane of a user object having two degrees of freedom.

Figure 13A:
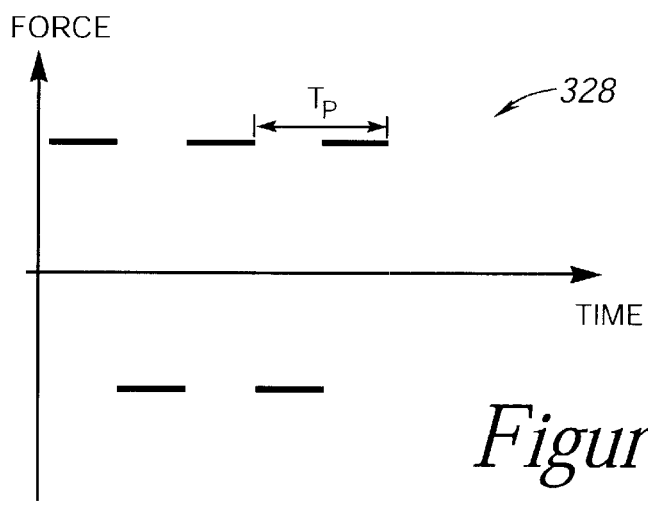
FIGS. 13a–b are diagrammatic representations of vibration force profiles.
Figure 13B:
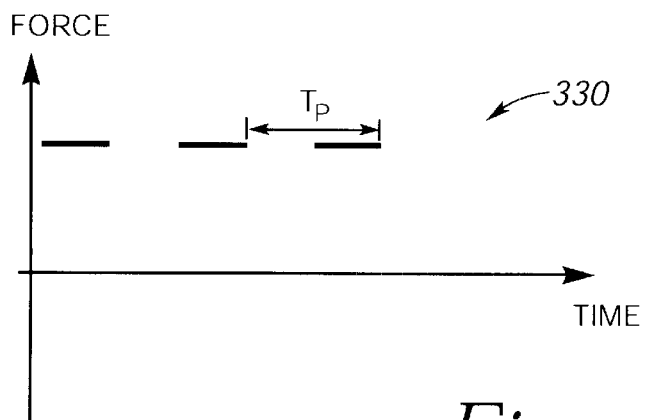

FIGS. 13a–13b are graphs illustrating force versus time profiles for a vibration force. FIG. 13a is a graph 328 showing a bi-directional vibration force while FIG. 13b is a graph 330 showing a uni-directional vibration force. The vibration command shown in FIG. 9 accepts magnitude, frequency, style, direction, and duration command parameters. The frequency parameter can be implemented as a percentage of a maximum frequency and is inversely proportional to a time interval of one period, $T_P$. The direction command parameter can be implemented as an angle, as described above with reference to FIG. 12. The style parameter can indicate whether the vibration force is uni-directional or bi-directional. In addition, a duty cycle parameter can be provided in alternate embodiments indicating the percentage of a time period that the vibration force is applied. Also, a command parameter can be included to designate the "shape" or profile of the vibration waveform in the time axis, where one of a predetermined number of shapes can be selected. For example, the force might be specified as a sinusoidal force, a sawtooth-shaped force, a square waveform force, etc.

A wobble force paradigm is another overlay force that can be commanded by host computer 12. This force creates a random (or seemingly random to the user), off-balance force sensation on the user object. For example, it can simulate an erratic control for a damaged vehicle. The magnitude, duration, and style command parameters can be similar to parameters for the above host commands. The style parameter might also specify a type of wobble force from a predetermined list of different types. The wobble force can be implemented using a variety of methods. For example, a preprogrammed "force profile" stored in memory can be implemented to cause a force sensation that seems random. Or, an equation can be used to calculate a force based on a sine wave or other function or a random result.

The jolt force is typically a short, high magnitude force that is output on the user object, and can be used, for example, to notify the user of an event or simulated object in the computer environment. The jolt force can be used as an overlay force which can be felt in addition to any condition forces in effect. Typical parameters include the magnitude of the force of the jolt, the duration of the jolt, and direction(s) or degree(s) of freedom in which the jolt is applied, which can be specified as an angle or particular degrees of freedom. The magnitude command parameter preferably specifies the magnitude of the jolt force in addition to (above) any other condition or overlay force magnitudes, i.e., the magnitude is a differential magnitude "above" the steady state forces. Thus, the actual magnitude output by actuators 30 may be greater than the jolt force magnitude.

The button force is not an actual force but may be used as a command to trigger other forces when an input device 39 is activated by the user. In many game situations, for example, it may be advantageous to trigger a force as a direct response to pressing a button or other input device 39 on the interface apparatus 14 rather than generating the force from a host command after processing the pressed button on the host computer 12. The other forces triggered by the pressing of the button can be specified as a command parameter in the button command; alternatively, a specific button command can be provided for each type of force.

For example, a common force to use in conjunction with a button command is the jolt force. A specific command, e.g., BUTTON_JOLT, can be provided to cause a jolt force whenever a specified button is pressed, and which includes button and jolt command parameters. Alternatively, a button command with a JOLT command parameter may be implemented. When the button jolt command is received by microprocessor 26, the microprocessor can run a button check as a background process until commanded to terminate the button background process. Thus, when the microprocessor 26 determines that the user has pressed a button from the sensor data, the jolt force can be overlaid on any existing forces that are output.

The button command sets up the microprocessor 26 to output a force when the other input device 39 has been activated. The button command may accept a number of command parameters including, for example, button and autofire frequency parameters (in addition to any command parameters specific to the desired force to be output when the button is pressed). The button parameter selects the particular button(s) which the microprocessor 26 will check to be activated by the user and which will provide the desired forces. For example, a joystick may have multiple buttons, and the software developer may want to provide a force only when a particular one of those buttons is pressed. A duration parameter can determine how long the jolt lasts after the button is pressed. The "autofire" frequency parameter designates the frequency of a repeating force when the user holds down a button. For example, if the user holds down a particular button, the microprocessor can automatically repeat a jolt force after a predetermined time interval has passed after the user first pressed the button. The autofire parameter can also optionally designate whether the autofire feature is being used for a particular button and the desired time interval before the repeating forces are applied.

Other rate control commands not shown in the table of FIG. 9 can also be implemented. For example, if actuators 30 are passive actuators, a "ratchet" force can be provided by sending a ratchet command and appropriate command parameters. This command can simulate an obstruction which causes, for example, a user-controlled vehicle to strain in a given degree of freedom. Thus, a force may be applied when the user moves the joystick in one direction, then no force is applied when the user moves the joystick in the opposite direction, and force is again applied when the joystick is moved in the original direction. This simulates an obstruction force at any retraction point, like a ratchet. The style parameters for such a command can indicate a fixed obstruction or a ratchet-style obstruction.

This concludes the description of rate control commands and force models.

FIG. 14 is a table 332 showing a number of preferred position control host commands that can be used in the embodiment of FIG. 5. Herein, "position control" refers to a mapping of a user object in which displacement of the joystick handle or other user object directly dictates displacement of a computer-simulated entity or object. The mapping can have an arbitrary scale factor or even be non-linear, but the fundamental relation between user object displacements and computer object or entity displacements should be present. Under a position control mapping, the computer-controlled entity does not move unless the user object is in motion; a static user object dictates static commands to microprocessor 26 from host computer 12.

Position control is not a popular mapping for traditional computer games, but may be used in other applications such as medical procedure simulations or graphical user interfaces. Position control is an intuitive and effective metaphor for force feedback interactions because it is a direct physical mapping rather than an abstract control paradigm. In other words, because the user object experiences the same physical manipulations as the entity being controlled within the computer, position control allows physical computer simulations to be directly reflected as realistic force feedback sensations. Examples of position control in computer environments might be controlling a paddle in a pong-style tennis game or controlling a cursor in a windows desktop environment.

Contrasted with rate control's vehicle-centric forces, position control force feedback roughly corresponds to forces which would be perceived directly by the user. These are "user-centric" forces. For example, a paddle displayed on display screen 20 and directly controlled by a user might move through simulated thick mud. Via the force feedback interface device 14, the user would perceive the varying force associated with movement through a viscous solution. Corresponding to the realistic physical situation, the force varies with the speed of motion of the joystick (and displayed paddle) and orientation of the paddle face.

Descriptions will now be provided for several types of position control forces 334, as referenced in table 332, that can be implemented by microprocessor 26 from host commands. These forces include: vector, groove, divot, texture, barrier, field, paddle, and button reflex jolt. Many of the examples 336 of host commands corresponding to these forces use magnitude and style parameters as discussed with reference to the rate control paradigms. As with the rate control commands, command parameters of the same name generally have the same properties for different host commands. However, the duration parameter is typically not used for position control commands as much as for rate control commands, since the duration of the position control forces are typically applied depending on the current position of the user object. The position control force models thus generally remain in effect until the host computer 12 issues a new host force command or a clear command. In alternate embodiments, a duration parameter can be used.

Preferred parametrizations for described position control commands are summarized in FIG. 14. All the forces listed below can include additional command parameters, such as deadband parameters, or incorporate other properties into the parameters listed in FIG. 14. Similar to the host commands shown in FIG. 9, host commands 336 preferably include a command portion 338 and a number of command parameters 340. Commands 336 indicate the type of force which the host computer 12 is instructing the processor 26 to implement. This command portion may have a corresponding reflex process which the processor 26 can retrieve from memory 27 and implement. Command portions 338 can be specified in virtually any form in other embodiments.

A vector force is a general force having a magnitude and direction. Refer to FIG. 12 for a polar representation of the vector force. Most position control sensations will be generated by the programmer/developer using a vector force command and appropriate instructions and programming constructs. A duration parameter is typically not needed since the host 12 or microprocessor 26 can terminate or modify the force based on user object motions, not time.

Figure 15:
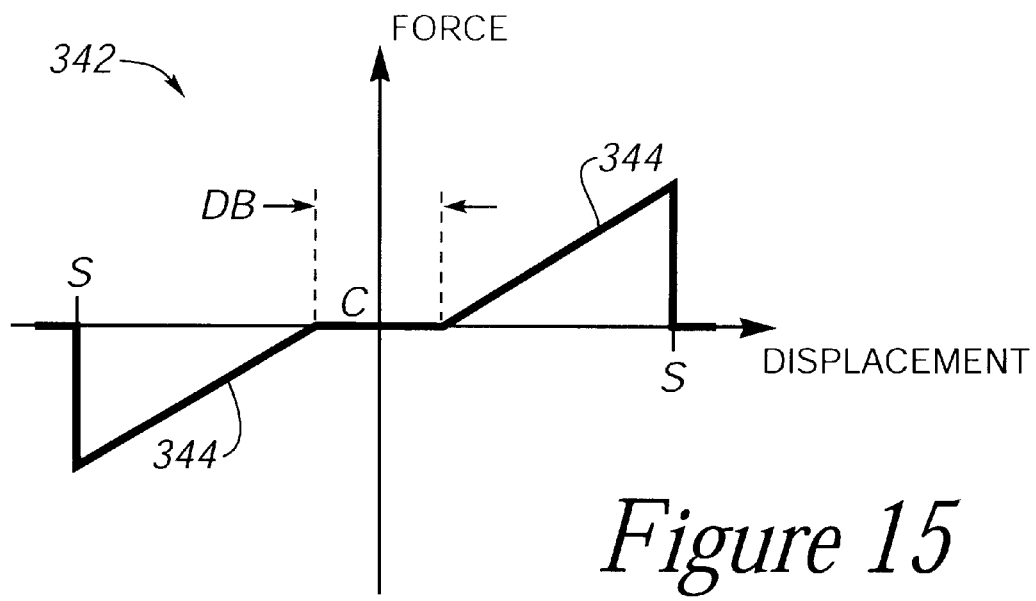
FIG. 15 is a diagrammatic representation of a groove force profile.

FIG. 15 is a graph 342 showing a force versus displacement relationship for a groove force of the present invention. The groove force provides a linear detent sensation along a given degree of freedom, shown by ramps 344. The user object feels like it is captured in a "groove" where there is a restoring force along the degree of freedom to keep the stick in the groove. This restoring force groove is centered about a center groove position C located at the current location of the user object when the host command was received. Alternatively, the location of the center groove position can be specified from a command parameter along one or more degrees of freedom. Thus, if the user attempts to move the user object out of the groove, a resisting force is applied.

The magnitude (stiffness) parameter specifies the amount of force or resistance applied. Optionally, a "snap-out" feature can be implemented within the groove reflex process where the groove forces turn off when the user object deviates from the groove by a given snap-out distance, shown as distance S. Thus, the microprocessor 26 would receive a groove command having a snap distance magnitude. When the microprocessor detects the user object moving outside this snap distance, it turns off the groove forces. This snap-out feature can be implemented equally well by the host computer 12 sending a clear command to turn off forces. Also, a deadband DB can also be provided to allow the user object to move freely near the center groove position C, specified with a deadband command parameter. A style command parameter indicates the orientation of the groove along one or more degrees of freedom (e.g., horizontal, vertical, diagonal). For example, horizontal and vertical grooves can be useful to provide forces for scroll bars in windows. A user moving a cursor in a graphical user interface can feel groove forces moving the cursor and user object toward the middle of the scroll bar. The deadband gives the user room to move the cursor within the scroll bar region. The snap-out distance can be used to free the cursor/user object from forces once the cursor is moved out of the scroll bar region.

A divot is essentially two (or more) orthogonal grooves that provide restoring forces in more than one degree of freedom. This provides the sensation of a point detent along a given degree of freedom. If the divot is provided in two degrees of freedom, for example, then the user object feels as it if has been captured in a circular depression. The user object is captured at a point where there is a restoring force along both axes to keep the user object at the point. The snap-out feature of the groove force can also be implemented for the divot. In addition, the deadband feature of the groove can be provided for the divot command.

A texture force simulates a surface property, as described above with reference to FIG. 4. A texture is a spatially varying force (as opposed to vibration, a time varying force) that simulates the force felt, for example, when a stick is moved over a grating. Other types of textures can also be simulated. The user object has to be moved to feel the texture forces, i.e., each "bump" of the grating has a specific position in the degree of freedom. The texture force has several characteristics that can be specified by a programmer/developer using the host command and command parameters. These command parameters preferably include a magnitude, a grit, and a style. The magnitude specifies the amount of force applied to the user object at each "bump" of the grating. The grit is basically the spacing between each of the grating bumps. The style command parameter can specify an orientation of the texture. For example, the style can specify a horizontal grating, a vertical grating, or a diagonal grating (or a superposition of these gratings). Furthermore, the style parameter can specify if the texture is felt bi-directionally or uni-directionally along a degree of freedom. Alternatively, additional command parameters can be provided to control the position of the "bumps" of the texture force. For example, information can be included to instruct the distance between bumps to vary exponentially over a distance, or vary according to a specified formula. Alternatively, the texture spacing could vary randomly. In yet other embodiments, the command parameters can specify one of several available standard texture patterns that microprocessor 26 can retrieve from memory.

Figure 16:
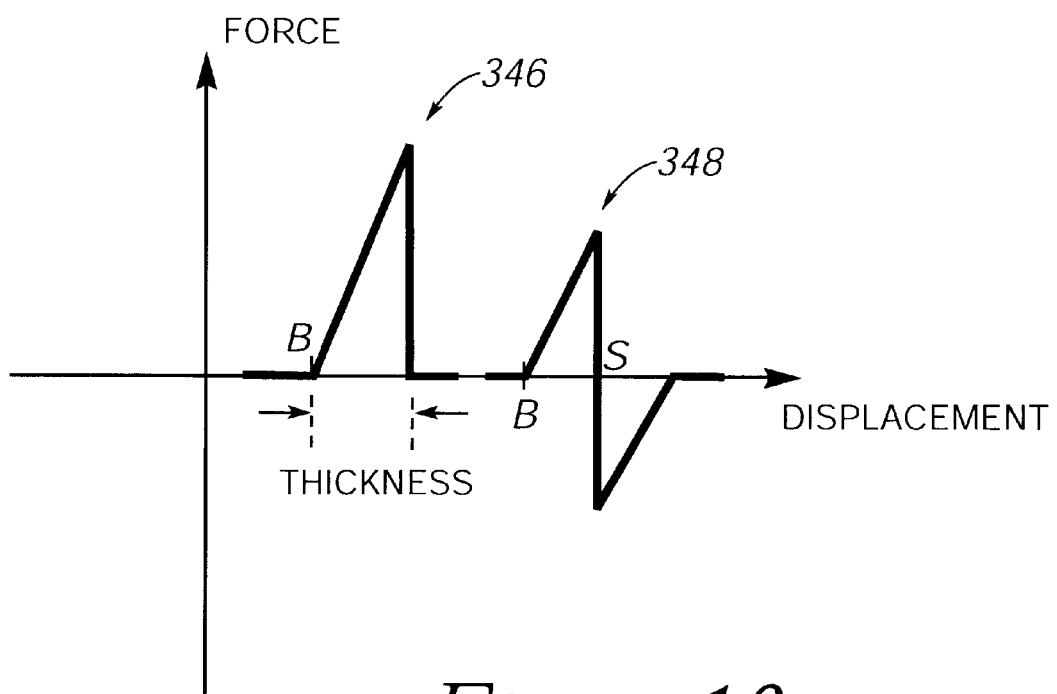
FIG. 16 is a diagrammatic representation of a barrier force profile.

A barrier force, when commanded, simulates a wall or other obstruction placed at a location in user object space, and is described above with reference to FIG. 4. The host command can specify the hardness of the barrier (magnitude of the force applied), the location of the barrier along the degree of freedom, and the snap distance or thickness of the barrier. Horizontal barriers and vertical barriers can be provided as separate host commands, if desired. As indicated in graph 346 of FIG. 16, a barrier force only has a finite thickness. The force increases steeply as the user object is moved closer into the barrier (past point B). The snap-through distance defines the size of the region where the barrier is felt by the user. If the user object is moved into a barrier, and then is moved past the thickness of the barrier, the barrier force is turned off. The barrier force can act as a hard obstruction, where the microprocessor provides maximum force magnitude to the user object 34, or as a bump or softer barrier, where a smaller force magnitude is applied (as specified by the magnitude command parameter). The barrier can remain for an extended period unless removed or moved to a new location. Multiple barriers can also be provided in succession along a degree of freedom.

Alternatively, the barrier force can be provided by sending a host command having only two command parameters, hardness and location. The hardness parameter can specify the height and slope of the resistive force. As shown in graph 348 of FIG. 16, the user object can move from left to right along the distance axis. The user object feels a resistive force when hitting the barrier at point B. After the user object has been moved to point S (the snap-distance), the force is applied to the user object in the opposite direction (a negative magnitude force), which decreases as the user object is moved in the same direction. This simulates a bump or hill, where the force is resistive until the user object is moved to the top of the bump, where the force becomes an assisting force as the object is moved down the other side of the bump.

A force field type force attracts or repulses the user object with respect to a specific position. This force can be defined by command parameters such as a field magnitude and the specific field origin position which the force field is applied with respect to. A sense parameter can be included to indicate an attractive field or a repulsive field. For example, the force field can be an attractive field to simulate a force of gravity between the field origin position and a user-controlled cursor or graphical object. Although the field origin position can be thought of as a gravitational mass or an electric charge, the attractive force need not depend on the inverse square of displacement from the specific position; for example, the force can depend on an inverse of the displacement. The attractive force field also attempts to maintain the user object at the field origin position once the user object has been moved to that position. A repulsive field operates similarly except forces the user object away from a specified field origin position. In addition, ranges can be specified as additional command parameters to limit the effect of a force field to a particular distance range about the field origin position.

FIGS. 17a–17i are diagrammatic illustrations of a "paddle" computer object 350 interacting with a "ball" computer object or similar object 352. These computer objects can be displayed on display screen 20 by host computer 16. The force interactions between the ball and paddle can be controlled by a software developer using a host command, as explained below. In the described example, paddle object 350 is controlled by a player by a position control paradigm such that the movement of paddle object 350 is directly mapped to movement of user object 34. In alternate embodiments, ball object 352 or both objects can be controlled by players.

Figure 17A:
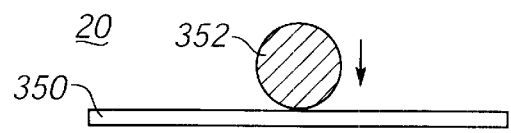
FIGS. 17a—17i are diagrammatic illustrations of a paddle and ball interaction controlled by a paddle command of the present invention.
Figure 17B:
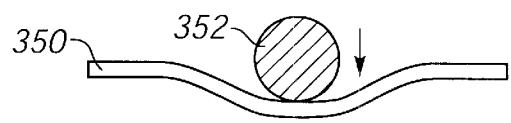
Figure 17C:

FIGS. 17a–17h show how paddle object 350 interacts with a moving ball object 352 as ball object 352 collides with the paddle object. In FIG. 17a, ball 352 first impacts paddle 350. Preferably, an initial force is applied to user object 34 in the appropriate direction. In FIGS. 17b and 17c, ball 352 is moving into the compliant paddle or "sling". Preferably, a simulated mass of ball 352 is felt by the user through user object 34 which is appropriate to the simulated velocity of the ball, the simulated compliance of the paddle, and the strength/direction of simulated gravity. These parameters can preferably be set using a host command with the appropriate parameters. For example, the following host command can be used:

PADDLE (B_mass, B_vel_x, B_vel_y, Gravity, Sense, Compliance_X, Compliance_Y)

where the command parameter B_mass indicates the simulated mass of the ball, B_vel_x and B_vel_y are the velocity of the ball, gravity is the strength of gravity, sense is the direction of gravity, and Compliance_X and Compliance_Y are the simulated compliance or stiffness of the paddle object 34. Other parameters can also be included to control other physical aspects of the computer environment and interaction of objects.

Figure 17D:
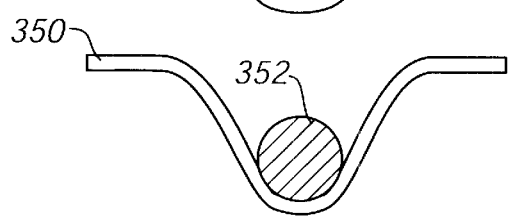
Figure 17E:
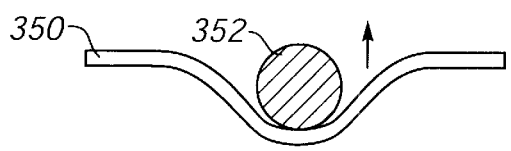
Figure 17F:
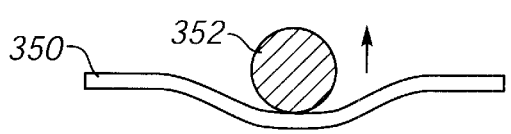
Figure 17G:
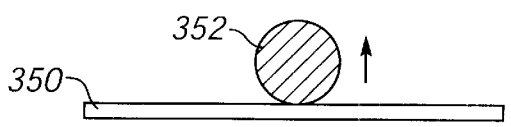
Figure 17H:
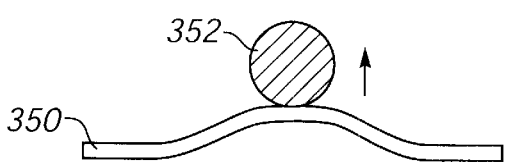

In FIG. 17d, the ball has reached a maximum flexibility point of paddle 34 and can no longer move in the same direction. As shown in FIGS. 17e through 17g, the ball is forced in the opposite direction due to the compliance of the paddle. In addition, the user may preferably exert force on user object 34 to direct the ball in a certain direction and to add more velocity to the ball's movement. This allows the user a fine degree of control and allows a significant application of skill in directing the ball in a desired direction. The force feedback paddle is thus an improved component of "pong" type and other similar video games. In addition, the paddle 350 can optionally flex in the opposite direction as shown in FIG. 17h.

Figure 17I:
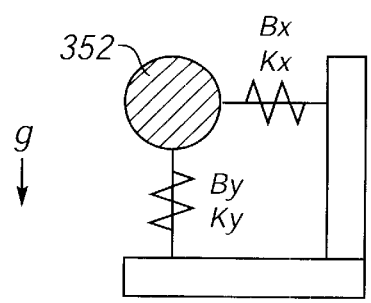

A schematic model of the forces interacting between ball 352 and paddle 350 is shown in FIG. 17i. A spring force indicated by spring constant K is provided in both degrees of freedom X and Y to indicate the springiness of the paddle 350; g is a gravity direction. In addition, a damping force indicated by damping constant B is also provided to slow the ball 352 down once it contacts paddle 350. The spring and damping forces can also be applied in one degree of freedom.

The paddle control algorithm is a dynamic algorithm in which microprocessor 26 computes interaction forces while a ball compresses the paddle and then releases from the paddle. The paddle command is sent by host computer 12 when the ball contacts the paddle. The paddle command reports ball location to the host computer so that the host can update graphics displayed on display screen 20 during the interaction period. In presently preferred embodiments, the updates only need to be provided at about 60 Hz to the host, since most displays 20 can only display at that rate. However, the forces should be computed and output at about 500 Hz or more to provide a realistic "feel" to the interaction. Thus the local microprocessor can compute the forces quickly while occasionally reporting the sensor readings of the paddle to the host at a slower rate. Other types of video game or simulation interactions can also be commanded with a high-level host command in a similar fashion. This concludes the description of position control paradigms.

In addition, a clear command is preferably available to the host computer. This command can include a parameter specifying particular degrees of freedom and allows the host computer to cancel all forces in the specified degrees of freedom. This allows forces to be removed before other forces are applied if the programmer does not wish to superimpose the forces.

Also, a configuration host command can be provided. This command can initially set up the interface device 14 to receive particular communication parameters and to specify which input and output will be used for a particular application, e.g. the host computer can instruct local microprocessor 26 to report specific information to the host computer and how often to report the information. For example, host computer 12 can instruct microprocessor 26 to report position values from particular degrees of freedom, button states from particular buttons of interface device 14, and to what degree to report errors that occur to the host computer. A "request information" command can also be sent by host computer 12 to interface device 14 to receive information stored on the interface device 14 at the time of manufacture, such as serial number, model number, style information, calibration parameters and information, resolution of sensor data, resolution of force control, range of motion along provided degrees of freedom, etc. This information may be necessary to the host computer so that the commands it outputs to the local processor 26 can be adjusted and customized to the particular type of interface device 14. If the USB communication interface is used, other information necessary to that interface can be provided to the host upon a request command, such as vendor identification, device class, and power management information.

In addition, the above described forces can be superimposed. The host computer can send a new host command while a previous host command is still in effect. This allows forces applied to the user object to be combined from different controlling commands. The microprocessor 26 or host computer may prevent certain commands that have contradictory effects from being superimposed (such as a restoring force and a restoring spring). For example, the latest host command sent can override previous commands if those previous commands conflict with the new command. Or, the conflicting commands can be assigned priorities and the command with the highest priority overrides the other conflicting commands.

It should be noted that the high-level host commands and command parameters described above are merely examples for implementing the forces of the present invention. For example, command parameters that are described separately can be combined into single parameters having different portions. Also, the distinct commands shown can be combined or separated in different ways, as shown above with the example of the condition command for providing multiple rate control condition forces.

In addition to common interface devices with one or two rectangular or spherical degrees of freedom, such as standard joysticks, other interface devices can be provided with three or more degrees of freedom. When the third degree of freedom is about an axis along the stick itself, those skilled in the art call it "spin" or "twist." Each degree of freedom of a user object can have its own dedicated high-level host command. By independently associating high-level host commands to each degree of freedom, many possible combinations of position control, rate control, and other abstract mappings can be implemented with interface devices.

For example, for a common joystick with two degrees of freedom, a computer game might allow the joystick to control flight of a spacecraft. Forward-backward motion of the joystick handle might implement thrust control to dictate an acceleration of the spacecraft. Left-right motion of the joystick might implement direction control to dictate an angular velocity of the spacecraft's trajectory. This particular thrust-direction paradigm is particularly popular in current games, but there are many variations. For example, in a flight simulator, the forward-backward motion of the joystick might control the pitch of an aircraft while the left-right motion might control roll of the aircraft. In a driving game, the forward-backward motion of the stick might be a rate control mapping to an acceleration of the car, while the left-right motion might be a position control mapping to a location of the car across a span of road.

Multiple control paradigms may also be mixed in a single degree of freedom. For example, a joystick may have position control for small deviations from the origin in a degree of freedom and rate control for large deviations from the origin in the same degree of freedom. Such a mixed control paradigm can be referred to as a local position/global rate control paradigm.

Figure 18:
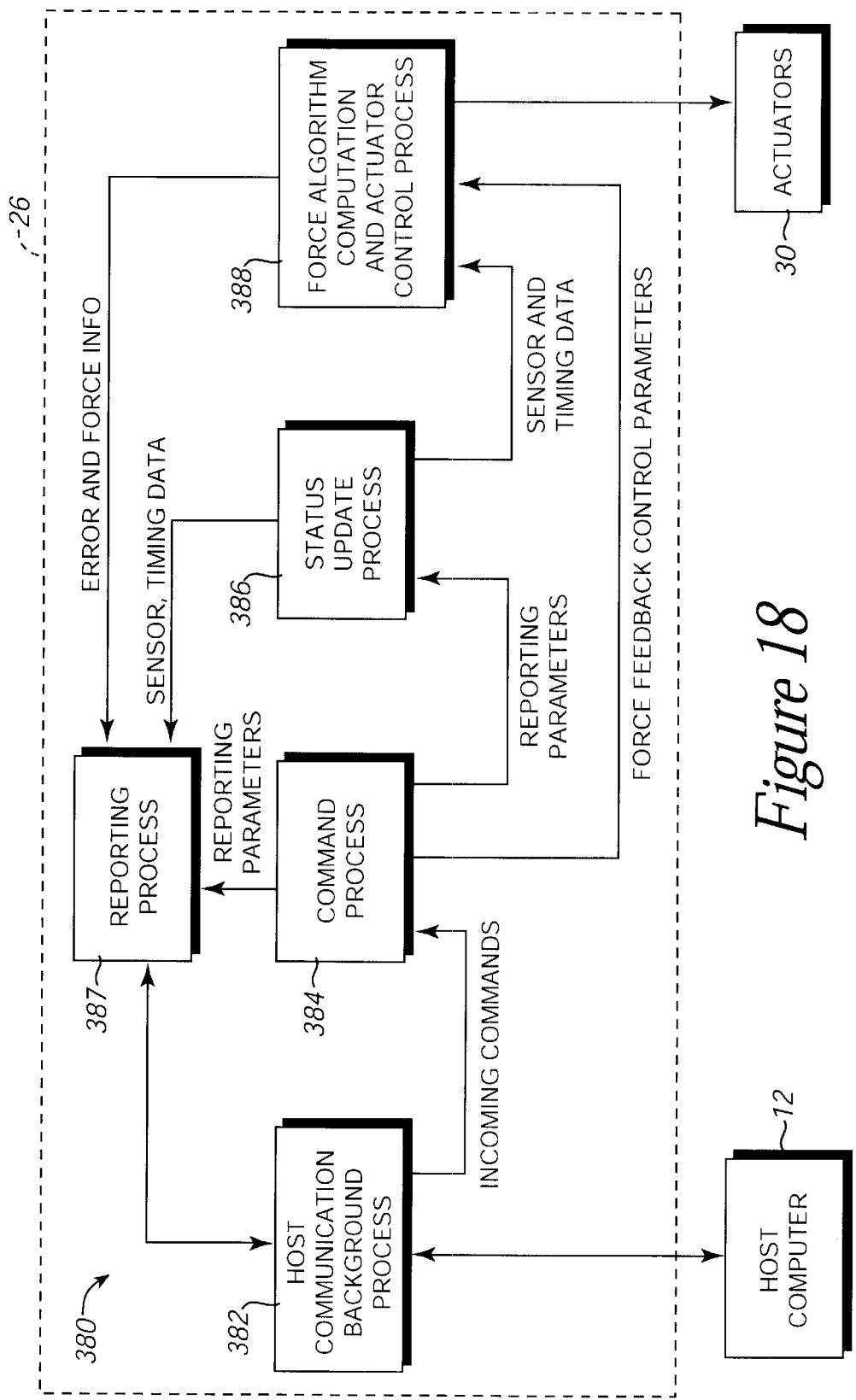
FIG. 18 is a block diagram illustrating an implementation of the local microprocessor of the present invention for controlling a force feedback interface device with host commands containing force parameters.

FIG. 18 is a block diagram illustrating an example of a functional microprocessor 26 implementation 380 of the present invention for processing the host commands and command parameters to output forces to user object 34. Implementation 380 is preferably provided on the microprocessor 26 using instructions stored in memory 27. The use of program instructions to perform operations on a microprocessor is well known to those skilled in the art, and can be stored on a "computer readable medium." Herein, such a medium includes by way of example memory 27 such as RAM and ROM, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive. Preferably, various subprocesses 382, 384, 386, 387, and 388 run in parallel on microprocessor 26 to optimize responsiveness of the force feedback interface device 14. These processes are also referred to as "processors" herein. Various parameters and data are shared by the subprocesses of implementation 380 in a preferred embodiment.

Throughout the following discussion of implementation 380, parameter sets or parameter pages can be stored to speed computation and application of forces. Herein, parameter sets will be considered synonymous with parameter pages. Rather than reading, storing and applying host commands and command parameters (and/or other parameters) as soon as the command is received, all or some of the commands and parameters defining a force environment may be stored and grouped into parameter pages stored in memory 27. This force environment can describe particular forces that may be quickly read from the parameter page. When the appropriate force environment is required by the host computer, the microprocessor can retrieve the parameter page from memory. As with page swapping in video display systems, implementation 380 could then use active pages for a current force environment and "hidden" pages for command/parameter sets under construction. In addition, preset or predefined force environments can be retrieved, which are standardized force environments that are provided with interface device 14 or which can be loaded onto interface device 14 from the host computer. In the preferred embodiment, a stored parameter page would include force parameters and reporting parameters, which are internal microprocessor parameters that are derived from the host command and command parameters and which are discussed below.

Host communication and background process 382 maintains communication between the microprocessor 26 and the host computer 12. Host communication and background process 382 receives high-level host commands and command parameters from the host 12 and sends this data to a command process 384. Process 382 also receives sensor data from a reporting process 387 described below. Process 382 directly relays information received from process 387 to the host 12. Essentially, process 382 acts as a communication "switchboard" between the microprocessor 26 and the host computer 12. Preferably, process 382 (or process 384) manages an input buffer on microprocessor 26 which is used to buffer incoming commands and data from host computer 12. The input buffer is especially useful in embodiments including the USB interface and other interfaces with high communication rates.

The command process 384 processes incoming high-level host commands and command parameters from the host 12 and transmitted via the host communication and background process 382. Based on the incoming commands, the command process 384 sets reporting parameters and force feedback control parameters. These types of parameters are internal parameters of microprocessor 26 and are to be distinguished from the command parameters 308 included in a high-level host command sent by the host. The internal parameters are derived from the command parameters and may, in some instances, be identical to the command parameters, as explained below.

The reporting parameters are internal parameters that specify to the microprocessor 26 which particular data and at what rate to report to host computer 12. The reporting parameters can, for example, specify whether to report positions or velocities of user object 34 for particular degrees of freedom, a communication speed, or whether and in what way errors are reported. The reporting parameters are derived from the configuration commands received from the host computer 12 and are provided to the status update process 386 and reporting process 387 so that process 387 knows which information to report to the host computer 12 via the host communication and background process 382.

Force feedback control parameters ("force parameters") are internal parameters that are provided or updated by command process 384 and are used by force algorithm computation and actuator control process 388. The force parameters are derived from the command parameters 308 included in the received host command. Command process 384 examines the command parameters and updates the internal force parameters so that the other processes 388 and 386 can access the most recent force parameters. This process of providing/updating force parameters implemented by process 384 is described below with reference to FIG. 19.

The status update process 386 receives reporting parameters from the command process 384. Based on the parameters received, process 386 reads sensors 28 and clock 29 and stores sensor reading histories and timing histories. Process 386 also can compute values, such as velocity or acceleration values, derived from sensor position data, the sensor data histories, timing data, or combinations of this data. Herein, the term "sensor data" refers to both data received directly from the sensors (sensor readings) and/or values derived from the sensor readings, including histories of sensor data. "Timing data" or "time data" refers to specific values representing a period of time, including histories of timing data. Periodically, reporting process 387 reads data provided and stored by process 386 (or process 386 could send the data to process 387 directly). The sensor and timing data is also "sent" to a force algorithm computation and actuator control process 388. The term "sent" or "received" herein refers to one process providing data that another process eventually receives. The actual implementation to send and receive data between processes can vary in different embodiments. For example, the sending process may store computed data in memory and the receiving process can retrieve the data from memory at its own rate.

Reporting process 387 receives sensor data from status update process 386 and reports this data to host computer 12 at appropriate times or upon receiving a request from the host 12 through background process 382. Reporting parameters are sent to process 387 by command process 384. In addition, general status and error information may be sent to reporting process 387 from force computation process 388. The process implemented by reporting process 387 is described in greater detail with respect to FIG. 21. In alternate embodiments, reporting process 387 can be merged with background process 382, for example, if reporting data to the host at a regular rate (in "stream" mode).

Force algorithm computation and actuator control process 388 uses force parameters and sensor data from the command process 384 and the status update process 386 to compute forces to be applied to user object 34. The force parameters are derived from command parameters that characterize various force models, as described in detail above. Process 388 computes a resultant force to be applied to actuators 30 by combining effects of all force models in effect.

It should be emphasized that the processes 382, 384, 386, 387, and 388 within the implementation 380 in FIG. 18 preferably run in parallel on the microprocessor 26, e.g., using a multi-tasking environment. Running all these processes sequentially would dramatically slow the force feedback response to user manipulation of the user object 34.

The implementation 380 shown in FIG. 18 is intended as an example of a way to divide he various subprocesses of microprocessor 26 into logical divisions. In other embodiments, various other implementations can be provided to join or separate some or all of the described functions of microprocessor 26.

Figure 19:
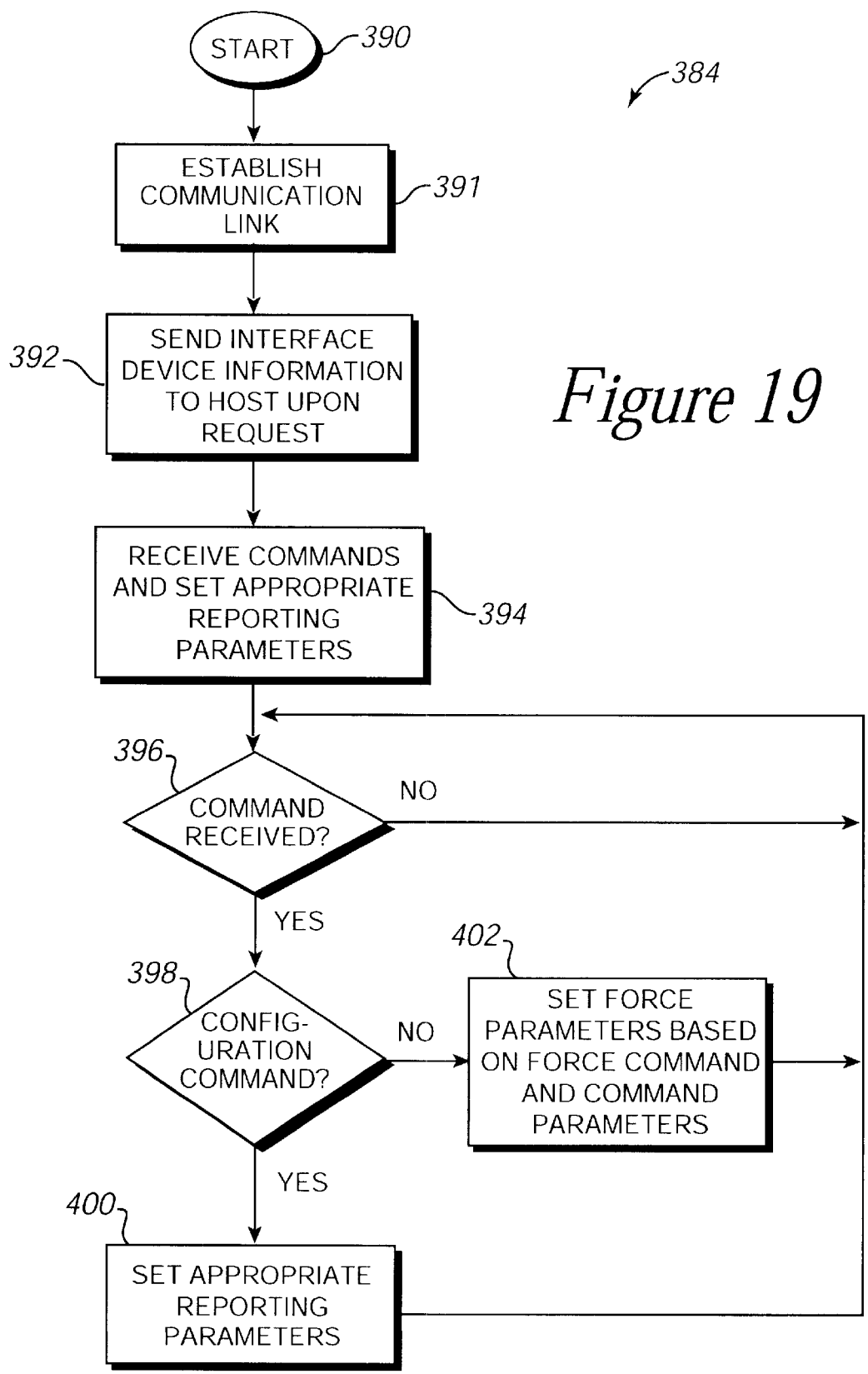
FIG. 19 is a flow diagram illustrating a host communication background process of FIG. 18.

FIG. 19 is a flow diagram illustrating command process 382 of FIG. 18 in greater detail beginning at 390. Initially, the host computer will establish a communication link with interface device 14 in step 391. This can be accomplished by sending a predetermined signal or information which the interface device is waiting to receive. The interface device then can send an answer signal indicating it is ready to receive commands. If the USB communication interface is being used, the command process 382 preferably requests a USB address from the host, which the processor 382 then receives and stores. Whenever a data packet is then sent from the host, the command processor 384 can check the address of the data packet and compare it to the stored address to determine if the packet is meant for the microprocessor 26.

In addition, if USB is being implemented, the command processor 384 can check for data in the USB communication protocol and reporting processor 387 can send out data in this protocol. This protocol includes a token packet, followed by a data packet, which is followed by a handshake packet, as is well known to those skilled in the art. The host commands can be encrypted in the data packets.

In next, step 392, host computer 12 may require the characteristics of the interface device 14 so that appropriate force feedback commands suited to the particular interface device can be provided by the host computer. These characteristics may include, for example, the serial number, model number, style, number of provided degrees of freedom of user object 34, calibration parameters, and reporting rate of the interface device. Upon receiving a request for such information from the host computer 12, such as a "request information" command, the microprocessor 26 sends the information to the host computer 12 in step 392. The host computer would normally request these characteristics only at power-up or at the start of force feedback implementation.

In next step 394, the microprocessor 26 receives configuration commands from the host computer 12 and sets appropriate reporting parameters. As mentioned above, the reporting parameters may determine whether such information as sensor data, which includes sensor readings, values computed from sensor readings, and/or sensor "histories" (i.e., a number of previously recorded or computed sensor values), or clock time values are sent to the host computer 12 from the status update process 386. The sensor data may include sensor error data, histories of data describing which buttons have been pressed on the interface device, positions, velocities, and/or accelerations of the user object, data from which degrees of freedom will be reported to the host computer, and whether data is reported to the host computer in a query or stream mode. These configuration options allow the programmer to set up which data the host computer will receive from the local microprocessor. For example, if an application requires user object position data in only one of two provided degrees of freedom, then it is a waste of processing time for the microprocessor to be sending information of the unused degree of freedom to the host computer. The programmer can set reporting parameters with configuration commands to send only the necessary data to the host computer.

In next step 396, the process checks if a host command has been received. If not, step 396 loops continuously until a host command is received. Step 398 is then implemented, in which the process determines whether the received command(s) is a configuration command. A configuration command sets the reporting parameters, as described above. If the command is a configuration command, step 400 sets appropriate reporting parameters and/or resets the reporting parameters to provide a new configuration during the operation of the interface device. If step 398 determines that the received command is not a configuration command, then step 398 has detected a force command which controls force feedback functionality of the interface device 14. Force commands include those host commands that provide command parameters that affect the internal force parameters (e.g., the host commands shown in FIGS. 9 and 14).

In step 402, the force commands and command parameters set force parameters, such as those related to implementing a particular force paradigm or model specified by the force command. Process 388 accesses these force parameters in memory to apply forces using actuators 30, as described with reference to FIG. 22. As an example, the force command and force parameters may designate particular buttons on the interface device 14 and assign a jolt force model to each designated button. If a user then presses a designated button, the jolt assigned to the pressed button would in turn be activated using whatever force parameters are currently in memory. An example of force parameters is described below with reference to FIG. 23. After setting the force parameters, step 402 then transfers control back to step 396 to wait to receive another host command.

In addition, in the preferred embodiment, process 384 also is regularly checking/receiving for a "heartbeat" signal from host computer 12 after a predetermined time interval. This signal would be a safety check to indicate that the host computer is still connected to interface device 14 and that the host has an "OK" status. If no heartbeat signal is received within the time interval, the interface device 14 can deactivate and wait for an initialization command from the host. The "heartbeat" signal can be a normal signal or host command, or it can be a signal specifically used as a heartbeat signal that the host computer can send if no other signals have been sent within the time interval. After a signal has been received in step 396, process 384 preferably stores the time that the signal was received in a particular memory location. Process 388 can examine this time to determine if the interval has been exceeded (described below).

Figure 20:
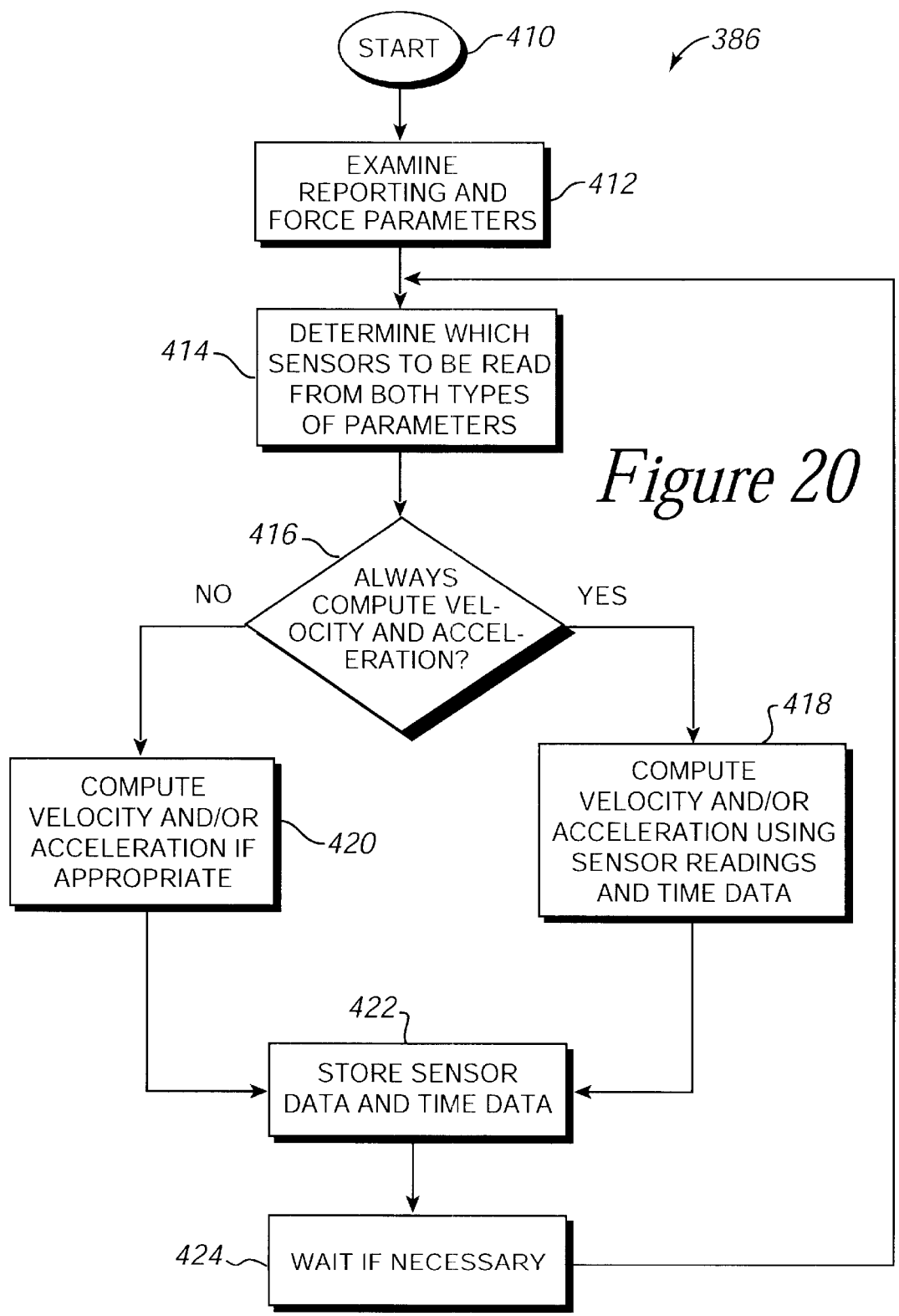
FIG. 20 is a flow diagram illustrating a command process of FIG. 18.

FIG. 20 is a flow diagram illustrating status update process 386 of FIG. 18, beginning at a step 410. In step 412, the process 386 examines reporting and force parameters set by the command process 384. Preferably, process 386 examines the reporting and state parameters in memory 17 which have been updated by command process 384. From both the reporting and force parameters, step 414 determines which sensors will be read. The force parameters determine which sensor data is necessary for the process 388 to compute a force. For example, if the force parameters determine that a force needs to be calculated about the x-axis and not the y-axis, then the sensor data from the y-axis sensors is not needed to computer forces. The reporting parameters determined which sensor data to report to the host computer. Thus, the reporting parameters may also specify that y-axis sensor data does not have to be sent to the host computer, since the host computer is ignoring that particular data. Thus, since the y-axis data is both not being used to compute a force and is not needed by host 12, the microprocessor 26 determines in step 414 not to read the y-axis sensors.

Step 416 determines whether velocity and/or acceleration are always computed. The result of this step depends on the particular embodiment that is implemented. In some embodiments, it may be simpler and require less processing time if velocity and/or acceleration data are always computed, regardless of whether the velocity/acceleration data is needed to compute forces or to be sent to host 12. In other embodiments, the velocity/acceleration data can be computed only if such data is necessary to compute force values or if the host 12 requires these values. In yet other embodiments, the mode ("always compute" or "compute only when necessary") can be set depending on the particular application or other determining factor.

In an embodiment that always computes velocity and acceleration, step 418 is implemented, in which the velocity and/or acceleration values are computed using sensor readings and timing data. For example, a history of recorded position values and associated time intervals can be used to calculate velocity. The process then continues to step 422. If such an embodiment is not being used, then step 420 computes the velocity and/or acceleration values only if appropriate. The process 386 can examine the force parameters and reporting parameters, similarly as in step 414, to determine if velocity and/or acceleration values should be computed.

After step 418 or 420, step 422 is performed, in which the process 386 stores in memory 27 the sensor data and timing data read from sensors 28, clock 29, and computed in step 418 or 420. The sensor data and timing data may also include data pertaining to other input devices 39, e.g., if a button has been pressed (sensor data) and how long a button on the interface device 14 has been pressed (timing data) so that a button repeat or button hold ("autofire") feature may be activated at the proper time. As noted above, process 386 is preferably sharing the microprocessor's 26 processing time since multiple processes are running in parallel (multitasking). In this case, the process 386 may need to wait at step 424 until the microprocessor 26 is available or to purposely allow another waiting process to use microprocessor 26. In addition, the waiting step may be necessary to write output data to memory 27 at a consistent or slower time to allow force computation process 388 greater flexibility in reading the output data from the memory.

Figure 21:
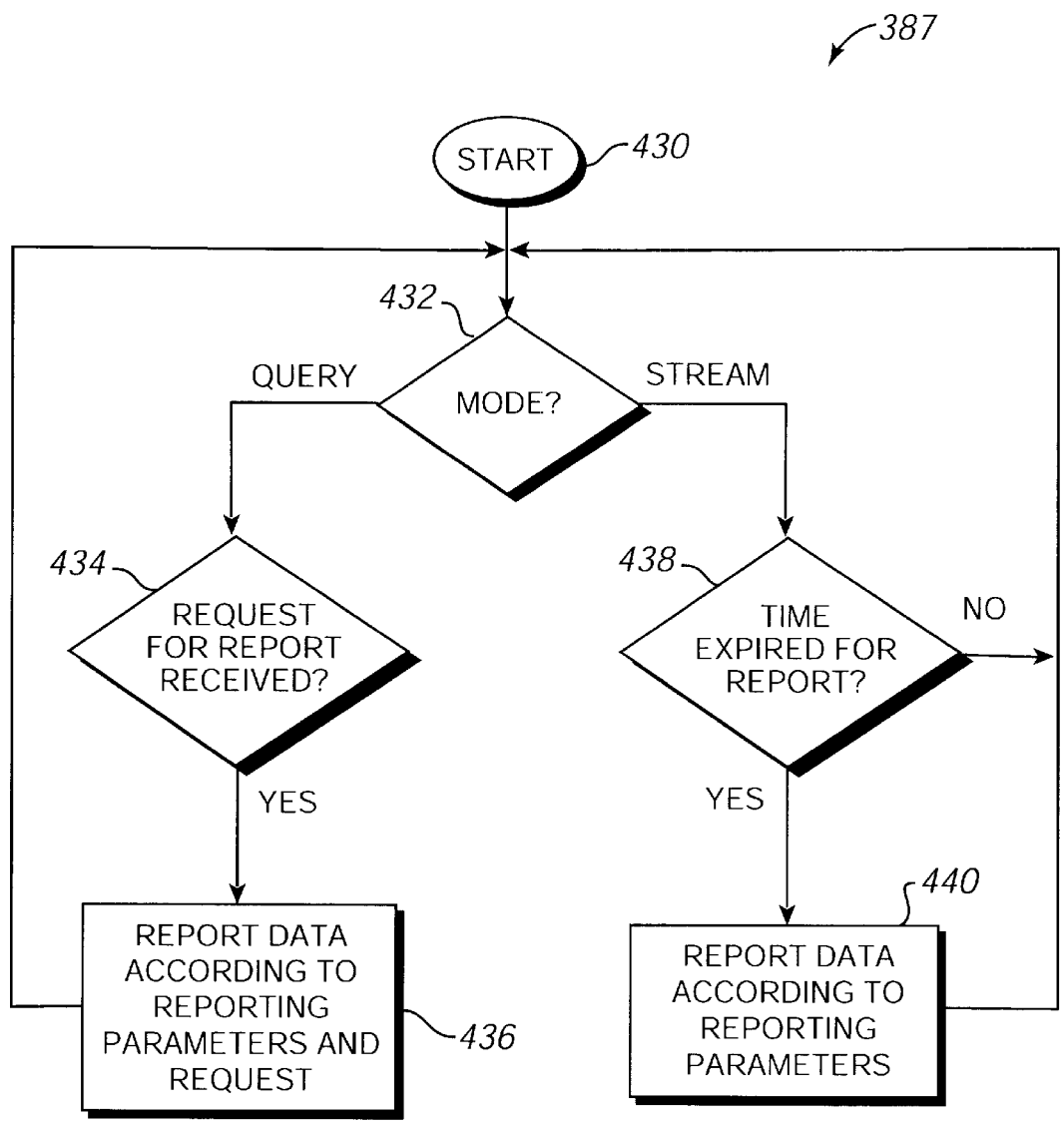
FIG. 21 is a flow diagram illustrating a reporting process of FIG. 18.

FIG. 21 is a flow diagram illustrating reporting process 387 of FIG. 18 to report data to the host computer, beginning at a step 430. Step 432 determines whether reporting is done in query or stream mode as specified by the reporting parameters set by command process 384. In this discussion, query mode uses an asynchronous reporting method based on requests for information from the host computer, and stream mode uses a synchronous reporting method based on predetermined time intervals.

In query reporting mode, step 434 determines whether a request for a report has been received from host computer 12. The request can be received directly by reporting process 387, or, alternatively, the request can be relayed to reporting process 387 through command process 384. When the request is received, step 436 reports (i.e., sends out) sensor data and timing data stored in step 422 in FIG. 20 and error information and force values from process 388 to the host. The particular data sent out depends on the reporting parameters specified by the configuration commands and the request received from the host. For example, in some embodiments, the host 12 may be able to request particular information. The process then returns to step 432 to determine if query or stream mode is being used. Thus, in the described embodiment, modes can be switched at any time during data transmission. In alternate embodiments, one particular reporting mode may be the only option available. Alternatively, both modes may be available, but once one mode is selected at the beginning of the operation of interface device 14, that mode may not be switched.

In stream reporting mode, step 438 determines whether the reporting time period has expired. Preferably, a standard reporting time period is set when the interface device and host computer 12 are first set up. When the time period has expired, step 440 reports data stored in step 422 in FIG. 20 in accordance with the reporting parameters. If time has not expired, the process returns to step 432 to again determine the reporting mode.

Figure 22:
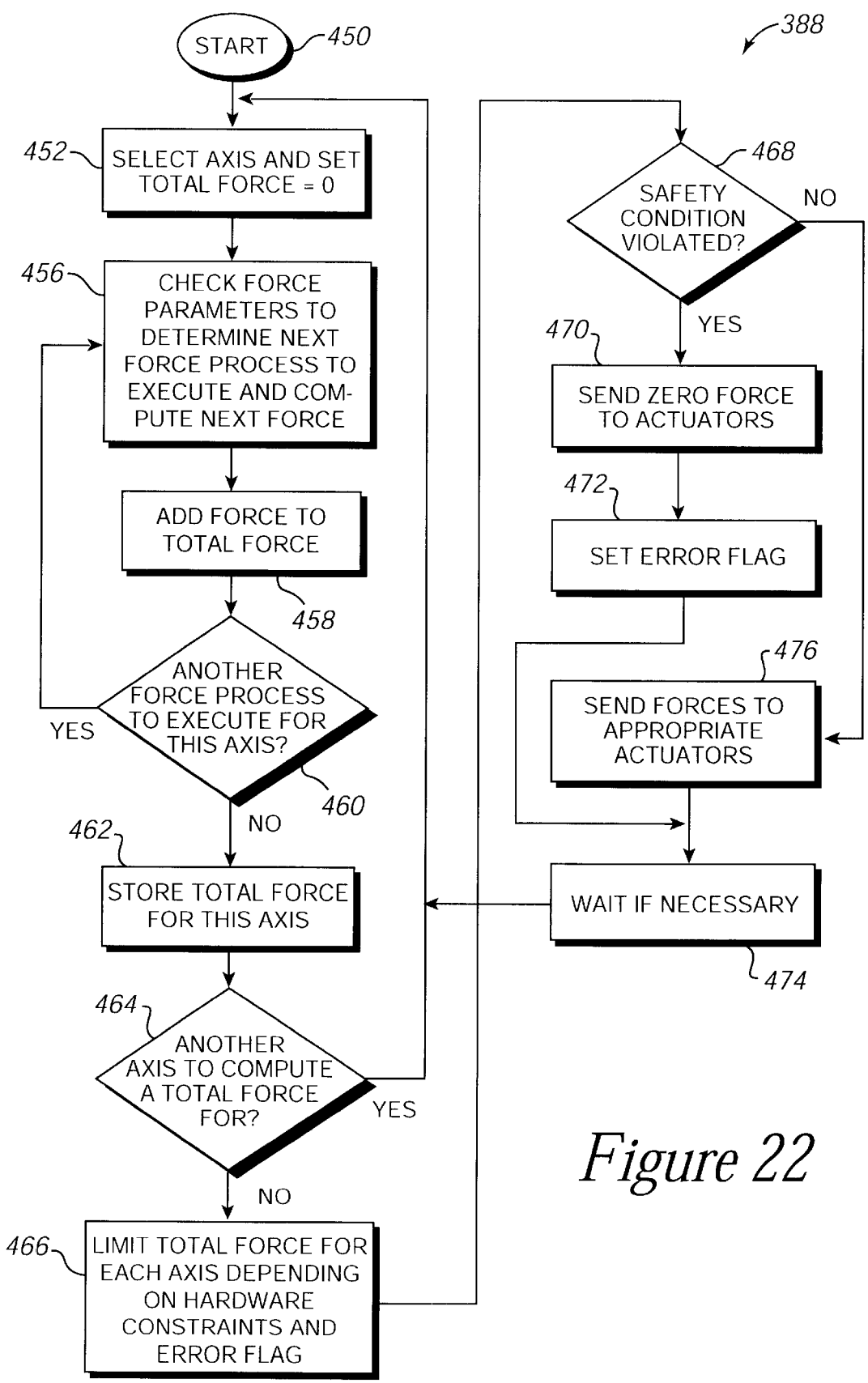
FIG. 22 is a flow diagram illustrating force algorithm computation and actuator control process of FIG. 18.

FIG. 22 is a flow diagram illustrating force algorithm computation and actuator control process 388 of FIG. 18 beginning at a step 450. Preferably, all forces in each degree of freedom are initialized to zero before step 450 at power up or upon receipt of a clear command from the host computer 12. Thereafter, process 388 would begin at 450 and proceed with step 452. In step 452, an axis or degree of freedom for which a force is to be applied is selected. Herein, "axis" is synonymous with a degree of freedom provided by the interface device 14. If two axes require forces to be applied, an axis that has not had a force applied in the current iteration is preferably selected in step 452. For example, if forces are required about the x and y axes, and if the force on the x axis was just computed and applied in the previous iteration of the loop, then the y-axis is preferably selected. In addition, a total force in the selected axis is initialized to zero in step 452.

Step 456 computes a force in the selected axis according to the next reflex process selected in accordance with the force parameters. This step preferably includes selecting an appropriate reflex process, retrieving the necessary sensor data, timing data, and other data, and computing a force value using the selected reflex process and retrieved data. The reflex process is selected by examining the force parameters. The current values of the force parameters reflect the host commands that are currently in effect. Since multiple host commands (reflex processes) may simultaneously be in effect, the force parameters are examined by process 388 to determine one of the reflex processes to execute to compute a force. Thus, process 388 can examine the force parameters to determine which commands were sent by host computer, and determine which reflex process to execute in accordance with those commands. As described above with reference to FIG. 5, the reflex process can include process steps, equations, force profiles, or other combinations of instructions to compute a force from sensor data, timing data, command parameters, other input data from input devices 39, and/or other related information. The command parameters are reflected in the force parameter values. Process 388 thus retrieves the necessary sensor data, timing data, force parameters and/or other data required by the selected reflex process to compute a force value.

In step 458, process 388 adds the force value computed in step 456 to the total force for the axis initialized in step 452. In alternate embodiments, process 388 may limit the total force value or a portion of the total force value computed in step 458. For example, if process 388 is keeping track of which force values are condition forces and which force values are overlay forces, the process 388 can limit the sum total of condition forces to a predetermined percentage of maximum actuator force output, such as 70% of maximum output. This allows some of the available force range to be used for overlay forces, such as button jolts, vibrations, etc. that may applied on top of the condition forces. This limiting is preferably performed after all condition forces that are in effect have been computed, so that overlay forces can be applied over the sum of all condition forces. Other forces can be limited in alternate embodiments.

In next step 460, process 388 determines if another reflex process needs to be executed for the currently selected axis. This would be true if additional host commands are in effect for which forces have not yet been computed and added to the total force. If so, the process returns to step 456 to check the force parameters, execute another reflex process to compute a force, and add that force to the total force. If, in step 460, there are no more reflex processes to be executed for the selected axis, then total force represents all forces in effect on the selected axis. Total force for the selected axis is then stored in memory 27 in step 462.

In step 464, process 388 determines whether another axis (degree of freedom) needs to have a total force value computed. If so, steps 452, 456, 458, 460, and 462 are repeated for other axes until the total forces for the other axes are computed and stored.

If step 464 determines that there are no more axes (degrees of freedom) for which forces need to be computed, step 466 may limit the total force on each axis. Since the total force on an axis computed above may exceed hardware specifications of the interface device, such as actuator force output, step 466 sets the total force to lie within the hardware's design range. Step 466 also may modify the total force computed above when it may be unsafe to the user as indicated by an error flag. For instance, in the preferred embodiment, an error flag may be set if a safety condition is violated, as described in steps 468–472 below. This causes the output force to be zero. In the preferred embodiment, the process 388 applies a smoothly increasing force to user object 34 after such a safety condition, since an abrupt jump in force output at the level before the safety condition might be dangerous for the user. In step 466, the process 388 can check how long ago the error flag was set by examining error timing information, and can limit the total force in accordance with a smooth ramp function of increasing force.

Next step 468 applies safety conditions to the total force on each axis resulting from step 466. Safety conditions may be violated when, for example, safety switch 41 as shown in FIG. 1 is activated, or when a specific command is sent by the host computer 12. When the safety conditions are violated, forces on the actuators 30 are sent to zero in step 470. The error flag is then set in step 472 indicating the violation and timing information is written as to when the error occurred. Process 388 then waits in step 474 until the microprocessor 26 is once again ready to proceed, similar to step 424 of FIG. 20.

As an additional safety feature, process 388 preferably examines memory 27 to determine if the host's "heartbeat" signal has been received within the required time interval. If process 388 determines that the last signal was received outside of the allowed interval, then process 388 assumes that the host has been disconnected or has had an error. All power to actuators 30 is thus turned off as a safety measure until an appropriate initializing command is received from the host.

If the safety conditions are not violated in step 468, the total force for each axis is signaled to the appropriate actuators 30 to apply corresponding forces on those axes of the user object 34. In addition, process 388 can send any error information and any force values that have been output to reporting process 387, which determines whether to send the data to the host as described above (error information is sent to process 387 regardless of safety conditions). Preferably, process 388 writes this information to memory where reporting processor 387 may retrieve it. Subsequently, process 388 waits at step 474 until the microprocessor 26 is ready. After step 474, the process returns to step 452 to select another axis in a new iteration of force computation and application.

An illustrative application of the implementation 380 is now described with reference to FIG. 23. In this example, a sluggish force will be applied to the user object 34 by the host computer 12 sending a SLUGGISH host command. A restoring spring force using a SPRING host command will then be commanded. Both the sluggish and restoring spring force models were discussed above under rate control paradigms and are listed in FIG. 9.

The force parameters 480 and 482 in FIG. 23 represent locations in memory 27 used to store the force parameters for the SLUGGISH and SPRING commands. Preferably, a set of locations is similarly allocated to store force parameters for each command implemented by the microprocessor 26. The force parameters resulting from each host command 484 sent by the host computer 12 is shown. The locations of the sluggish force parameters are labeled by damping coefficients (B) for velocity components in positive and negative X and Y directions. Similarly, the spring table locations are labeled by spring coefficients (K) in the positive and negative X and Y axes and deadband sizes in the X and Y axes.

Three host commands 484 are illustrated sequentially in FIG. 23:

SLUGGISH(50, X bi)
SLUGGISH(90. X(+) uni)
SPRING(65, X bi, 85)

The two SLUGGISH command parameters 308 are the damping coefficient and style. The coefficient is a percentage of a maximum damping coefficient: 50% and 90%. The style command parameter in the first SLUGGISH command indicates a bi-directional force on the X axis. The style parameter in the second SLUGGISH command indicates a unidirectional force on the X axis in the positive direction on that axis.

The three SPRING force feedback parameters are spring coefficient, style, and deadband. The spring coefficient parameter indicates 65% of a maximum spring coefficient. The style parameter indicates that the force is bi-directional in the X axis. The deadband is 85% of a maximum deadband size.

A duration command parameter can also be included for each of the host commands 484, as shown in FIG. 9, to provide the length of time that the command will be in effect. In the present example, however, the commands are assumed to be of infinite duration, and thus no duration command parameter is shown. The commands can be cancelled, for example, by a clear command from the host. Alternatively, as shown, the commands can be cancelled or changed by another command of the same type.

After the requested interface device information is sent to the host 12 in step 392 in FIG. 19, the host communication and background process 382 receives configuration commands in either step 394 or step 398. These configuration commands cause appropriate reporting parameters to be set. These reporting parameters can be implemented, for example, as flags corresponding to each allowed degree of freedom, other input device 39, position/velocity, query/stream mode, etc. to indicate whether to report data from those devices to the host (and to select modes, when appropriate). For maximum efficiency, the reporting parameters would only have flags set for the X axis, since Y-axis data is not necessary. However, the Y-axis sensor data might be needed by host computer for other reasons, and thus still might have flags set and thus be reported to the host.

Thereafter, the force parameters 480 and 482 are set in step 402 of FIG. 19 based on the SLUGGISH and SPRING host commands and the command parameters they include, as shown in FIG. 23. The command SLUGGISH(50, X bi) causes step 402 to write "50" in the force parameter locations 486 corresponding to x-axis coefficients $B_X(+)$ and $B_X(-)$. All the remaining locations of all the other force parameters are zero, since it is assumed that the first sluggish command is the first command received by interface device 14 after power up.

The other processes 386 and 388 examine the force parameters 480 and 482 (as well as other force parameters for other reflex processes) and are implemented as shown in FIGS. 20 ad 22. Thus, when state update process 386 determines which sensors to be read in step 414 of FIG. 20, it examines the force parameters 480 and 482 to determine which commands are in effect. Since all of the restoring force parameters 482 for the restoring spring force are zero, a restoring spring command is not in effect (processes 386 and 388 only actually need to look at a subset of the force parameters to determine if the command is in effect). However, force parameters 480 include two values ("50"), and thus is in effect. Thus, only the x-axis sensors need to be read (assuming the host does not need y-axis information, as indicated by the reporting parameters). In step 420 (if implemented), process 386 would calculate velocity from the sensor readings (and/or a history of sensor readings) and timing data, since the sluggish command requires a velocity value to compute a force (accelerations are irrelevant in the present example).

Process 388 would check force parameters 480 and 482 in step 456 of FIG. 22. The X axis is the only relevant axis to select in step 452. Since force parameters 482 are all zero, process 388 knows not to execute a restoring spring reflex process. Since force parameters 480 do include non-zero values, a sluggish reflex process should be executed. In one example, the reflex process would include the equation F=BV, where B is the coefficient stored at locations 486a and 486b, and V is the velocity calculated by state update process 386. F is the total force that would be output by actuators 30 about the axis. Preferably, all the available host commands have force parameters that processes 386 and 388 would similarly check to determine which commands are in effect.

Referring back to FIG. 23, the second command SLUGGISH (90, X+ UNI) is sent by host computer 12 after the first sluggish command. Since the second SLUGGISH command is uni-directional in the positive x-axis, only the first location 486a for the $B_x(+)$ force parameter has the new coefficient "90" written over the previous value. The restoring spring force parameters are unchanged by the SLUGGISH commands. One way to cancel the first SLUGGISH command would be to send a second SLUGGISH command having all command parameters equal zero.

The status update process 386 would operate similarly for the second SLUGGISH command as for the first SLUGGISH command. The force algorithm computation and actuator control process 388 would operate similarly as well, except that the sluggish reflex process selected in step 456 of FIG. 22 would compute a different sluggish force for velocities in the positive x direction (based on a coefficient of 90) than in the negative x direction (based on a coefficient of 50). The process 388 would use the sensor information from status update process 386 to determine which direction the user was moving the user object and use the appropriate coefficient.

Referring back to FIG. 23, the third command sent by host 12 is the SPRING command SPRING (65, X BI, 85). Step 402 of FIG. 19 thus changes the restoring spring force parameters 482 by writing 65 for $K_x(+)$ and $K_x(-)$ and 85 for $DB_x$. The SLUGGISH force parameters are unaffected by the SPRING command and thus remain in effect with the previous values. Process 388 would execute the sluggish reflex process and compute a force, then execute the restoring spring reflex process and compute a force. The restoring spring reflex process could be, for example, implemented by the equation F=kx, where k is the spring constant and x is the position of the user object with respect to the origin position. The two forces from sluggish and spring reflex processes would be added together at step 458. Therefore, the sluggish and restoring spring force models are superimposed on the user object 34 after the SPRING command in FIG. 23. This would create a viscous feel on the user object 34 and simultaneously apply force toward the origin position of the user object.

More generally, for other command sequences not shown in FIG. 23, any number of force models may be superimposed. For example, two forces could be superposed if the first SLUGGISH command were immediately followed by the SPRING command.

Alternatively, the three commands shown in FIG. 23 can be received by microprocessor 26 and all the force parameters shown after the SPRING command can be stored as a parameter page in memory to form a "force environment." When this force environment was desired to be applied to user object 34, the page of force parameters and reporting parameters would be retrieved and processed by processes 386 and 388. This can be useful when many different commands are desired to be applied simultaneously: The microprocessor would not apply each host command as it was received, but would load all the desired force parameters for a force environment at once from memory.

While this invention has been described in terms of several preferred embodiments, it is contemplated that alterations, modifications and permutations thereof will become apparent to those skilled in the art upon a reading of the specification and study of the drawings. For example, many possible types of actuators and sensors can be used in the present invention. Also, many types of mechanisms can be included to provide one or more degrees of freedom to object 34. In addition, different types of interfaces can be used to connect the host computer to the local microprocessor. A wide variety and types of forces can be transmitted to a user object by the present invention. Many different types of force models can be implemented in many distinct processes running on the microprocessor, only some of which are described herein. In addition, the application of reflex processes on a local microprocessor can be implemented in a variety of ways. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A tactile feedback computer peripheral device in communication with a host computer running a graphical environment, the peripheral device comprising:

a user manipulatable object on said tactile feedback computer peripheral device, said user manipulatable object moveable by said user in at least one degree of freedom;

at least one sensor within said tactile feedback computer peripheral device, said sensor detecting the position or motion of said user maniputable object;

at least one button on said tactile feedback computer peripheral device, said button depressible by a user;

at least one actuator within said tactile feedback computer peripheral device, said actuator operative to output forces based on a control signal; and a controller local to said tactile peripheral device, said controller enabled to
repeatedly read signals from said at least one sensor,
repeatedly read signals from said at least one button,
repeatedly report data representing the state of said sensor and said button over a communication channel to a host computer,
receive over said communication channel a plurality of different host commands sent from said host computer, at least one of said host commands being a force command sent by said host computer in response to a collision between at least two objects in said graphical environment, and control at least one actuator in response to said force command so as to create one or more forces felt by the user of said tactile feedback computer peripheral, wherein said force command describes a tactile sensation to be associated with said collision and caused by said one or more forces, wherein said host command includes a command identifier for identifying said tactile sensation and at least one command parameter that characterizes said tactile sensation, wherein said at least one command parameter includes a deadband parameter that specifies a predetermined deadband region of one of said degrees of freedom in which a force output magnitude is to be approximately zero, and wherein said predetermined deadband region is centered at an origin position of said user manipulatable object in said degree of freedom.

2. A tactile feedback computer peripheral device as recited in claim 1 wherein said tactile sensation described by said host command is a restoring spring force having said deadband region.

3. A tactile feedback computer peripheral device as recited in claim 2 wherein said restoring spring force controls a rate control function of host software run by a host computer in communication with said tactile feedback computer peripheral device.

4. A tactile feedback computer peripheral device as recited in claim 1 wherein said tactile sensation described by said host command is a groove sensation having said deadband region.

5. A tactile feedback computer peripheral device in communication with a host computer running a graphical environment, the peripheral device comprising:

a user manipulatable object on said tactile feedback computer peripheral device, said user manipulatable object moveable by said user in at least one degree of freedom;

at least one sensor within said tactile feedback computer peripheral device, said sensor operative to detect the position or motion of said user maniputable object;

at least one actuator within said tactile feedback computer peripheral device, said actuator operative to output forces on said user manipulatable object based on a control signal; and a controller local to said tactile peripheral device, said controller enabled to repeatedly read signals from said at least one sensor, repeatedly report data representing the state of said sensor over a communication channel to a host computer, receive over said communication channel a plurality of different host commands sent from said host computer, at least one of said host commands being a force command sent by said host computer in response to a collision between at least two objects in said graphical environment, one of said objects being influenced by said data representing the state of said sensor, and provide said control signal to said at least one actuator in response to said force command so as to create one or more forces felt by the user of said tactile feedback computer peripheral, wherein said force command describes a tactile sensation to be associated with and correlated with said collision and caused by said one or more forces, wherein said host command includes a command identifier for identifying said tactile sensation and at least one command parameter that characterizes said tactile sensation, and wherein said force command also includes a deadband parameter indicating a size of a deadband region around an origin position of said user manipulatable object, wherein no forces are output when said user manipulatable object is in said deadband region.

6. A tactile feedback computer peripheral device as recited in claim 5 wherein said at least one command parameter includes a saturation parameter that specifies a maximum force output for said tactile sensation for one of said degrees of freedom.

7. A tactile feedback computer peripheral device as recited in claim 6 wherein said saturation parameter specifies said maximum force output for a displacement of said user manipulatable object, said tactile sensation being a spring force sensation.

8. A tactile feedback computer peripheral device as recited in claim 6 wherein said saturation parameter is expressed as a percentage of the maximum force output of said at least one actuator.

9. A tactile feedback computer peripheral device as recited in claim 6 wherein said tactile sensation is a condition force sensation.

10. A tactile feedback computer peripheral device as recited in claim 6 wherein said tactile sensation is a barrier tactile sensation that provides a resistive force applied to said user manipulatable object that increases linearly with motion of said user manipulatable object into a barrier region.

11. A tactile feedback computer peripheral device as recited in claim 10 wherein said host command also includes a hardness parameter that indicates a magnitude of resistance force applied to said user manipulatable object when said user manipulatable object is within said barrier region.

12. A tactile feedback computer peripheral device as recited in claim 10 wherein said host command also includes a location parameter that indicates a location of said barrier region in said degree of freedom of said user manipulatable object.

13. A tactile feedback computer peripheral device as recited in claim 10 wherein an assistive force is applied to said user manipulatable object immediately after said user manipulatable object moves through said barrier region.

14. A tactile feedback computer peripheral device in communication with a host computer running a graphical environment, the peripheral device comprising:

a user manipulatable object on said tactile feedback computer peripheral device, said user manipulatable object moveable by said user in at least one degree of freedom;

at least one sensor within said tactile feedback computer peripheral device, said sensor detecting the position or motion of said user maniputable object;

at least one actuator within said tactile feedback computer peripheral device, said actuator operative to output forces based on a control signal; and a controller local to said tactile peripheral device, said controller enabled to read signals from said at least one sensor and report data representing the state of said sensor over a communication channel to a host computer, receive over said communication channel a plurality of different host commands sent from said host computer, at least one of said host commands being a force command sent by said host computer in response to an event or interaction in said graphical environment, and control at least one actuator in response to said force command so as to create one or more forces felt by the user of said tactile feedback computer peripheral, wherein said force command describes a tactile sensation to be associated with said event or interaction and caused by said one or more forces, wherein said host command includes a command identifier for identifying said tactile sensation and at least one command parameter that characterizes said tactile sensation, wherein said at least one command parameter includes a deadband parameter that specifies a size of a deadband region of one of said degrees of freedom, wherein force output magnitude is to be approximately zero while said user manipulatable object is in said deadband region, said deadband region being centered approximately around an origin position of said user manipulatable object.

15. A tactile feedback computer peripheral device as recited in claim 14 wherein said tactile sensation described by said host command is a groove sensation having said deadband region as a center region of said groove sensation.

16. A tactile feedback computer peripheral device as recited in claim 15 wherein a restoring force biases said user manipulatable object on either side of said center region, said bias being toward said center region.

17. A tactile feedback computer peripheral device as recited in claim 16 wherein said restoring force is applied only within a region determined by a predetermined snap-out distance from said center region.

18. A tactile feedback computer peripheral device as recited in claim 15 wherein a center of said center region is approximately aligned with a graphical object displayed in a graphical environment by a host computer in communication with said tactile feedback interface device.

19. A tactile feedback computer peripheral device as recited in claim 15 wherein said groove sensation is provided in a position control paradigm with host software run by said host computer.

* * * * *